(12) United States Patent
Whalen et al.

(10) Patent No.: US 12,551,946 B2
(45) Date of Patent: Feb. 17, 2026

(54) DEVICES AND METHODS FOR PERFORMING SHEAR-ASSISTED EXTRUSION AND EXTRUSION PROCESSES

(71) Applicant: Battelle Memorial Institute, Richland, WA (US)

(72) Inventors: Scott A. Whalen, West Richland, WA (US); Jens T. Darsell, West Richland, WA (US); MD. Reza-E-Rabby, Richland, WA (US); Brandon Scott Taysom, West Richland, WA (US); Tianhao Wang, Richland, WA (US); Darrell R. Herling, Kennewick, WA (US); Xiao Li, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 18/093,636

(22) Filed: Jan. 5, 2023

(65) Prior Publication Data
US 2023/0150022 A1  May 18, 2023

Related U.S. Application Data

(60) Division of application No. 17/473,178, filed on Sep. 13, 2021, now Pat. No. 12,365,027, which is a
(Continued)

(51) Int. Cl.
*B22F 3/20* (2006.01)
*B21C 23/00* (2006.01)
*B22F 3/24* (2006.01)

(52) U.S. Cl.
CPC ............. *B22F 3/20* (2013.01); *B21C 23/001* (2013.01); *B22F 3/24* (2013.01);
(Continued)

(58) Field of Classification Search
CPC ....... B22F 3/20; B21C 23/001; B21C 23/002; B21C 23/04; B21C 23/06; B21C 23/08;
(Continued)

(56) References Cited

U.S. PATENT DOCUMENTS 3,432,369 A   3/1969   Naastepad
3,640,657 A   2/1972   Rowe et al.
(Continued)

FOREIGN PATENT DOCUMENTS

CN   106140847 A   11/2016
CN   107282671 A   10/2017
(Continued)

OTHER PUBLICATIONS

JP-2002361320-A Translation provided by FIT database (Year: 2025).*
(Continued)

*Primary Examiner* — Jeffrey T Carley
*Assistant Examiner* — Joshua D Anderson
(74) *Attorney, Agent, or Firm* — Schwegman, Lundberg & Woessner, P.A.

(57) ABSTRACT

A method for preparing a shear-assisted extruded material from a powder billet is provided, the method comprising providing a billet of material in substantially powder form; applying both axial and rotational pressure to the material to deform at least some of the contacted material; and extruding the material to form an extruded material. A method for preparing shear-assisted extruded material is provided, the method comprising applying both axial and rotational pressure to stock material to form an extruded material at a rate between 2 and 13 m/min. A method for preparing shear-assisted extruded material is provided. The method comprises applying both axial and rotational pressure to stock material to form an extruded material; and aging the
(Continued)

extruded material for less than 3 hours. A method for preparing shear-assisted extruded material is provided. The method comprises providing a stock material for shear-assisted extrusion; and applying both axial and rotational force to the stock material to form an extruded material, wherein the axial force does not decrease during the extrusion.

19 Claims, 57 Drawing Sheets

Related U.S. Application Data continuation-in-part of application No. 17/242,166, filed on Apr. 27, 2021, now abandoned, which is a continuation-in-part of application No. 17/033,854, filed on Sep. 27, 2020, now Pat. No. 12,186,791, which is a continuation-in-part of application No. 16/562,314, filed on Sep. 5, 2019, now Pat. No. 11,383,280, which is a continuation-in-part of application No. 16/028,173, filed on Jul. 5, 2018, now Pat. No. 11,045,851, which is a continuation-in-part of application No. 15/898,515, filed on Feb. 17, 2018, now Pat. No. 10,695,811, which is a continuation-in-part of application No. 15/351,201, filed on Nov. 14, 2016, now Pat. No. 10,189,063, which is a continuation-in-part of application No. 14/222,468, filed on Mar. 21, 2014, now abandoned.

(60) Provisional application No. 63/077,191, filed on Sep. 11, 2020, provisional application No. 63/015,913, filed on Apr. 27, 2020, provisional application No. 62/460,227, filed on Feb. 17, 2017, provisional application No. 62/313,500, filed on Mar. 25, 2016, provisional application No. 61/804,560, filed on Mar. 22, 2013.

(52) U.S. Cl.
CPC ... *B22F 2003/248* (2013.01); *B22F 2301/052* (2013.01); *B22F 2302/25* (2013.01)

(58) Field of Classification Search
CPC ..... B21C 23/085; B21C 23/18; B21C 23/183; B21C 23/186; B21C 23/20; B21C 23/205; B21C 25/02; B21C 31/00
See application file for complete search history.

(56) References Cited

U.S. PATENT DOCUMENTS

| | | |
|---|---|---|
| 3,661,726 A | 5/1972 | Denes |
| 3,684,593 A | 8/1972 | Benz et al. |
| 3,884,062 A | 5/1975 | Green |
| 3,892,603 A | 7/1975 | Reid |
| 3,924,429 A * | 12/1975 | Fuchs, Jr. ............ B21C 23/005 72/271 |
| 3,933,536 A | 1/1976 | Doser et al. |
| 3,977,918 A | 8/1976 | Paladino et al. |
| 3,989,548 A | 11/1976 | Morris |
| 4,287,749 A | 9/1981 | Bachrach et al. |
| 4,300,378 A | 11/1981 | Thiruvarudchelvan |
| 4,431,467 A | 2/1984 | Staley et al. |
| 4,585,473 A | 4/1986 | Narasimhan et al. |
| 4,778,542 A | 10/1988 | Clemens |
| 4,801,340 A | 1/1989 | Inoue et al. |
| 4,808,224 A | 2/1989 | Anderson et al. |
| 4,892,596 A | 1/1990 | Chatterjee |
| 4,985,085 A | 1/1991 | Chatterjee |
| 5,026,438 A | 6/1991 | Young et al. |
| 5,089,060 A | 2/1992 | Bradley et al. |
| 5,226,989 A | 7/1993 | Sukonnik |
| 5,242,508 A | 9/1993 | McCallum et al. |
| 5,262,123 A | 11/1993 | Thomas et al. |
| 5,283,130 A | 2/1994 | Bradley et al. |
| 5,437,545 A | 8/1995 | Hirai |
| 5,461,898 A | 10/1995 | Lessen |
| 5,470,401 A | 11/1995 | McCallum et al. |
| 5,492,264 A | 2/1996 | Wadleigh |
| 5,737,959 A | 4/1998 | Korbel et al. |
| 5,739,498 A | 4/1998 | Sunamoto et al. |
| 5,964,117 A | 10/1999 | Holroyd et al. |
| 5,988,484 A | 11/1999 | Osborn et al. |
| 6,022,424 A | 2/2000 | Sellers et al. |
| 6,036,467 A | 3/2000 | Jameson |
| 6,638,462 B2 | 10/2003 | Davidson et al. |
| 6,843,405 B2 | 1/2005 | Okamoto et al. |
| 6,940,379 B2 | 9/2005 | Creighton |
| 7,096,705 B2 | 8/2006 | Segal |
| 7,314,670 B2 | 1/2008 | Bartsch et al. |
| 7,322,508 B2 | 1/2008 | Chang |
| 7,954,692 B2 | 6/2011 | Fukuda |
| 8,016,179 B2 | 9/2011 | Burford |
| 8,240,540 B2 | 8/2012 | Tanaka et al. |
| 8,313,692 B2 | 11/2012 | Somekawa et al. |
| 8,695,868 B2 | 4/2014 | Messer et al. |
| 10,189,063 B2 | 1/2019 | Lavender et al. |
| 10,369,748 B2 | 8/2019 | Whalen et al. |
| 10,695,811 B2 | 6/2020 | Joshi et al. |
| 10,987,754 B1 | 4/2021 | Eller et al. |
| 11,045,851 B2 | 6/2021 | Joshi et al. |
| 2002/0029601 A1 | 3/2002 | Kwok |
| 2004/0057782 A1 | 3/2004 | Okamoto et al. |
| 2004/0238501 A1 | 12/2004 | Kawazoe et al. |
| 2004/0265503 A1 | 12/2004 | Clayton et al. |
| 2005/0081594 A1 | 4/2005 | Segal |
| 2006/0005898 A1 | 1/2006 | Lui et al. |
| 2006/0027628 A1 | 2/2006 | Sutherlin et al. |
| 2008/0029581 A1 | 2/2008 | Kumagai et al. |
| 2008/0048005 A1 | 2/2008 | Forrest et al. |
| 2008/0202653 A1 | 8/2008 | Ignberg |
| 2008/0251571 A1 | 10/2008 | Burford |
| 2009/0072007 A1 | 3/2009 | Nagano |
| 2009/0269605 A1 | 10/2009 | Warke et al. |
| 2009/0291322 A1 | 11/2009 | Watanabe et al. |
| 2010/0059151 A1 | 3/2010 | Iwamura et al. |
| 2010/0089976 A1 | 4/2010 | Szymanski et al. |
| 2010/0132430 A1 | 6/2010 | Tsai et al. |
| 2011/0104515 A1 | 5/2011 | Kou et al. |
| 2011/0132970 A1 | 6/2011 | Nakagawa et al. |
| 2011/0309131 A1 | 12/2011 | Hovanski et al. |
| 2012/0006086 A1 | 1/2012 | Manchiraju et al. |
| 2012/0052322 A1 | 3/2012 | Hatakeyama et al. |
| 2012/0168045 A1 | 7/2012 | Ihara et al. |
| 2012/0223451 A1 | 9/2012 | Hulseman et al. |
| 2012/0258332 A1 | 10/2012 | Hatakeyama et al. |
| 2013/0075452 A1 | 3/2013 | Burford |
| 2013/0266467 A1 | 10/2013 | Manchiraju et al. |
| 2014/0000332 A1 | 1/2014 | Wilson et al. |
| 2014/0002220 A1 | 1/2014 | Johnson et al. |
| 2014/0076957 A1 | 3/2014 | Sayama et al. |
| 2014/0102159 A1 | 4/2014 | Denison |
| 2014/0102161 A1 | 4/2014 | Stewart |
| 2014/0248508 A1 | 9/2014 | Ohhama et al. |
| 2014/0260489 A1 | 9/2014 | Funk et al. |
| 2014/0283574 A1 | 9/2014 | Lavender et al. |
| 2014/0291886 A1 | 10/2014 | Mark et al. |
| 2014/0328710 A1 | 11/2014 | Cui et al. |
| 2015/0075242 A1 | 3/2015 | Eller et al. |
| 2015/0115019 A1 | 4/2015 | Pascal et al. |
| 2015/0360317 A1 | 12/2015 | Kalvala et al. |
| 2016/0008918 A1 | 1/2016 | Burford |
| 2016/0151817 A1 | 6/2016 | Nayfeh et al. |
| 2016/0151818 A1 | 6/2016 | Shao |
| 2016/0167353 A1 | 6/2016 | Fan et al. |
| 2016/0175981 A1 | 6/2016 | Kandasamy |
| 2016/0175982 A1 | 6/2016 | Kandasamy et al. |
| 2016/0184922 A1 | 6/2016 | Kikyo |
| 2016/0228932 A1 | 8/2016 | Hayashi et al. |

(56) References Cited

U.S. PATENT DOCUMENTS

| | | |
|---|---|---|
| 2016/0354860 A1 | 12/2016 | Boettcher et al. |
| 2017/0008121 A1 | 1/2017 | Li |
| 2017/0056947 A1 | 3/2017 | Lavender et al. |
| 2017/0136686 A1 | 5/2017 | Ueno et al. |
| 2017/0163135 A1 | 6/2017 | Emberton et al. |
| 2017/0182587 A1 | 6/2017 | Tokoro et al. |
| 2017/0216961 A1 | 8/2017 | Utter et al. |
| 2017/0225265 A1 | 8/2017 | Ito et al. |
| 2017/0304933 A1 | 10/2017 | Miles et al. |
| 2017/0355003 A1 | 12/2017 | TenHouten et al. |
| 2018/0036840 A1 | 2/2018 | Hu et al. |
| 2018/0043467 A1 | 2/2018 | Huysmans |
| 2018/0050419 A1 | 2/2018 | Das et al. |
| 2018/0073532 A1 | 3/2018 | Whalen et al. |
| 2018/0311713 A1 | 11/2018 | Joshi et al. |
| 2018/0354231 A1 | 12/2018 | Iwase |
| 2018/0369889 A1 | 12/2018 | Zhang et al. |
| 2019/0267153 A1 | 8/2019 | Kappagantula et al. |
| 2019/0275608 A1 | 9/2019 | Das et al. |
| 2021/0053100 A1 | 2/2021 | Whalen et al. |
| 2021/0086291 A1 | 3/2021 | Okada et al. |
| 2021/0197241 A1 | 7/2021 | Grant et al. |
| 2021/0205918 A1 | 7/2021 | Fujii et al. |
| 2021/0252632 A1 | 8/2021 | Eller et al. |
| 2021/0402471 A1 | 12/2021 | Whalen et al. |
| 2022/0297174 A1 | 9/2022 | Whalen et al. |
| 2023/0042802 A1 | 2/2023 | Whalen et al. |
| 2023/0081786 A1 | 3/2023 | Joshi et al. |
| 2023/0088412 A1 | 3/2023 | Joshi et al. |
| 2023/0234115 A1 | 7/2023 | Kappagantula et al. |

FOREIGN PATENT DOCUMENTS

| | | |
|---|---|---|
| CN | 105925846 | 2/2018 |
| CN | 109295332 B | 4/2020 |
| CN | 112512710 B | 10/2023 |
| EP | 2990178 | 8/2014 |
| EP | 2777837 A1 | 9/2014 |
| EP | 3817872 B1 | 2/2025 |
| GB | 1258141 | 12/1971 |
| JP | 2002361320 A * | 12/2002 |
| JP | 2003-275876 | 9/2003 |
| JP | 2004174563 A | 6/2004 |
| JP | 2007-222925 | 9/2007 |
| JP | 2009090359 A | 4/2009 |
| JP | 2019115909 A | 7/2019 |
| KR | 101316989 B1 | 10/2013 |
| WO | WO PCT/US2019/040730 | 10/2019 |
| WO | 2020010331 | 1/2020 |
| WO | 2020053168 | 3/2020 |
| WO | 2021050022 | 3/2021 |
| WO | WO-2021062415 A1 | 4/2021 |
| WO | 2022043532 | 3/2022 |
| WO | 2022056358 | 3/2022 |
| WO | 2023015228 | 2/2023 |
| WO | WO-2023177693 A1 | 9/2023 |

OTHER PUBLICATIONS

WO PCT/US2019/040730 IPRP, Jan. 5, 2021, Battelle Memorial Institute.

WO PCT/US2020/053168 IPRP, Apr. 7, 2022, Battelle Memorial Institute.

WO PCT/US2020/053168 Search Rpt, Feb. 8, 2021, Battelle Memorial Institute.

WO PCT/US2020/053168 Written Opin, Feb. 8, 2021, Battelle Memorial Institute.

WO PCT/US2021/050022 IPRP, Dec. 1, 2022, Battelle Memorial Institute.

WO PCT/US2021/050022 Search Rpt, Feb. 3, 2022, Battelle Memorial Institute.

WO PCT/US2021/050022 Writ. Opin., Feb. 3, 2022, Battelle Memorial Institute.

Abu-Farha, "A Preliminary Study on the Feasibility of Friction Stir Back Extrusion", Scripta Materials, 66, 2012, United States, 615-618.

Amancio-Filho et al., "Joining of Polymers and Polymer-Metal Hybrid Structures: Recent Developments and Trends", Polymer Engineering & Science, 2009, United States, pp. 1461-1476.

Bozzi et al., "Intermetallic Compounds in AI 6016/IF-Steel Friction Stir Spot Welds", Materials Science and Engineering, 2010, Netherlands, pp. 4505-4509.

Cole et al., "Lightweight materials for Automotive Applications", Materials Characterization, 35, 1995, United States, pp. 3-9.

Evans et al., "Friction Stir Extrusion: A new process for joining dissimilar materials", Manufacturing Letters, 5, 2015, United States, pp. 25-28.

Gann, J.A., "Magnesium Industry's Lightest Structural Metal", SAE Transactions, vol. 25-26, 1930-1931, United States, pp. 620-634, 641.

Hammond et al., "Equal-Channel Angular Extrusion of a Low-Density High-Entropy Alloy Produced by High-Energy Cryogenic Mechanical Alloying", JOM. vol. 66, No. 10, United States, 2014, pp. 2021-2029.

Kaiser et al., "Anisotropic Properties of Magnesium Sheet AZ31", Materials Science Forum, vols. 419-422, Switzerland, 2003, pp. 315-320.

Kuo et al., "Fabrication of High Performance Magnesium/Carbon-Fiber/PEEK/Laminated Composites", Materials Transactions, vol. 44, No. 8 (2003), Japan, pp. 1613-1619.

Leitao et al., "Aluminum-steel lap joining by multipass friction stir welding", Materials and Design, 106, 2016, United States, pp. 153-160.

Liu et al., "A Review of Dissimilar Welding Techniques for Magnesium Alloys to Aluminum Alloys", Materials, 7, 2014, United States, pp. 3735-3757.

Liu et al., "Microstructure and mechanical properties of equimolar FeCoCrNi high entropy alloy prepared via powder extrusion", Intermetallics 75 (2016) , United States, pp. 25-30.

Luo, Alan, "Magnesium: Current and Potential Automotive Applications", JOM, 54(2), 2002, United States, pp. 42-48.

Martinsen et al., "Joining of Dissimilar Materials", CIRP Annals—Manufacturing Technology, 2015, United States, 21 pages.

Nakamura et al., "Tool Temperature and Process Modeling of Friction Stir Welding", (2018) Modern Mechanical Engineering, 8, 78-94.

Office Action for U.S. Appl. No. 14/222,468, filed Mar. 21, 2014, First named inventor Curtis A. Lavender, Notification date Nov. 6, 2015, 10 pages.

Office Action for U.S. Appl. No. 14/222,468, filed Mar. 21, 2014, First named inventor Curtis A. Lavender, Notification date Apr. 1, 2016, 10 pages.

Office Action for U.S. Appl. No. 14/222,468, filed Mar. 21, 2014, First named inventor Curtis A. Lavender, Notification date May 20, 2016, 3 pages.

Office Action for U.S. Appl. No. 14/222,468, filed Mar. 21, 2014, First named inventor Curtis A. Lavender, Notification date Jan. 26, 2017, 9 pages.

Office Action for U.S. Appl. No. 14/268,220, filed May 2, 2014, First Named Inventor Jun Cui, Notification date Dec. 1, 2015, 7 pages.

Pickens, "Aluminum Powder Metallurgy Technology for High-Strength Applications", Journal of Materials Science 16 (1981) 1437-1457, United Kingdom, 21 pages.

Rodewald et al. "Top Nd—Fe—B Magnets with Greater Than 56 MGOe Energy Density and 9.8 kOe Coercivity", IEEE Transactions on Magnetics, vol. 38, No. 5, 2002, United States, pp. 2955-2957.

Saha, "Aluminum Extrusion Technology, Chapter 1, Fundamentals of Extrusion", The Materials Information Society, ASM International, 2000, United States, pp. 1-29.

ThomasNet.com, https:/www.thomasnet.com/articles/custom-manufacturing-fabricating/friction-stir-welding/ Feb. 10, 2011 (Year: 2011).

(56) References Cited

OTHER PUBLICATIONS

Trang et al., "Designing a Magnesium Alloy with High Strength and High Formability", Nature Communications, 2018, United Kingdom, 6 pages.
Whalen et al., "High Ductility Aluminum Alloy Made from Powder by Friction Extrusion", Materalia 6 (2019) 100260, Netherlands, 6 pages.
Whalen et al., U.S. Appl. No. 15/694,565, filed Sep. 1, 2017, titled "System and Process for Joining Dissimilar Materials and Solid-State Interocking Joint with Intermetallic Interface Formed Thereby", 69 pages.
Zhang et al., "Numerical Studies on Effect of Axial Pressure in Friction Stir Welding", (2007) Science and Technology of Welding and Joining, vol. 12, No. 3, United Kingdom, pp. 226-248.
WO PCT/US2023/015228 Search Rpt, Jun. 15, 2023, Battelle Memorial Institute.
WO PCT/US2023/015228 Written Opin, Jun. 15, 2023, Battelle Memorial Institute.
WO PCT/US22/43532 Search Rept, Jan. 12, 2023, Battelle Memorial Institute.
WO PCT/US22/43532 Written Opin, Jan. 12, 2023, Battelle Memorial Institute.
"U.S. Appl. No. 17/033,854, Final Office Action mailed Mar. 28, 2024", 12 pgs.
"U.S. Appl. No. 17/033,854, Non Final Office Action mailed Oct. 4, 2023", 11 pgs.
"U.S. Appl. No. 17/033,854, Response filed Mar. 7, 2024 to Non Final Office Action mailed Oct. 4, 2023", 10 pgs.
"U.S. Appl. No. 17/035,597, Response filed Feb. 28, 2024 to Non Final Office Action mailed Aug. 28, 2023", 10 pgs.
"U.S. Appl. No. 17/473,178, Advisory Action mailed Jan. 3, 2024", 3 pgs.
"U.S. Appl. No. 17/473,178, Final Office Action mailed Oct. 20, 2023", 9 pgs.
"U.S. Appl. No. 17/473,178, Non Final Office Action mailed Jan. 3, 2024", 10 pgs.
"U.S. Appl. No. 17/473,178, Response filed Jul. 10, 2023 to Non Final Office Action mailed Feb. 8, 2023", 13 pgs.
"U.S. Appl. No. 17/473,178, Response filed Dec. 20, 2023 to Final Office Action mailed Oct. 20, 2023", 11 pgs.
"U.S. Appl. No. 17/826,054, Non Final Office Action mailed Mar. 8, 2024", 13 pgs.
"U.S. Appl. No. 17/874,140, Non Final Office Action mailed Mar. 20, 2024", 10 pgs.
"U.S. Appl. No. 17/984,144, Non Final Office Action mailed Mar. 29, 2024", 14 pgs.
"U.S. Appl. No. 17/985,611, Non Final Office Action mailed Mar. 27, 2024", 10 pgs.
"Canadian Application Serial No. 3,105,375 Examiners Rule 86 2 Requisition mailed Dec. 28, 2023", 7 pgs.
"Canadian Application Serial No. 3,192,375, Voluntary Amendment filed Dec. 28, 2023", 59 pgs.
"Chinese Application Serial No. 202180062766.0, Voluntary Amendment filed Nov. 13, 2023", with English claims, 91 pages.
"Chinese Application Serial No. 202311192831.9, Response filed Dec. 28, 2023 to Notification to Make Rectification issued Nov. 1, 2023", with English claims, 21 pages.
"European Application Serial No. 19745460.6, Summons to attend oral proceedings pursuant to Rule 115(1) EPC mailed Jan. 4, 2024", 6 pgs.
"European Application Serial No. 21867741.7, Response to Communication Pursuant to Rules 161 & 162 EPC filed Oct. 16, 2023", 15 pgs.
"U.S. Appl. No. 17/033,854, Final Office Action mailed Jun. 7, 20 23", 11 pgs.
"U.S. Appl. No. 17/035,597, Final Office Action mailed May 10, 2023", 13 pgs.
"U.S. Appl. No. 17/473,178, Non Final Office Action mailed Feb. 8, 2023", 22 pgs.
"U.S. Appl. No. 17/826,054, Preliminary Amendment filed Jul. 13, 2023", 9 pgs.
"International Application Serial No. PCT US2019 040730, Written Opinion mailed Oct. 21, 2019", (Oct. 21, 2019), 7 pages.
"U.S. Appl. No. 17/033,854, Response filed Aug. 7, 2023 to Final Office Action mailed Jun. 7, 2023", 9 pgs.
"U.S. Appl. No. 17/033,854, Advisory Action mailed Aug. 16, 2023", 4 pgs.
"U.S. Appl. No. 17/035,597, Non Final Office Action mailed Aug. 28, 2023", 10 pgs.
"U.S. Appl. No. 17/242,166, Final Office Action mailed Aug. 30, 2023", 7 pgs.
"European Application Serial No. 19745460.6, Response filed Sep. 18, 2023 to Communication Pursuant to Article 94(3) EPC mailed May 10, 2023", 9 pgs.
"European Application Serial No. 19745460.6, Communication Pursuant to Article 94(3) EPC mailed May 10, 2023", 6 pgs.
"CN 201980045070X Office Action mailed Sep. 6, 2022", with English translation, 13 pages.
"CN 201980045070X Response mailed Apr. 11, 2023 to Office Action Sep. 6, 2022", with English claims, 8 pages.
"U.S. Appl. No. 14/222,468, Non-Final Office Action mailed Nov. 6, 2015", 10 pgs.
"U.S. Appl. No. 17/033,854, Advisory Action mailed Jun. 5, 2024", 4 pgs.
"U.S. Appl. No. 17/033,854, Examiner Interview Summary mailed Jul. 30, 2024", 3 pgs.
"U.S. Appl. No. 17/033,854, Notice of Allowance mailed Sep. 20, 2024", 16 pgs.
"U.S. Appl. No. 17/033,854, Response filed May 28, 2024 to Final Office Action mailed Mar. 28, 2024", 13 pgs.
"U.S. Appl. No. 17/033,854, Response filed Aug. 23, 2024 to Advisory Action mailed Jun. 5, 2024", 17 pgs.
"U.S. Appl. No. 17/035,597, Examiner Interview Summary mailed Aug. 22, 2024", 3 pgs.
"U.S. Appl. No. 17/035,597, Final Office Action mailed Apr. 17, 2024", 23 pgs.
"U.S. Appl. No. 17/035,597, Non Final Office Action mailed Sep. 6, 2024", 19 pgs.
"U.S. Appl. No. 17/035,597, Response filed Aug. 19, 2024 to Final Office Action mailed Apr. 17, 2024", 17 pgs.
"U.S. Appl. No. 17/035,597, Response filed Sep. 11, 2023 to Non Final Office Action mailed Aug. 28, 2023", 61 pgs.
"U.S. Appl. No. 17/473,178, Final Office Action mailed Jun. 14, 2024", 21 pgs.
"U.S. Appl. No. 17/473,178, Non Final Office Action mailed Feb. 28, 2024", 19 pgs.
"U.S. Appl. No. 17/473,178, Response filed Apr. 11, 2024 to Non Final Office Action mailed Jan. 3, 2024", 8 pgs.
"U.S. Appl. No. 17/473,178, Response filed May 28, 2024 to Non Final Office Action mailed Feb. 28, 2024", 10 pgs.
"U.S. Appl. No. 17/826,054, Examiner Interview Summary mailed Jul. 30, 2024", 3 pgs.
"U.S. Appl. No. 17/826,054, Response filed Aug. 8, 2024 to Non Final Office Action mailed Mar. 8, 2024", 13 pgs.
"U.S. Appl. No. 17/874,140, Response filed Sep. 16, 2024 to Non Final Office Action mailed Mar. 20, 2024", 15 pgs.
"U.S. Appl. No. 17/957,207, Final Office Action mailed Jun. 12, 2024", 13 pgs.
"U.S. Appl. No. 17/984,144, Response filed Sep. 17, 2024 to Non Final Office Action mailed Mar. 29, 2024", 8 pgs.
"U.S. Appl. No. 17/985,611, Response filed Sep. 17, 2024 to Non Final Office Action mailed Mar. 27, 2024", 12 pgs.
"Application Serial No. PCT/US2023/015228, IPRP mailed Sep. 26, 2024", 11 pgs.
"Application Serial No. PCT/US2023/015228, Written Opinion mailed Jun. 15, 2023", 6 pgs.
"Canadian Application No. 3155420, Examiners Rule 862 Requisition Report Consolidated Correspondence Jul. 20, 2023", 5 pgs.
"Canadian Application No. 3155420, Examiners Rule mailed May 11, 2023", 4 pgs.

(56) References Cited

OTHER PUBLICATIONS

"Canadian Application Serial No. 3,105,375, Response filed Apr. 26, 2024 to Examiners Rule 86 2 Requisition mailed Dec. 28, 2023", 27 pgs.

"Canadian Application Serial No. 3,155,420, Examiners Rule 862 Requisition Report Apr. 18, 2024", 3 pgs.

"Canadian Application Serial No. 3,155,420, Response filed Aug. 13, 2024 to Examiners Rule 862 Requisition Report Apr. 18, 2024", 10 pgs.

"European Application Serial No. 19745460.6, Response filed Jun. 20, 2024 to Summons to attend oral proceedings pursuant to Rule 115(1) EPC mailed Jan. 4, 2024", 12 pgs.

"European Application Serial No. 20869757, Extended European Search Report mailed Sep. 19, 2023", 10 pgs.

"European Application Serial No. 20869757, Response filed Apr. 12, 2024 to Extended European Search Report mailed Sep. 19, 2023", 13 pgs.

"European Application Serial No. 20869757.3, Communication Pursuant to Article 94(3) EPC mailed Sep. 4, 2024", 6 pgs.

"European Application Serial No. 21867741.7, Extended European Search Report mailed Aug. 12, 2024", 8 pgs.

"International Application Serial No. PCT/US2019/040730, International Preliminary Report on Patentability mailed Jan. 5, 2021", 8 pgs.

"International Application Serial No. PCT/US2019/040730, International Search Report mailed Oct. 21, 2019", 4 pgs.

"International Application Serial No. PCT/US2019/040730, Written Opinion mailed Oct. 21, 2019", 7 pgs.

"International Application Serial No. PCT/US2020/05168 International Search Report mailed Feb. 8, 2021", 5 pgs.

"International Application Serial No. PCT/US2020/05168 Written Opinion mailed Feb. 8, 2021", 6 pgs.

"International Application Serial No. PCT/US2020/053168, International Preliminary Report on Patentability mailed Apr. 7, 2022", 8 pgs.

"International Application Serial No. PCT/US2021/050022, International Preliminary Report on Patentability mailed Dec. 1, 2022", 17 pgs.

"International Application Serial No. PCT/US2021/050022, International Search Report mailed Feb. 3, 2022", 5 pgs.

"International Application Serial No. PCT/US2021/050022, Written Opinion mailed Feb. 3, 2022", 6 pgs.

"International Application Serial No. PCT/US2023/015228, International Search Report mailed Jun. 15, 2023", 5 pgs.

"JP 2004-174563 Translation from FIT database", (Year: 2024), 22 pgs.

"U.S. Appl. No. 17/957,207, Response filed Oct. 14, 2024 to Final Office Action mailed Jun. 12, 2024", 14 pgs.

"U.S. Appl. No. 17/473,178, Response filed Oct. 14, 2024 to Final Office Action mailed Jun. 14, 2024", 14 pgs.

"U.S. Appl. No. 17/473,178, Examiner Interview Summary mailed Oct. 16, 2024", 3 pgs.

"U.S. Appl. No. 17/826,054, Final Office Action mailed Oct. 18, 2024", 14 pgs.

"U.S. Appl. No. 17/957,207, Response filed Nov. 8, 2024 to Advisory Action mailed Oct. 31, 2024 and Final Office Action mailed Jun. 12, 2024", 16 pgs.

"U.S. Appl. No. 17/957,207, Advisory Action mailed Oct. 31, 2024", 3 pgs.

"U.S. Appl. No. 17/473,178, Advisory Action mailed Oct. 31, 2024", 3 pgs.

"U.S. Appl. No. 17/473,178, Response filed Nov. 8, 2024 to Advisory Action mailed Oct. 31, 2024 and Final Office Action Jun. 14, 2024", 14 pgs.

"Canadian Application Serial No. 3,105,375, Examiners Rule 86(2) Report mailed Nov. 6, 2024", 9 pgs.

"U.S. Appl. No. 17/874,140, Final Office Action mailed Nov. 15, 2024", 11 pgs.

"U.S. Appl. No. 17/957,207, Notice of Allowance mailed Nov. 22, 2024", 9 pgs.

"U.S. Appl. No. 17/473,178, Notice of Allowance mailed Nov. 25, 2024", 8 pgs.

"U.S. Appl. No. 17/984,144, Notice of Allowance mailed Nov. 26, 2024", 11 pgs.

"U.S. Appl. No. 17/985,611, Final Office Action mailed Dec. 5, 2024", 15 pgs.

"U.S. Appl. No. 17/826,054, Response filed Jan. 6, 2025 to Final Office Action mailed Oct. 18, 2024", 9 pgs.

X, Li, "CN105925846-B translation provided by FIT database (Year: 2024)", (Feb. 23, 2018), 12 pgs.

"U.S. Appl. No. 17/035,597, Response filed Feb. 6, 2025 to Non Final Office Action mailed Sep. 6, 2024", 8 pgs.

"U.S. Appl. No. 17/473,178, Notice of Allowance mailed Mar. 28, 2025", 12 pgs.

"U.S. Appl. No. 17/826,054, Notice of Allowance mailed Feb. 26, 2025", 10 pgs.

"U.S. Appl. No. 17/984,144, Notice of Allowance mailed Mar. 27, 2025", 11 pgs.

"U.S. Appl. No. 17/985,611, Response filed Apr. 7, 2025 to Final Office Action mailed Dec. 5, 2024", 9 pgs.

"Canadian Application Serial No. 3,105,375, Response filed Mar. 3, 2025 to Examiners Rule 86(2) Report mailed Nov. 6, 2024", 7 pgs.

"European Application Serial No. 20869757.3, Response filed Jan. 3, 2025 to Communication Pursuant to Article 94(3) EPC mailed Sep. 4, 2024", 10 pgs.

"European Application Serial No. 25156776.4, Response filed Mar. 20, 2025 to Invitation to Remedy Deficiencies (R. 58 EPC) mailed Feb. 20, 2025", 8 pgs.

"U.S. Appl. No. 17/874,140, Response filed Apr. 15, 2025 to Final Office Action mailed Nov. 15, 2024", 8 pages.

"U.S. Appl. No. 17/035,597, Notice of Allowance mailed May 7, 2025", 12 pages.

"European Application Serial No. 23771340.9, Response to Communication pursuant to Rules 161 and 162 EPC filed Apr. 22, 2025", 10 pages.

"Canadian Application Serial No. 3,192,375 Requisition by the Examiner in Accordance With Subsection 86(2) mailed May 27, 2025", 6 pages.

Tang, W., "Production of wire via friction extrusion of aluminum alloy machining chips", Journal of Materials Processing Technology vol. 210 Issue 15, (Nov. 19, 2010), 7 pages.

"U.S. Appl. No. 17/874,140, Non Final Office Action mailed Jun. 12, 2025", 15 pgs.

"A Translation from FIT database", JP 2002361320, (Year: 2025), 8 pgs.

"U.S. Appl. No. 17/985,611, Notice of Allowance mailed Jun. 27, 2025", 12 pgs.

"European Application Serial No. 20869757.3, Summons to attend oral proceedings mailed Jun. 13, 2025", 8 pgs.

"European Application Serial No. 20869757.3, Response filed Sep. 4, 2025 to Summons to attend oral proceedings mailed Jun. 13, 2025", 8 pgs.

U.S. Appl. No. 18/426,042, filed Jan. 29, 2024, Devices and Methods for Performing Shear-Assisted Extrusion and Extrusion Processes.

U.S. Appl. No. 14/222,468, filed Mar. 21, 2014, System and Process for Formation of Extrusion Structures.

U.S. Appl. No. 15/351,201 U.S. Pat. No. 10,189,063, filed Nov. 14, 2016, System and Process for Formation of Extrusion Structures.

U.S. Appl. No. 62/460,227, filed Feb. 17, 2017, Functionally Graded Coatings and Claddings.

U.S. Appl. No. 15/898,515 U.S. Pat. No. 10,695,811, filed Feb. 17, 2018, Functionally Graded Coatings and Claddings.

U.S. Appl. No. 16/916,548 U.S. Pat. No. 11,517,952, filed Jun. 30, 2020, Shear Assisted Extrusion Process.

U.S. Appl. No. 17/984,144, filed Nov. 9, 2022, Functionally Graded Coatings and Claddings.

U.S. Appl. No. 16/028,173 U.S. Pat. No. 11,045,851, filed Jul. 5, 2018, Method for Forming Hollow Profile Non-Circular Extrusions Using Shear Assisted Processing and Extrusion (Shape).

U.S. Appl. No. 17/985,611, filed Nov. 11, 2022, Method for Forming Hollow Profile Non-Circular Extrusions Using Shear Assisted Processing and Extrusion (Shape).

(56) References Cited

OTHER PUBLICATIONS

U.S. Appl. No. 17/175,464 U.S. Pat. No. 11,534,811, filed Feb. 12, 2021, Method for Forming Hollow Profile Non-Circular Extrusions Using Shear Assisted Processing and Extrusion (Shape).

U.S. Appl. No. 16/562,314 U.S. Pat. No. 11,383,280, filed Sep. 5, 2019, Devices and Methods for Performing Shear-Assisted Extrusion, Extrusion Feedstocks, Extrusion Processes, and Methods for Preparing Metal Sheets.

U.S. Appl. No. 17/826,054, filed May 26, 2022, Devices and Methods for Performing Shear-Assisted Extrusion, Extrusion Feedstocks, Extrusion Processes, and Methods for Preparing Metal Sheets.

U.S. Appl. No. 17/665,433 U.S. Pat. No. 11,684,959, filed Feb. 4, 2022, Extrusion Processes for Forming Extrusions of a Desired Composition From a Feedstock.

U.S. Appl. No. 17/033,854, filed Sep. 27, 2020, Devices and Methods for Performing Shear-Assisted Extrusion and Extrusion Processes.

U.S. Appl. No. 17/874,140, filed Jul. 26, 2022, Devices and Methods for Performing Shear-Assisted Extrusion and Extrusion Processes.

U.S. Appl. No. 17/035,597, filed Sep. 28, 2020, Shape Processes, Feedstock Materials, Conductive Materials and/or Assemblies.

U.S. Appl. No. 17/242,166, filed Apr. 27, 2021, Devices and Methods for Performing Shear-Assisted Extrusion and Extrusion Processes.

U.S. Appl. No. 17/957,207, filed Sep. 30, 2022, Devices and Methods for Performing Shear-Assisted Extrusion and Extrusion Processes.

U.S. Appl. No. 17/473,178, filed Sep. 13, 2021, Devices and Methods for Performing Shear-Assisted Extrusion and Extrusion Processes.

U.S. Appl. No. 18/121,563, filed Mar. 14, 2023, Extrusion Prcesses, Feedstock Materials, Conductive Materials and/or Assemblies.

\* cited by examiner

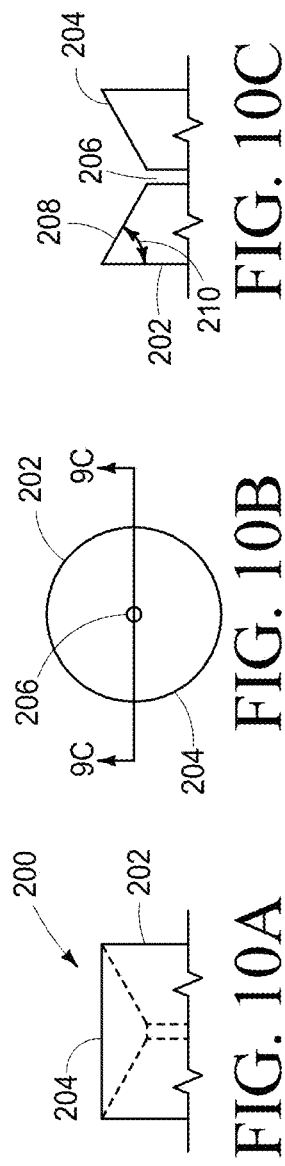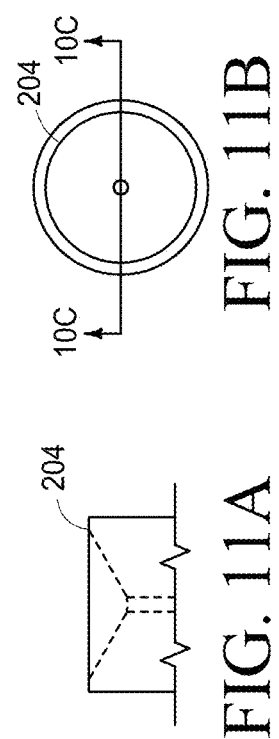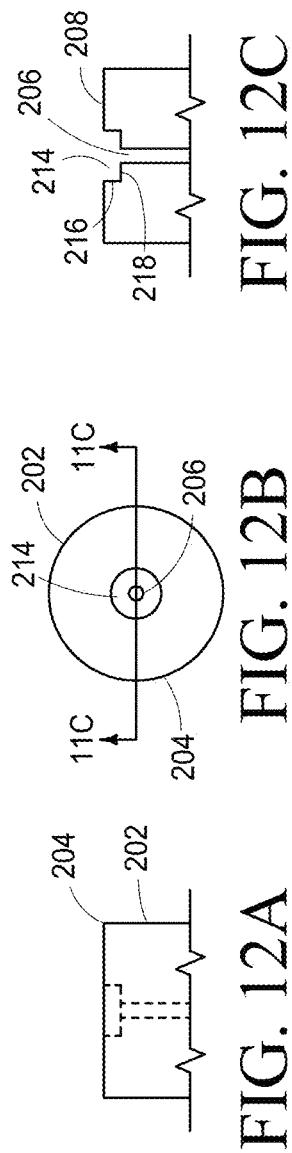

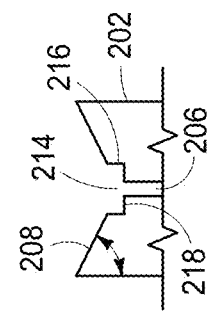
FIG. 13A
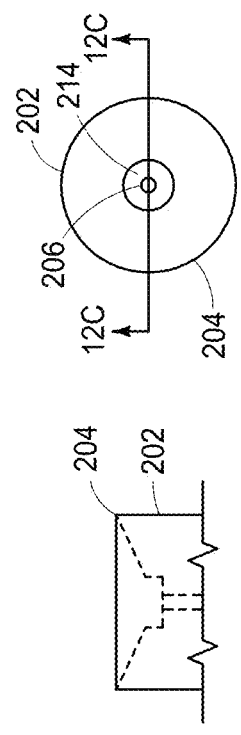
FIG. 13B
FIG. 13C
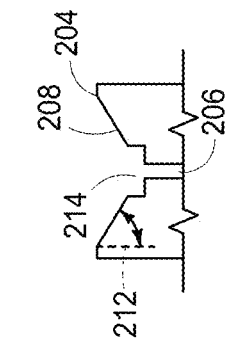
FIG. 14A
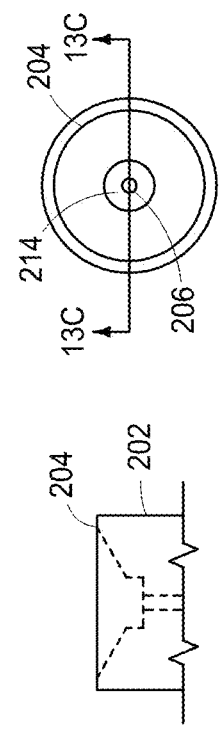
FIG. 14B
FIG. 14C
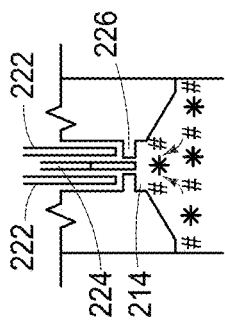
FIG. 15A
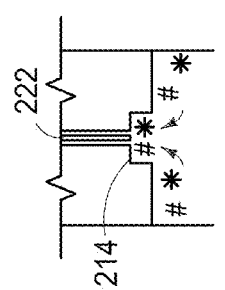
FIG. 15B
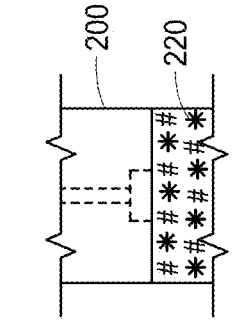
FIG. 16

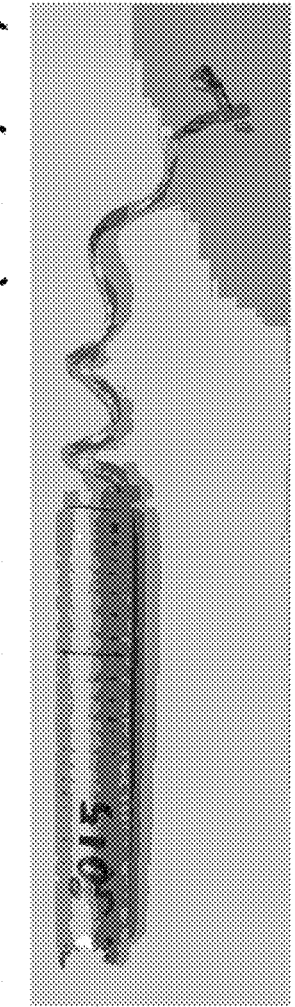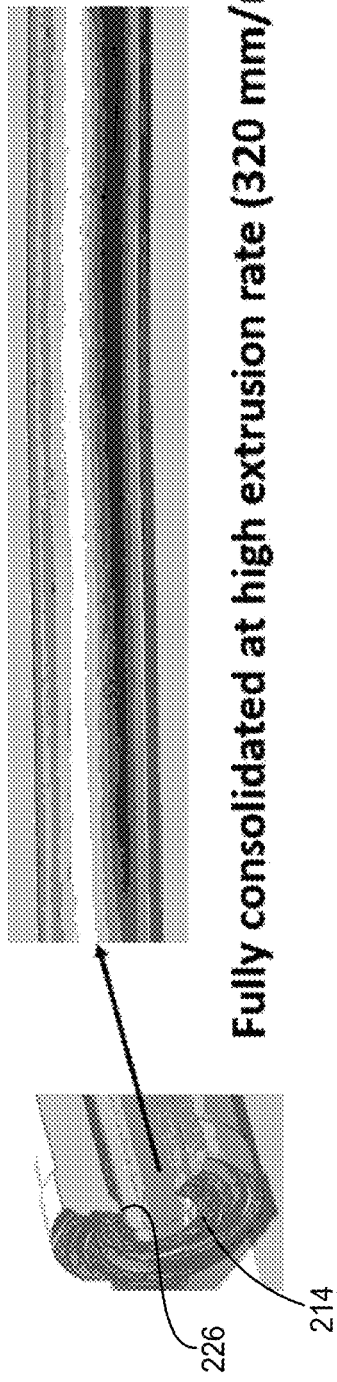
FIG. 28 Unconsolidated at low extrusion rate (20 mm/min)
FIG. 29 Fully consolidated at high extrusion rate (320 mm/min)

62 – 6 scroll, 2mm
63 – 14 deg, 2mm
64 – 26 deg, 2mm
65 – 45 deg, 2mm
66 – 6 scroll, 1mm
67 – 26 deg, 1mm
68 – 45 deg, 1 mm

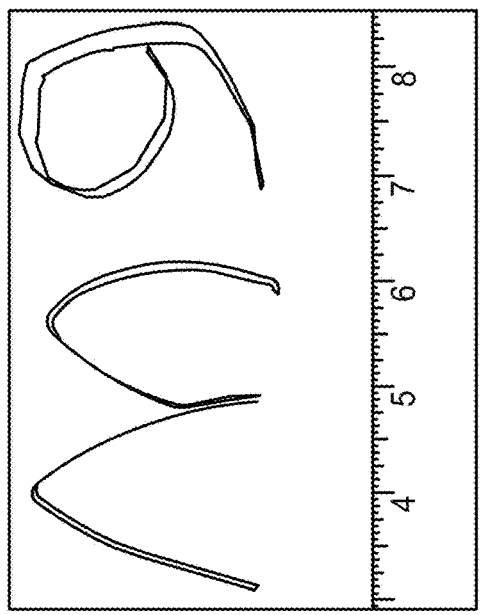
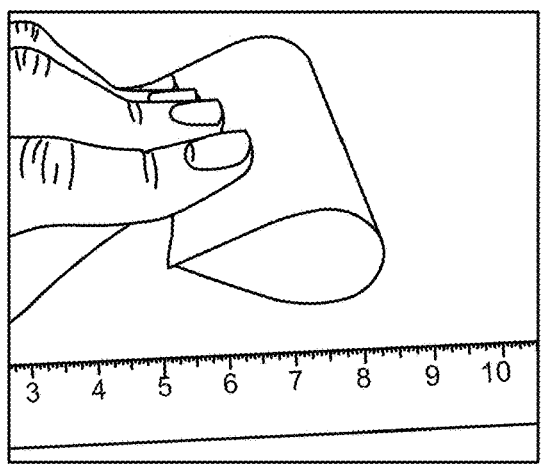
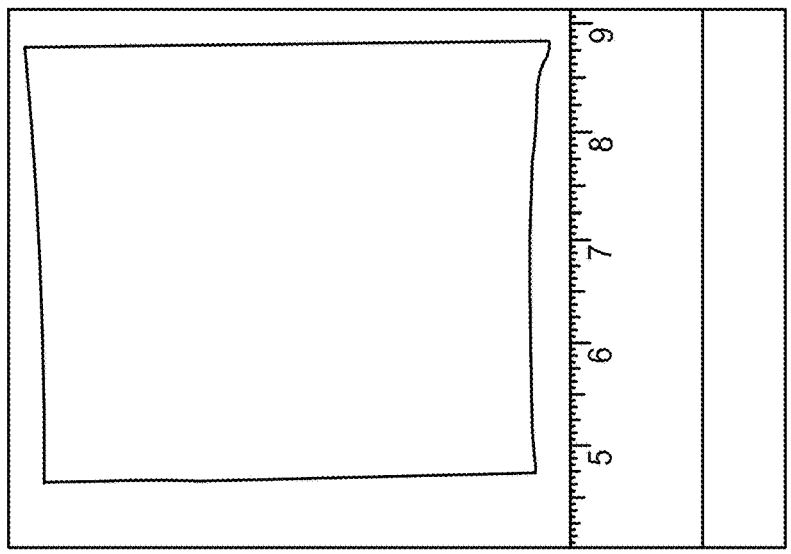
FIG. 46

DEVICES AND METHODS FOR PERFORMING SHEAR-ASSISTED EXTRUSION AND EXTRUSION PROCESSES

CROSS REFERENCE TO RELATED APPLICATION

This application is a divisional of U.S. patent application Ser. No. 17/473,178 filed Sep. 13, 2021, which claims priority to and the benefit of U.S. Provisional Application Ser. No. 63/077,191 filed Sep. 11, 2020, the contents of which are hereby incorporated by reference. U.S. patent application Ser. No. 17/473,178 filed Sep. 13, 2021, is a Continuation-in-Part of and claims priority and the benefit of both U.S. Provisional Application Ser. No. 63/015,913 filed Apr. 27, 2020 and U.S. patent application Ser. No. 17/242,166 filed Apr. 27, 2021, which is a Continuation-in-Part of and claims priority to U.S. patent application Ser. No. 17/033,854 filed Sep. 27, 2020, which is a Continuation-In-Part of and claims priority to U.S. patent application Ser. No. 16/562,314 filed Sep. 5, 2019, now U.S. Pat. No. 11,383,280 issued Jul. 12, 2022, which is a Continuation-In-Part of and claims priority to U.S. patent application Ser. No. 16/028,173 filed Jul. 5, 2018, now U.S. Pat. No. 11,045,851 issued Jun. 29, 2021, which is a Continuation-in-Part of and claims priority to U.S. patent application Ser. No. 15/898,515 filed Feb. 17, 2018, now U.S. Pat. No. 10,695,811 issued Jun. 30, 2020, which is a Continuation-in-Part and claims priority and the benefit of both U.S. Provisional Application Ser. No. 62/460,227 filed Feb. 17, 2017 and U.S. patent application Ser. No. 15/351,201 filed Nov. 14, 2016, now U.S. Pat. No. 10,189,063 issued Jan. 29, 2019, which is a Continuation-in-Part and claims priority and the benefit of both U.S. Provisional Application Ser. No. 62/313,500 filed Mar. 25, 2016 and U.S. patent application Ser. No. 14/222,468 filed Mar. 21, 2014, which claims priority to and the benefit of U.S. Provisional Application Ser. No. 61/804,560 filed Mar. 22, 2013; the contents of all of the foregoing are hereby incorporated by reference.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

The present disclosure relates to metals technology in general, but more specifically to extrusion and sheet metal technology.

BACKGROUND

Increased needs for fuel efficiency in transportation coupled with ever increasing needs for safety and regulatory compliance have focused attention on the development and utilization of new materials and processes. In many instances, impediments to entry into these areas has been caused by the lack of effective and efficient manufacturing methods. For example, the ability to replace steel car parts with materials made from magnesium or aluminum or their associated alloys is of great interest. Additionally, the ability to form hollow parts with equal or greater strength than solid parts is an additional desired end. Previous attempts have failed or are subject to limitations based upon a variety of factors, including the lack of suitable manufacturing process, the expense of using rare earths in alloys to impart desired characteristics, and the high energy costs for production.

What is needed is a process and device that enables the production of items such as components in automobile or aerospace vehicles with hollow cross sections that are made from materials such as magnesium or aluminum with or without the inclusion of rare earth metals. What is also needed is a process and system for production of such items that is more energy efficient, capable of simpler implementation, and produces a material having desired grain sizes, structure and alignment so as to preserve strength and provide sufficient corrosion resistance. What is also needed is a simplified process that enables the formation of such structures directly from billets, powders or flakes of material without the need for additional processing steps. What is also needed is a new method for forming high entropy alloy materials that is simpler and more effective than current processes. The present disclosure provides a description of significant advance in meeting these needs.

Over the past several years researchers at the Pacific Northwest National Laboratory have developed a novel Shear Assisted Processing and Extrusion (ShAPE) technique which uses a rotating ram or die rather than a simply axially fed ram or die as is used in the conventional extrusion process. As described hereafter as well as in the in the previously cited, referenced, and incorporated patent applications, this process and its associated devices provide a number of significant advantages including reduced power consumption, better material properties and enables a whole new set of "solid phase" types of forming process and machinery. Deployment of the advantages of these processes and devices are envisioned in a variety of industries and applications including but not limited to transportation, projectiles, high temperature applications, structural applications, nuclear applications, and corrosion resistance applications.

Various additional advantages and novel features of the present invention are described herein and will become further readily apparent to those skilled in this art from the following detailed description. In the preceding and following descriptions we have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

Specific problems have hampered the metallurgic industry, for example, joining magnesium to aluminum can be troublesome because of the formation of brittle, $Mg_{17}Al_{12}$, intermetallics (IMC) at the dissimilar interface. Conventional welding such as tungsten inert gas [1], electron beam [2], laser [3], resistance spot [4] and compound casting [5] are notorious for thick, brittle, $Mg_{17}Al_{12}$ interfacial layers since both the Mg and Al go through melting and solidification.

In an effort to reduce the deleterious effects of $Mg_{17}Al_{12}$, many techniques have been employed. For example, diffusion bonding, ultrasonic spot welding, electrical discharge riveting, and friction stir approaches. Friction stir welding (FSW), and its many derivatives, has received some attention, but researches have yet to adequately address the fundamental problem of forming brittle $Mg_{17}Al_{12}$ interfacial layers at the dissimilar interface.

Additionally, certain very useful materials such as Mg materials can have an increased use if cost was less of a barrier. For example, in the automotive industry, cost is the first major barrier for using Mg sheet materials. Unlike aluminum and steel, Mg alloys cannot be hot-rolled easily in the as-cast condition due to a propensity for cracking. As such, Mg alloys are typically rolled by twin roll casting process or use a multi-step hot rolling, making the sheet forming process expensive. Cold rolling is even more susceptible to cracking and is therefore limited to small reduction ratios (i.e. low throughput), which also makes the process slow and costly.

Referring to FIG. 1, a brief description of traditional extrusion is shown in flow chart format. This traditional extrusion includes ingot formation, which is typically formed from mined material that is prepared in large ingots. Parts of these ingots are paired away and used as extrusion starting material. Prior to extrusion, the ingots undergo thermal process steps such as stress relief, phase conversion, and homogenization. This homogenization can take place over several hours, if not days, and the homogenization requires the heating to extreme temperatures such as 490° C. as for example with aluminum alloy 7075. As an example for AA7075, the ingots can be heated to this temperature over at least 11 hours, and then maintained at 430° C. for at least 20 hours. After homogenization, the material can be heated prior to extrusion. The heating can include warming the material to significant temperatures, such as 300-530° C. to soften the material, and then pushing the material through a die to provide the extruded product that can then be water quenched. Other alloy of aluminum, magnesium and many others listed in Table 1 also involve thermal treatments of billets prior to extrusion with each material in Table 1 requiring a time and temperature sequence specific to the alloy being extruded. The extruded AA7075 product can be solution heated at specific temperatures such as 450-480° C. for 30-120 minutes, and then the product can be artificially aged for a given amount of time at given temperatures that are specific to the material being heat treated. Aging can be performed for a minimum of 22 hours at 120° C. according to the ASTM handbook. Other alloy of aluminum, magnesium and many others listed in Table 1 also involve post-extrusion solution heat treatment and artificial aging with each material in Table 1 requiring a time and temperature sequence specific to the alloy being extruded.

The present disclosure overcomes many of the requirement of the prior art by removing steps entirely and providing extruded materials that are higher in quality than those prepared from these prior art methods.

SUMMARY

Shear-assisted extrusion processes for forming extrusions of a desired composition from a feedstock material are provided. The processes can include applying a rotational shearing force and an axial extrusion to the same location on the feedstock material using a die tool defined by a die face extending from a rim of the die face inwardly at an angle greater than zero in relation to a sidewall of the tool in at least one cross section.

Devices for performing shear-assisted extrusion are provided. The devices can include a die tool defined by a die face extending from a rim of the die face inwardly at an angle greater than zero in relation to a sidewall of the tool in at least one cross section.

Shear-assisted extrusion processes for forming extrusions of a desired composition from a feedstock material are provided that can include applying a rotational shearing force and an axial extrusion to the same location on the feedstock material using a die tool defining an opening configured to receive feedstock material for extrusion and further defining a die face defining a recess within the face and contiguous with the opening.

Devices for performing shear-assisted extrusion are also provided that can include a die tool defining an opening configured to receive feedstock material for extrusion and further defining a die face defining a recess within the face and contiguous with the opening.

Shear-assisted extrusion process processes are also provided that can include: applying a rotational shearing force and an axial extrusion force to the feedstock material using a die tool defining a die face and an opening within the die face configured to receive feedstock material for extrusion; mixing different portions of the feedstock material within a recess about the opening prior to feedstock material entering the opening; and extruding the mixed portions.

The present description provides examples of shear-assisted extrusion processes for forming non-circular hollow-profile extrusions of a desired composition from feedstock material. At a high-level this is accomplished by simultaneously applying a rotational shearing force and an axial extrusion force to the same location on the feedstock material using a scroll face with a plurality of grooves defined therein. These grooves are configured to direct plasticized material from a first location, typically on the interface between the material and the scroll face, through a portal defined within the scroll face to a second location, typically upon a die bearing surface. At this location the separated streams of plasticized material are recombined and reconfigured into a desired shape having the preselected characteristics.

In some applications the scroll face has multiple portals, each portal configured to direct plasticized material through the scroll face and to recombine at a desired location either unified or separate. In the particular application described the scroll face has two sets of grooves, one set to direct material from the outside in and another configured to direct material from the inside out. In some instances, a third set of grooves circumvolves the scroll face to contain the material and prevent outward flashing.

This process provides a number of advantages including the ability to form materials with better strength and corrosion resistance characteristics at lower temperatures, lower forces, and with significantly lower extrusion force and electrical power than required by other processes.

For example, in one instance the extrusion of the plasticized material is performed at a die face temperature less than 150° C. In other instances the axial extrusion pressure is at or below 50 MPa. In one particular instance a magnesium alloy in billet form was extruded into a desired form in an arrangement wherein the axial extrusion pressure is at or below 25 MPa, and the temperature is less than 100° C. While these examples are provided for illustrative reasons, it is to be distinctly understood that the present description also contemplates a variety of alternative configurations and alternative embodiments.

Another advantage of the presently disclosed embodiment is the ability to produce high quality extruded materials from a wide variety of starting materials including, billets flakes powders, etc. without the need for additional pre or post processing to obtain the desired results. In addition to the process, the present disclosure also provides exemplary descriptions of a device for performing shear-assisted extrusion. In one configuration this device has a scroll face configured to apply a rotational shearing force and an axial extrusion force to the same preselected location on material wherein a combination of the rotational shearing force and the axial extrusion force upon the same location cause a portion of the material to plasticize. The scroll face further has at least one groove and a portal defined within the scroll face. The groove is configured to direct the flow of plasticized material from a first location (typically on the face of the scroll) through the portal to a second location (typically on the back side of the scroll and in some place along a mandrel that has a die bearing surface) wherein the plasticized material recombines after passage through the scroll face to form an extruded material having preselected features at or near these second locations.

This process provides for a significant number of advantages and industrial applications. For example, this technology enables the extrusion of metal wires, bars, and tubes used for vehicle components with 50 to 100 percent greater ductility and energy absorption over conventional extrusion technologies, while dramatically reducing manufacturing costs; this while being performed on smaller and less expensive machinery than what is used in conventional extrusion equipment. Furthermore, this process yields extrusions from lightweight materials like magnesium and aluminum alloys with improved mechanical properties that are impossible to achieve using conventional extrusion, and can go directly from powder, flake, or billets in just one single step, which dramatically reduces the overall energy consumption and process time compared to conventional extrusion.

Applications of the present processes and devices could, for example, be used to form parts for the front end of an automobile wherein it is predicted that a 30 percent weight savings can be achieved by replacing aluminum components with lighter-weight magnesium, and a 75 percent weight savings can be achieved by replacing steel with magnesium. Typically processing into such embodiments have required the use of rare earth elements into the magnesium alloys to achieve properties suitable for structural energy absorption applications. However, these rare earth elements are expensive and rare and in many instances are found in areas of difficult circumstances, making magnesium extrusions too expensive for all but the most exotic vehicles. As a result, less than 1 percent of the weight of a typical passenger vehicle comes from magnesium. The processes and devices described hereafter, however, enable the use of non-rare earth magnesium alloys to achieve comparable results as those alloys that use the rare earth materials. This results in additional cost saving in addition to a tenfold reduction in power consumption—attributed to significantly less force required to produce the extrusions—and smaller machinery footprint requirements.

As a result, the present technology could find ready adaptation in the making of lightweight magnesium components for automobiles such as front end bumper beams and crush cans. In addition to the automobile, deployments of the present invention can drive further innovation and development in a variety of industries such as aerospace, electric power industry, semiconductors and more. For example, this technique could be used to produce creep-resistant steels for heat exchangers in the electric power industry, and high-conductivity copper and advanced magnets for electric motors. It has also been used to produce high-strength aluminum rods for the aerospace industry, with the rods extruded in one single step, directly from powder, with twice the ductility compared to conventional extrusion. In addition, the solid-state cooling industry is investigating the use of these methods to produce semiconducting thermoelectric materials.

The process of the present disclosure allows precise control over various features such as grain size and crystallographic orientation—characteristics that determine the mechanical properties of extrusions, like strength, ductility and energy absorbency. The technology produces a grain size for magnesium and aluminum alloys at an ultra-fine regime (<1 micrometer), representing a 10 to 100 times reduction compared to the starting material. In magnesium, the crystallographic orientation can be aligned away from the extrusion direction, which is what gives the material such high energy absorption by eliminating anisotropy between tensile and compressive strengths. A shift of 45 degrees has been achieved, which is ideal for maximizing energy absorption in magnesium alloys. Control over grain refinement and crystallographic orientation can be gained through adjustments to the geometry of the spiral groove, the spinning speed of the die, the amount of heat generated at the material-die interface and within the material, and the amount of force used to push the material through the die.

In addition, this extrusion process allows industrial-scale production of materials with tailored structural characteristics. Unlike severe plastic deformation techniques that are only capable of bench-scale products, ShAPE is scalable to industrial production rates, lengths, and geometries. In addition to control of the grain size, an additional layer of microstructural control has been demonstrated where grain size and texture can be tailored through the wall thickness of tubing—important because mechanical properties can now be optimized for extrusions depending on whether the final application experiences tension, compression, or internal pressure. This could make automotive components more resistant to failure during collisions while using much less material.

The process's combination of linear and rotational shearing results in up to 10 times lower extrusion force compared to conventional extrusion. This means that the size of hydraulic ram, supporting components, mechanical structure, and overall footprint can be scaled down dramatically compared to conventional extrusion equipment—enabling substantially smaller production machinery, lowering capital expenditures and operations costs. This process generates all the heat necessary for producing extrusions via friction at the interface between the system's billet and scroll-faced die and from plastic shear deformation within the extruding material, thus not requiring the pre-heating and external heating used by other methods. This results in dramatically reduced power consumption; for example, the 11 kW of electrical power used to produce a 2-inch diameter magnesium tube takes the same amount of power to operate a residential kitchen oven—a ten- to twenty-fold decrease in power consumption compared to conventional extrusion. Extrusion ratios up to 200:1 have been demonstrated for magnesium alloys using the described process compared to 50:1 for conventional extrusion, which means fewer to no repeat passes of the material through the machinery are needed to achieve the final extrusion diameter—leading to lower production costs compared to conventional extrusion.

Studies have shown a 10 times decrease in corrosion rate for extruded non-rare earth ZK60 magnesium performed under this process compared to conventionally extruded ZK60. This is due to the highly refined grain size and ability to break down, evenly distribute—and even dissolve—second-phase particles that typically act as corrosion initiation sites. The ShaPE process has also been used to clad magnesium extrusions with aluminum coating in order to reduce corrosion.

Shear-assisted extrusion processes for forming extrusions of a desired composition from feedstock materials are also provided. The processes can include applying a rotational shearing force and an axial extrusion from to the same location on the feedstock material using a scroll having a scroll face. The scroll face can have an inner diameter portion bounded by an outer diameter portion, and a member extending from the inner diameter portion beyond a surface of the outer diameter portion.

Devices for performing shear-assisted extrusion are also provided. The devices can include a scroll having a scroll face having in inner diameter portion bounded by an outer diameter portion, and a member extending from the inner diameter portion beyond a surface of the outer diameter portion.

Extrusion processes for forming extrusion of a desired composition from feedstock materials are also provided. The processes can include: providing feedstock for extrusion, with the feedstock comprising at least two different materials. The process can include engaging the materials with one another within a feedstock container, with the engaging defining an interface between the two different materials. The process can continue by extruding the engaged feedstock materials to form an extruded product comprising a first portion comprising one of the two materials bound to a second portion comprising the other of the two materials. In accordance with example implementations, with extensive refinement, it has been shown that billet made from castings can be extruded, in a single step, into high performance extrusions.

Extrusion feedstock materials are also provided that can include interlocked billets of feedstock materials. These interlocked billets can be used for joining dissimilar materials and alloys, for example.

Methods for preparing metal sheets are also provided. The methods can include: producing a metal tube via shear assisted processing and extrusion; opening the metal tube to form a sheet having a first thickness; and rolling the sheet to a second thickness that is less than the first thickness.

The present disclosure provides methods for producing an extruded product from a solid billet. The methods can include providing an as-cast billet for extrusion; applying a simultaneous rotational shear and axial extrusion force to the as-cast billet to plasticize the as-cast billet; and extruding the plasticized as-cast billet with an extrusion die to form an extruded product.

Methods for preparing extruded products from billets can also include: providing a billet for extrusion; while maintaining a majority of the billet below 100° C., applying a simultaneous rotational shear and axial extrusion force to one end of the billet to plasticize the one end of the billet; and extruding the plasticized one end of the billet with an extrusion die to form an extruded product.

Methods for preparing an extruded product from a billet can also include providing a billet for extrusion; applying a simultaneous rotational shear and axial extrusion force to the billet to plasticize the billet; extruding the plasticized billet with an extrusion die to form an extruded product; and artificially aging the extruded product for less than 10 hours.

Various advantages and novel features of the present disclosure are described herein and will become further readily apparent to those skilled in this art from the following detailed description. In the preceding and following descriptions, exemplary embodiments of the disclosure have been provided by way of illustration of the best mode contemplated for carrying out the disclosure. As will be realized, the disclosure is capable of modification in various respects without departing from the disclosure. Accordingly, the drawings and description of the preferred embodiment set forth hereafter are to be regarded as illustrative in nature, and not as restrictive.

The ShAPE processing and methods described herein may offer improvements to transportation applications, such as automotive industries, in which the strength to weight ratio of advanced aluminum alloys (or other alloys) is desirable. The methods and techniques described herein may be applied to other non-aluminum material systems.

Methods for preparing shear-assisted extruded materials from powder billets are provided. The methods can include providing a billet of material in substantially powder form; applying both axial and rotational pressure to the material to deform at least some of the material; and extruding the material to form an extruded product.

Methods for preparing shear-assisted extruded materials are provided. The methods can include applying both axial and rotational pressure to stock material to form extruded material at a rate, for example, between 2 and 13 m/min or higher speed.

Methods for preparing shear-assisted extruded materials are provided. The methods can include applying both axial and rotational pressure to stock material to form an extruded material; and aging the extruded material down to 3 hours or less.

Methods for preparing shear-assisted extruded materials are provided. The methods can include providing stock materials for shear-assisted extrusion; and applying both axial and rotational force to the stock material to form extruded material without decreasing the axial force during the extrusion.

DRAWINGS

Embodiments of the disclosure are described below with reference to the following accompanying drawings.

FIG. 1 provides a general overview of the state of the art of extrusion that includes ingot formation, stress relief, phase conversion, homogenization, billet pre-heating, extrusion, solution heating, and aging.

FIGS. 10A-10C are depictions of a die face according to an embodiment of the disclosure.

FIGS. 11A-11C are depictions of a die face according to an embodiment of the disclosure.

FIGS. 12A-12C are depictions of a die face according to an embodiment of the disclosure.

FIGS. 13A-13C are depictions of a die face according to an embodiment of the disclosure.

FIGS. 14A-14C are depictions of a die face according to an embodiment of the disclosure.

FIGS. 15A-15B are depictions of the use of a die face on starting materials according to an embodiment of the disclosure.

FIG. 16 is a depiction of the use of a die face on starting material according to an embodiment of the disclosure.

FIG. 25 again is data demonstrating reduced torque utilizing dies according to an embodiment of the disclosure.

Figure 26:
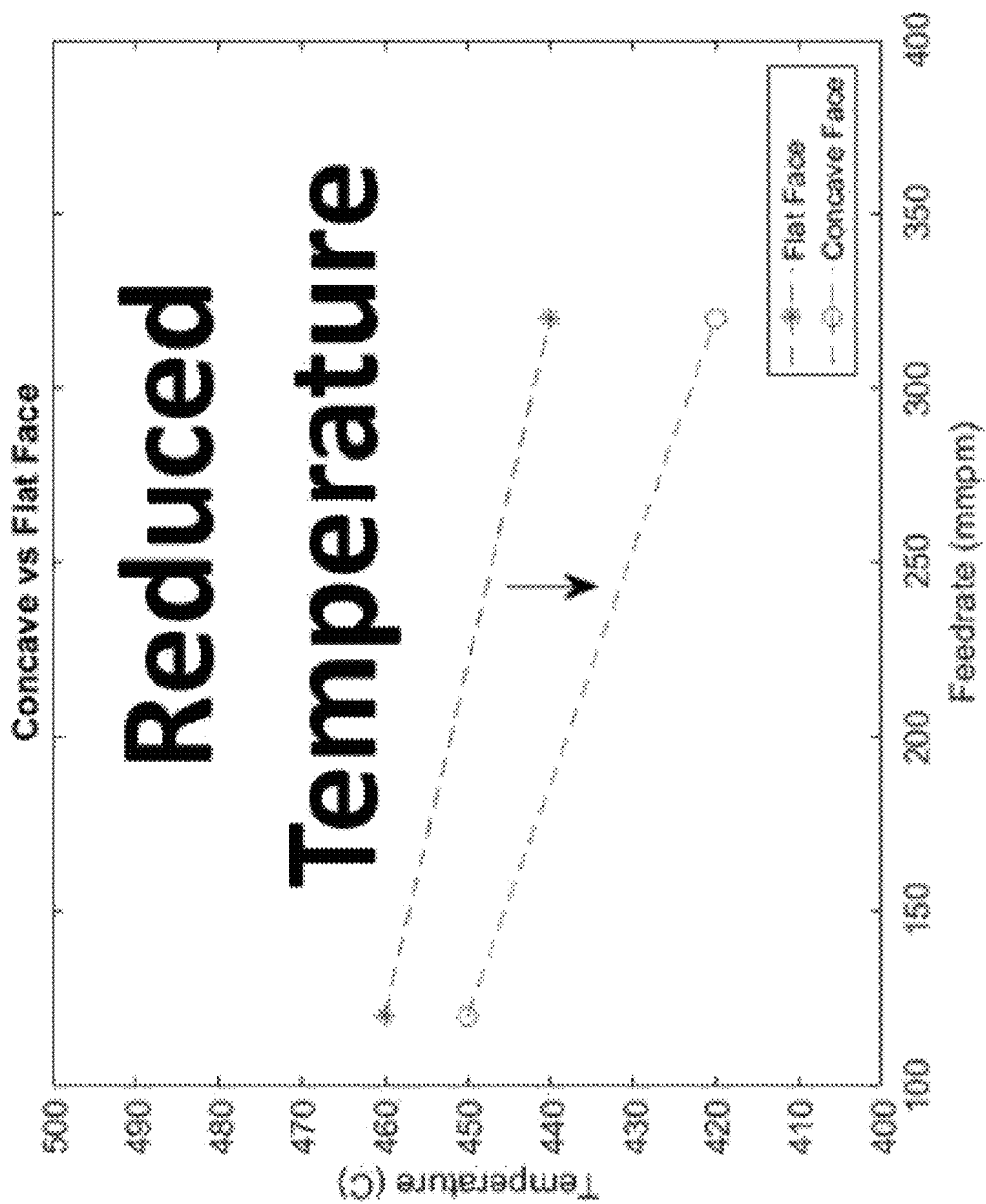

FIG. 26 is a depiction of data demonstrating reduced temperature utilizing dies according to an embodiment of the disclosure.

Figure 27:
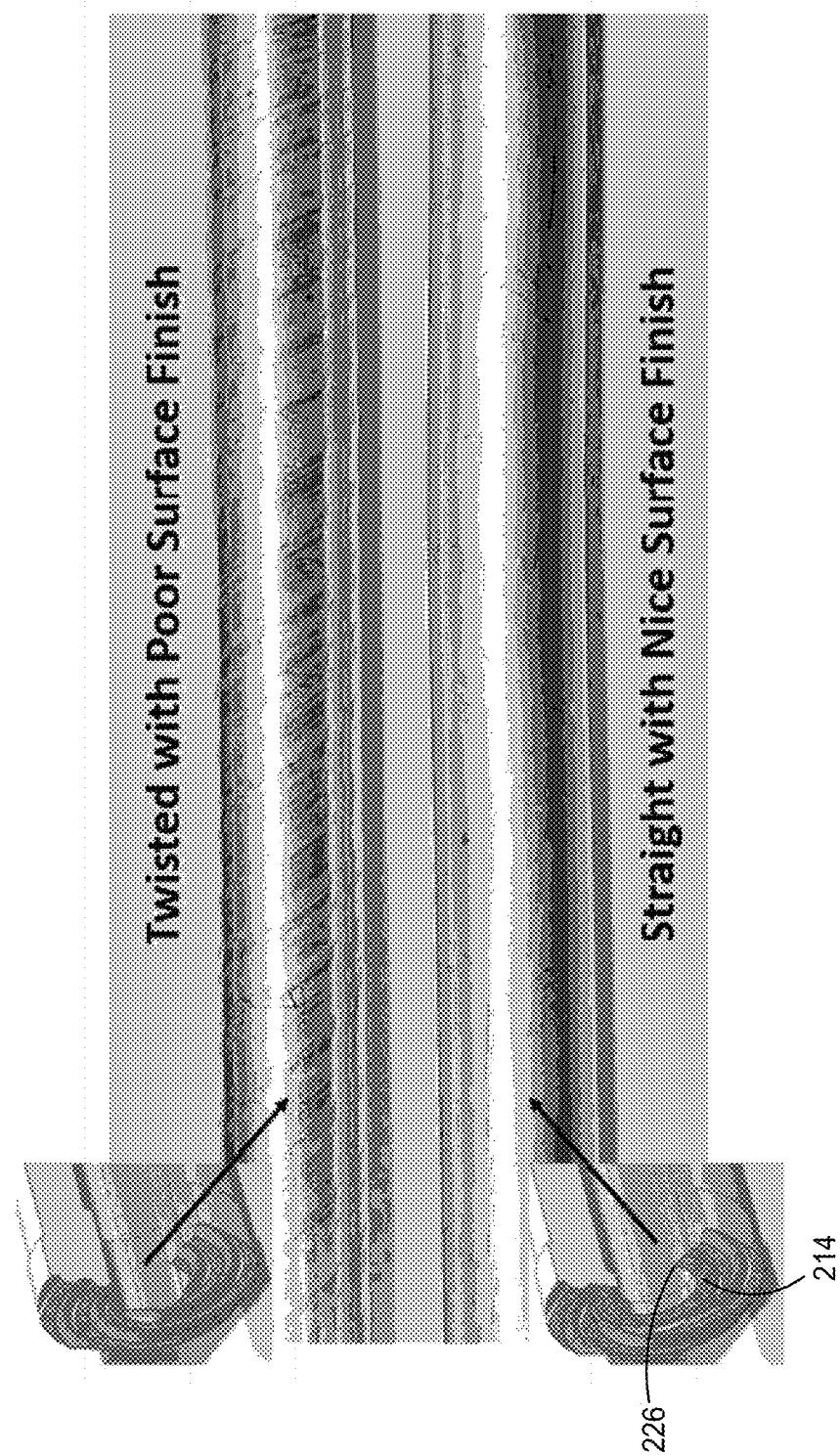

FIG. 27 is a depiction of dies corresponding to extruded materials according to an embodiment of the disclosure.

FIGS. 28-29 are depictions of dies corresponding to extruded materials according to an embodiment of the disclosure.

Figure 31:
Figure 30:
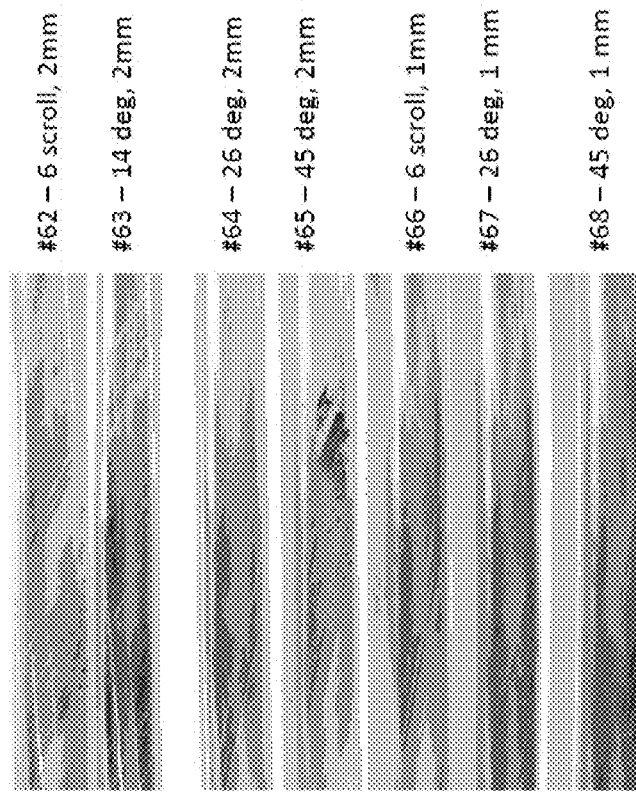

FIGS. 30-31 depict extruded product materials utilizing different dies according to an embodiment of the disclosure.

Figure 32:
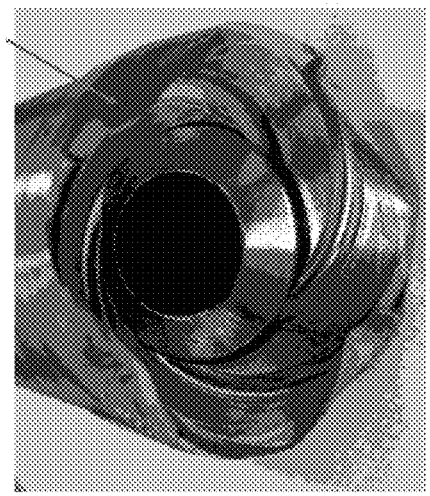

FIG. 32 is a die according to an embodiment of the disclosure.

Figure 33:
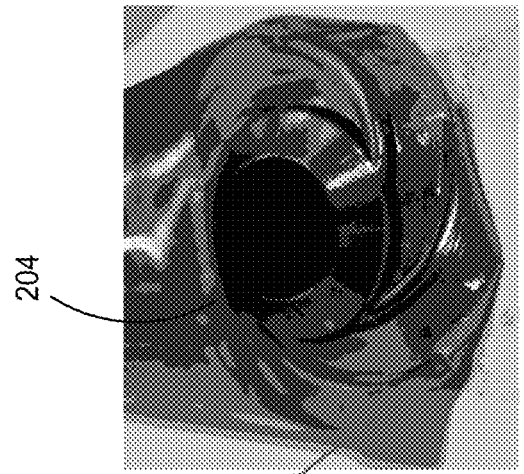

FIG. 33 is another die according to an embodiment of the disclosure.

Figure 34:
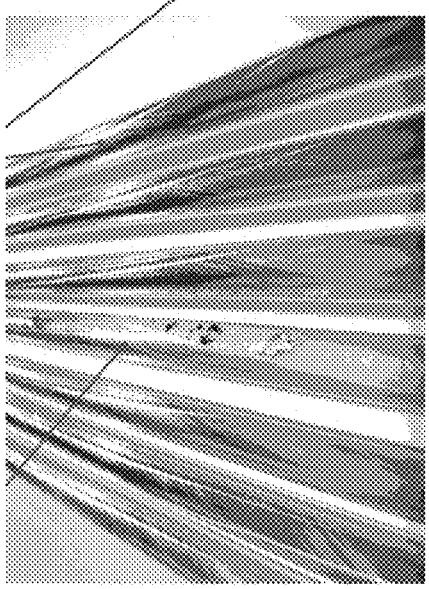

FIG. 34 is a depiction of extruded materials produced utilizing dies according to an embodiment of the disclosure.

Figure 35:
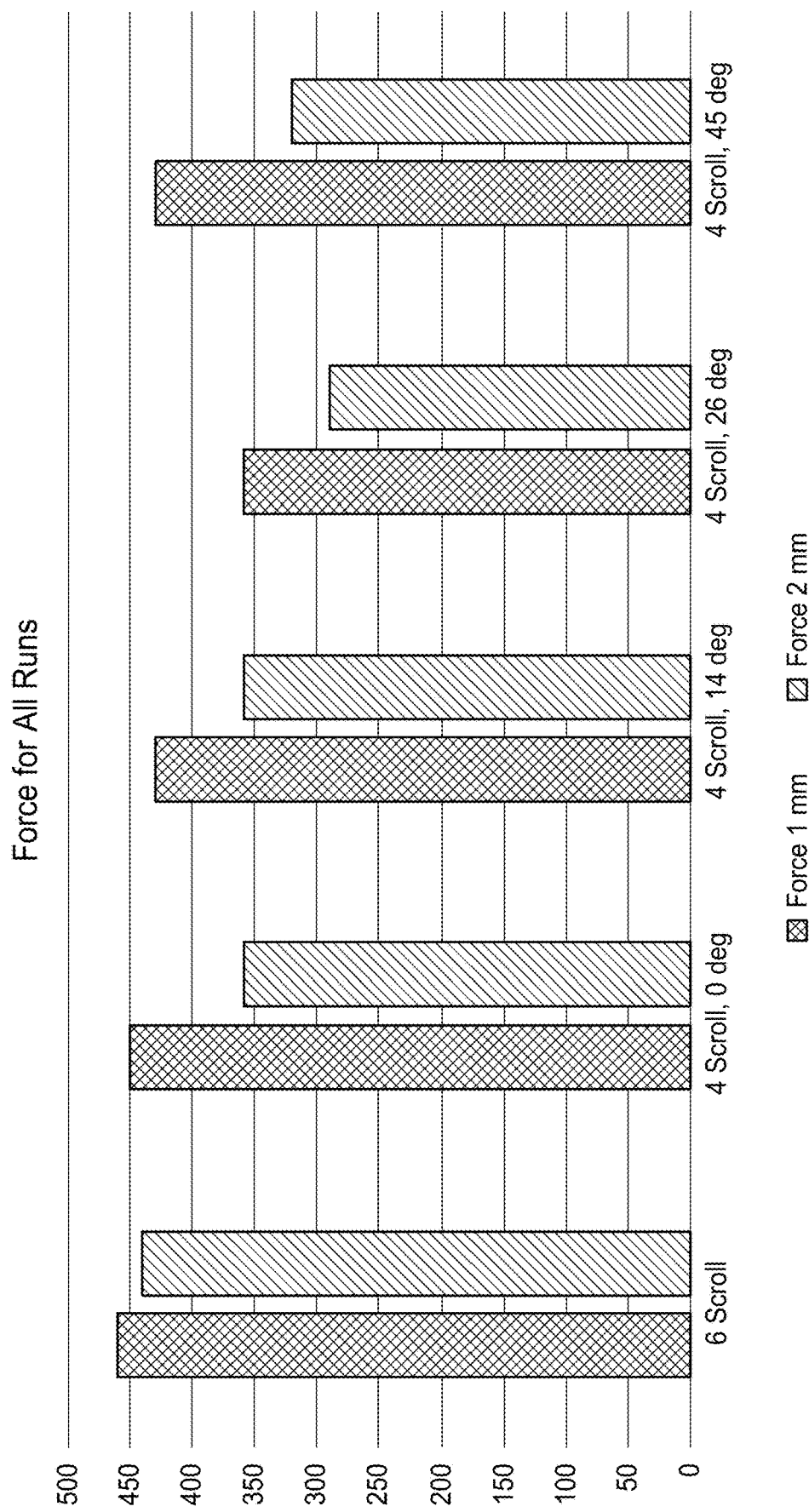

FIG. 35 is data for different dies according to an embodiment of the disclosure.

Figure 36:
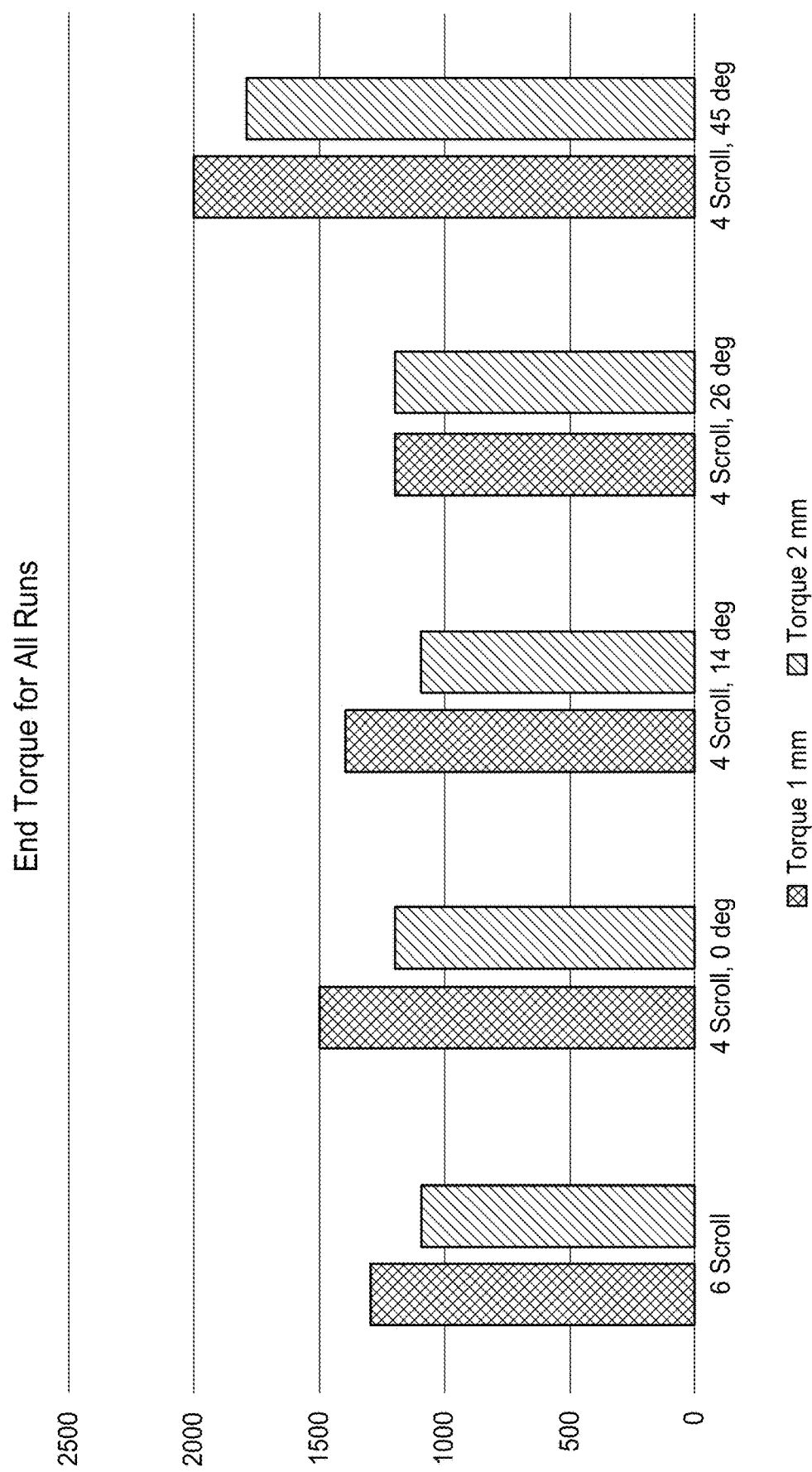

FIG. 36 is data acquired utilizing dies according to an embodiment of the disclosure.

Figure 37:
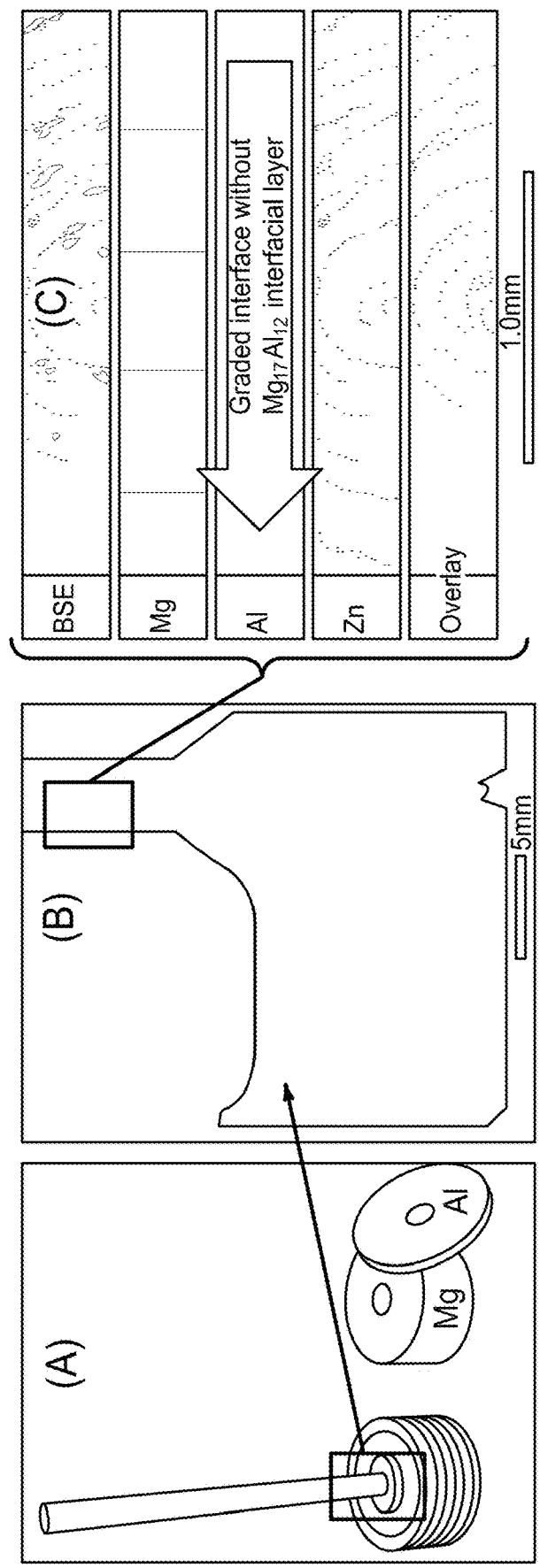

FIG. 37 is a series of photographs of extrusion of Mg—Al with consolidated cross sections, and in (B) showing gradient in composition between Mg and Al with absence of a $Mg_{17}Al_{12}$ interfacial layer at dissimilar interface (C).

Figure 38:
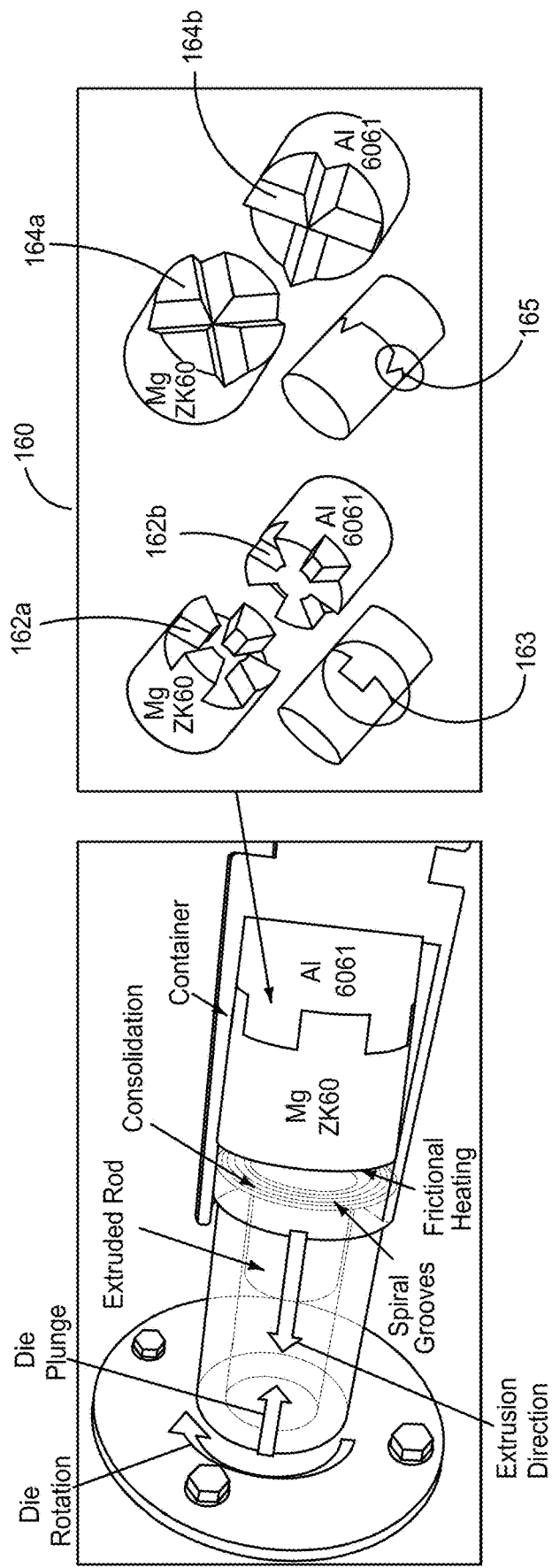

FIG. 38 is a depiction of an example extrusion assembly according to an embodiment of the disclosure and also a depiction of feedstock material engagements and/or feedstock interfaces according to an embodiment of the disclosure.

Figure 39:
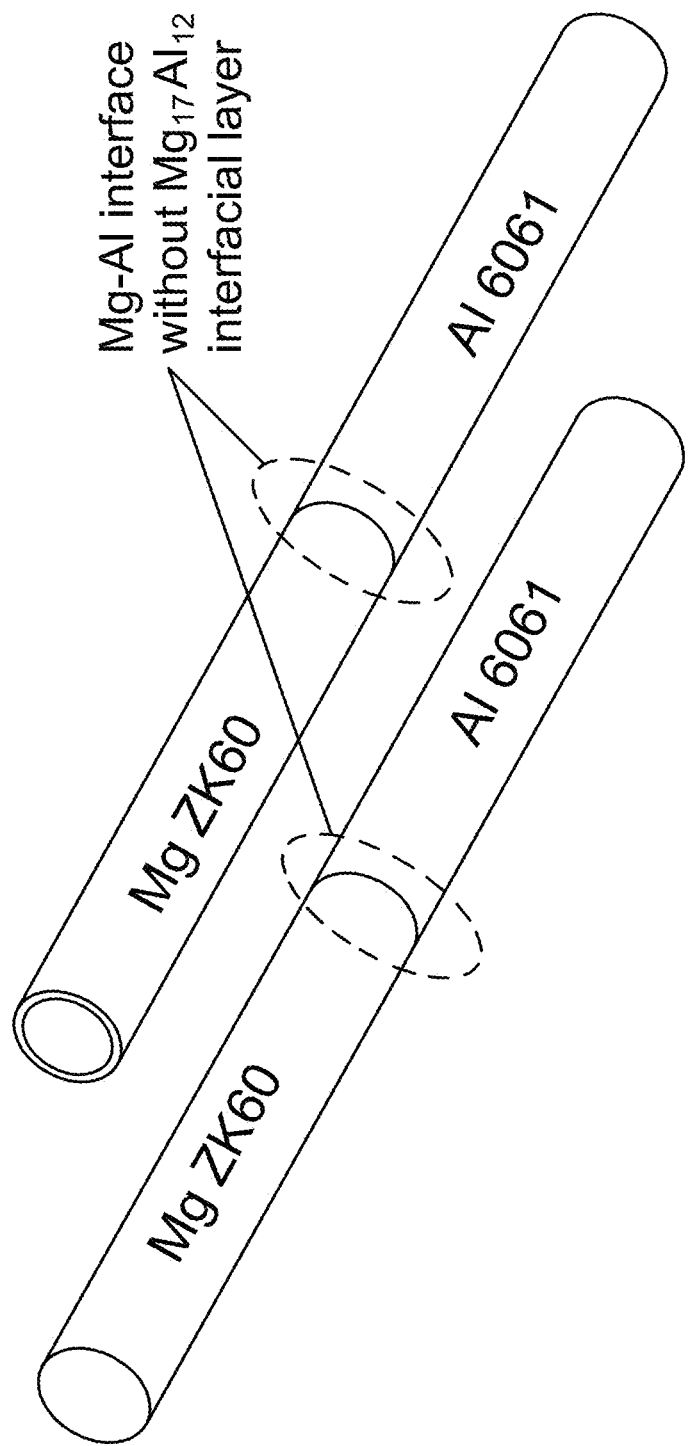

FIG. 39 is a depiction of extruded material having no $Mg_{17}Al_{12}$ interfacial layer.

Figure 40:
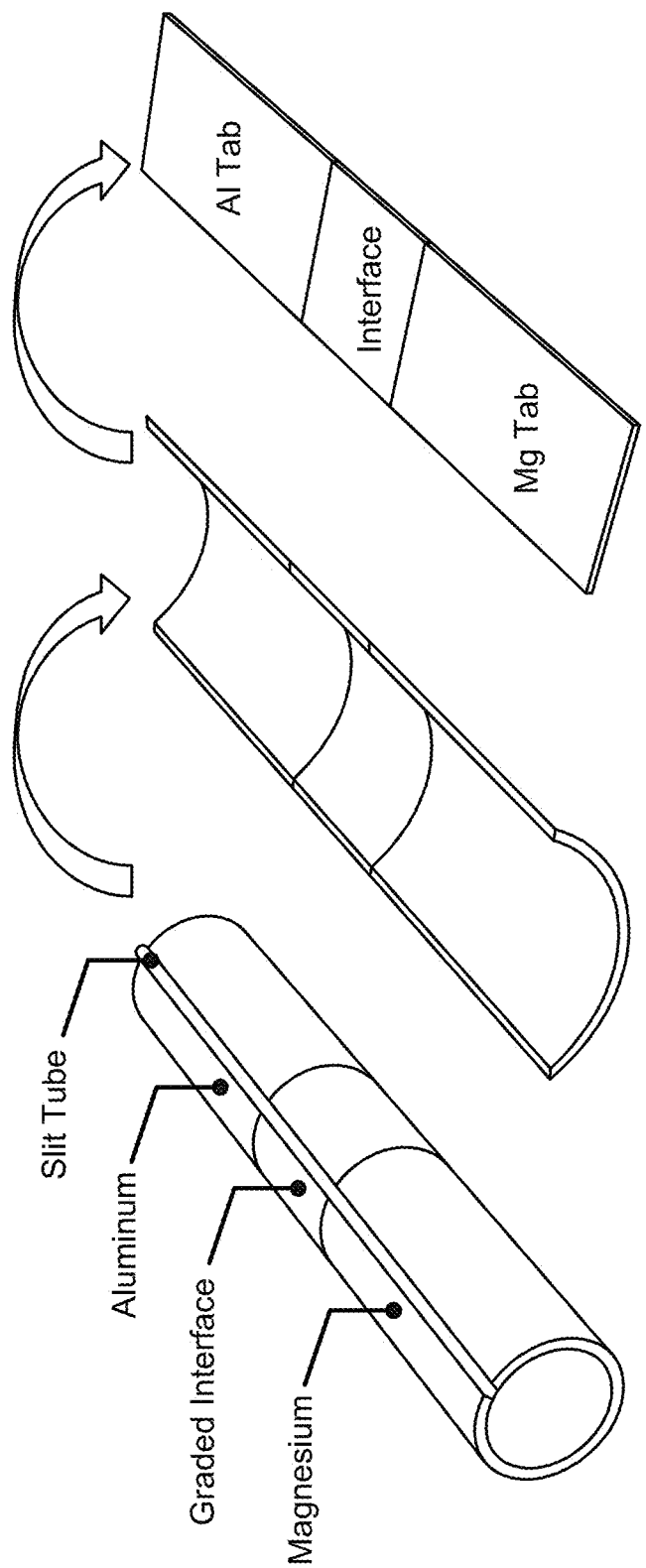

FIG. 40 is a depiction of extrusion material having a graded interface layer prepared using engaged feedstock materials according to an embodiment of the disclosure.

Figure 41:
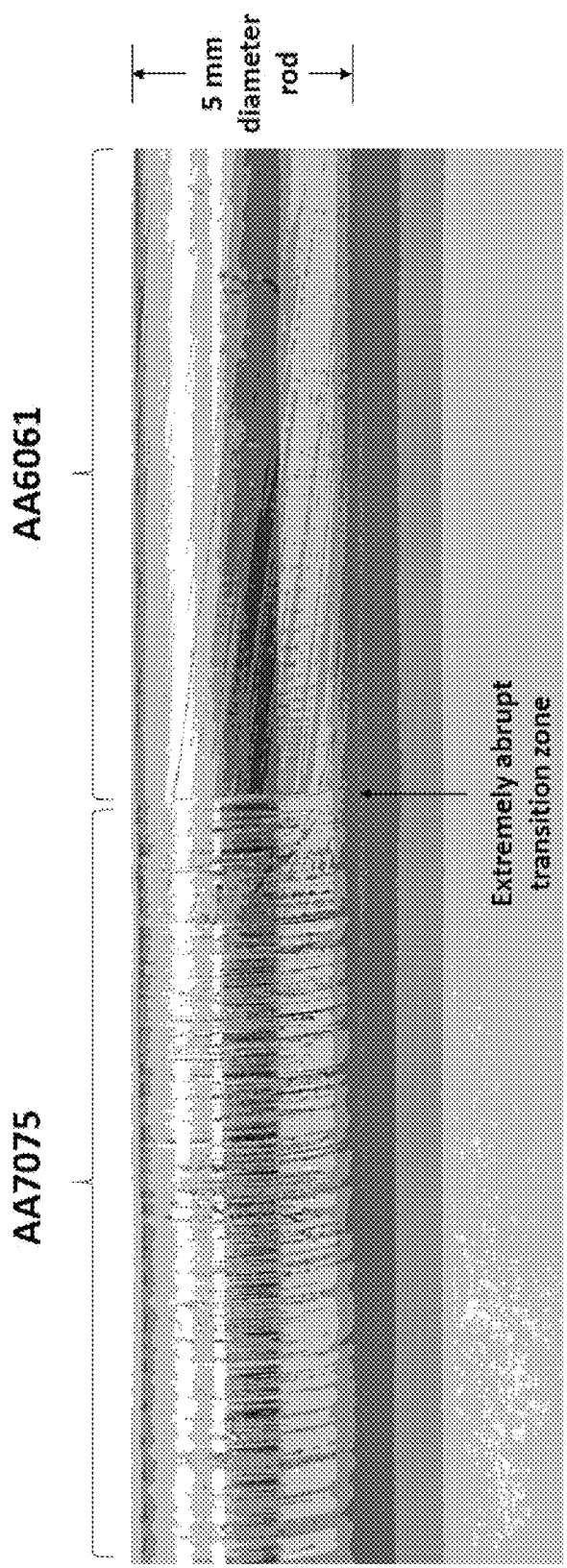

FIG. 41 is a depiction of two components, AA7075 and AA6061, bonded at an abrupt transition layer according to an embodiment of the disclosure.

Figure 42:
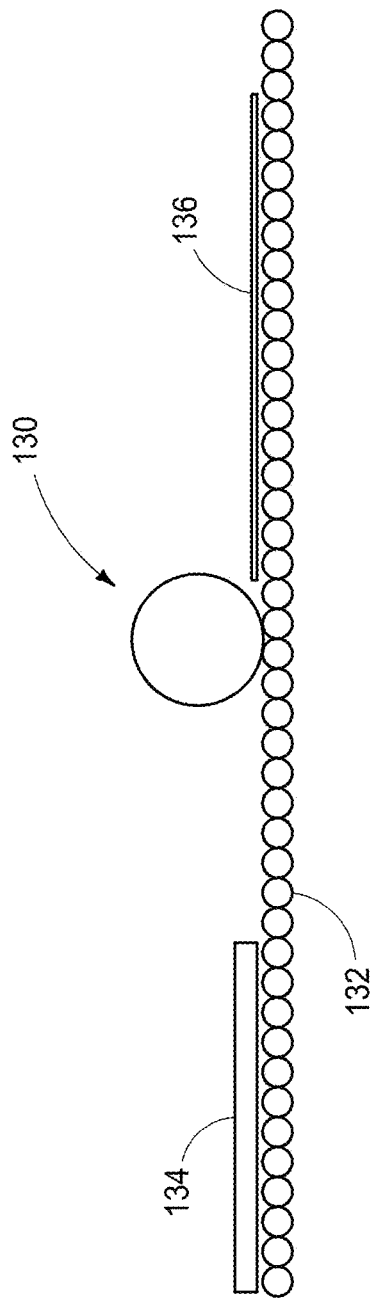

FIG. 42 is an example rolling mill assembly according to an embodiment of the disclosure.

Figure 43:
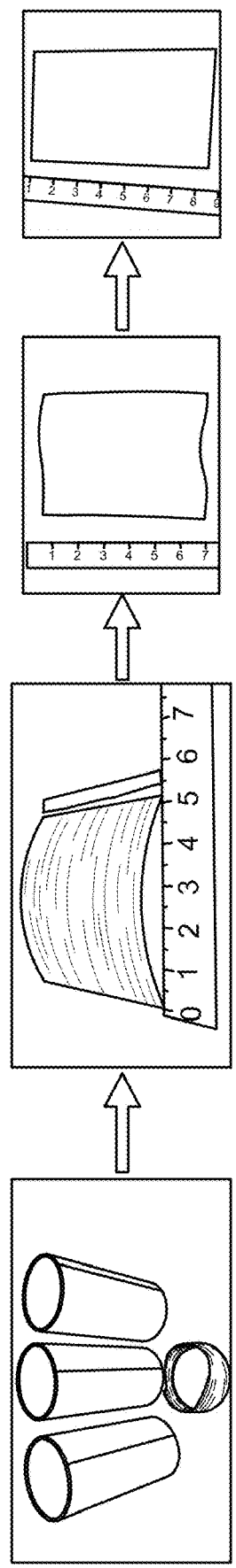

FIG. 43 demonstrates the process steps for preparing an extruded fabricated tube, the open tube, and the rolling of the tube according to an embodiment of the disclosure.

Figure 44A:
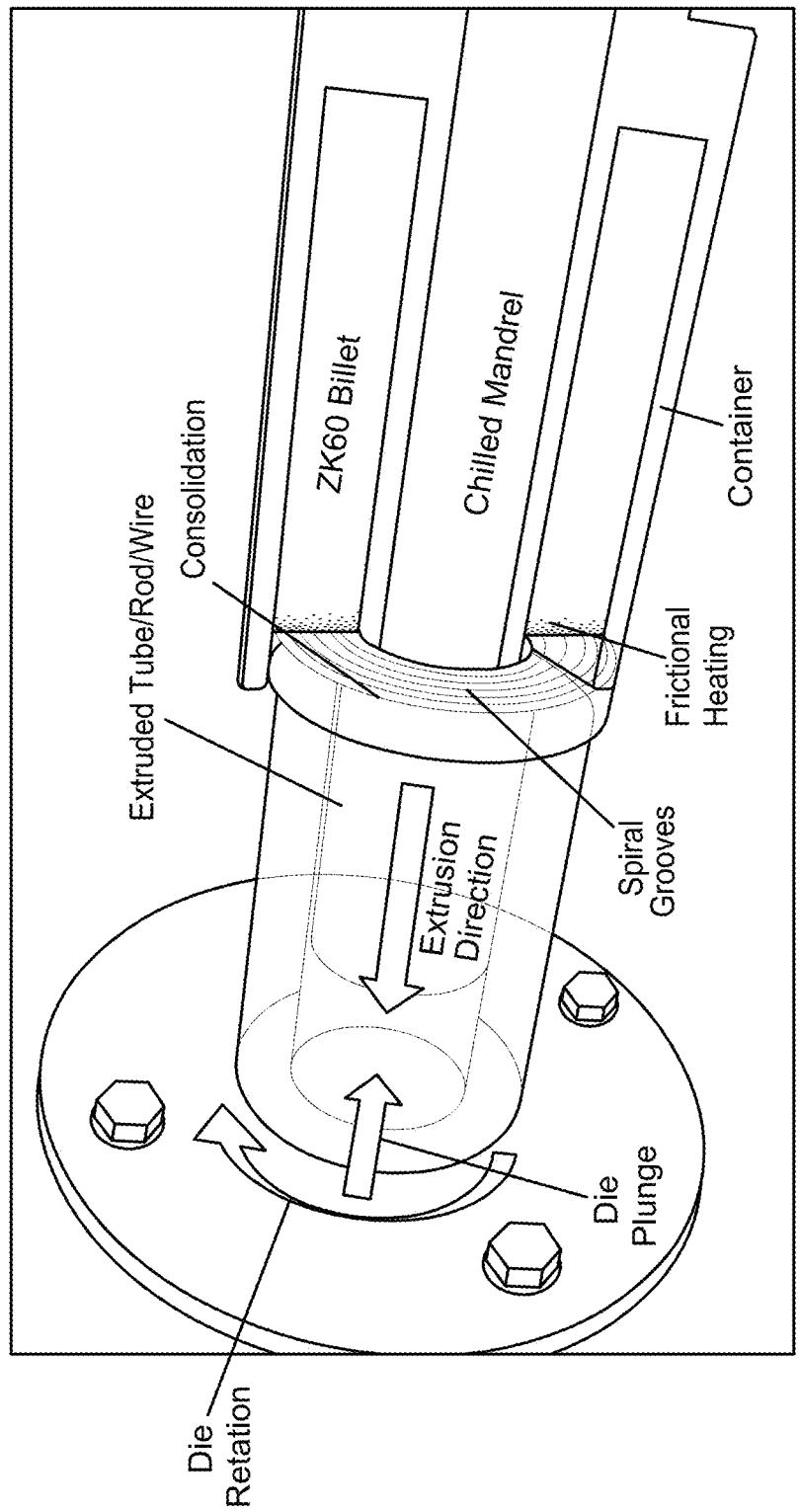
Figure 44B:
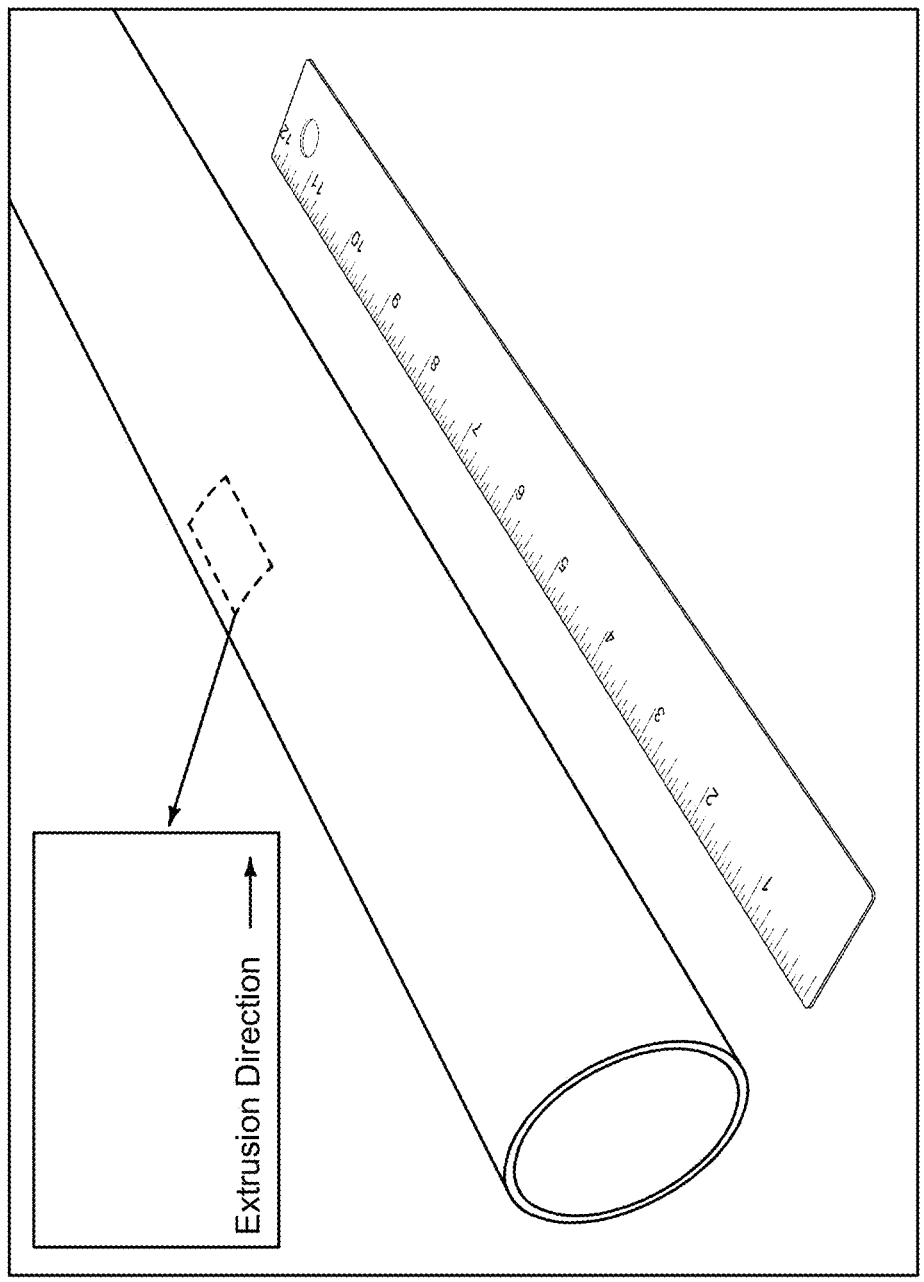

FIGS. 44A and 44B depict an example extrusion assembly according to an embodiment of the disclosure as well as example extruded material according to an embodiment of the disclosure.

Figure 45:
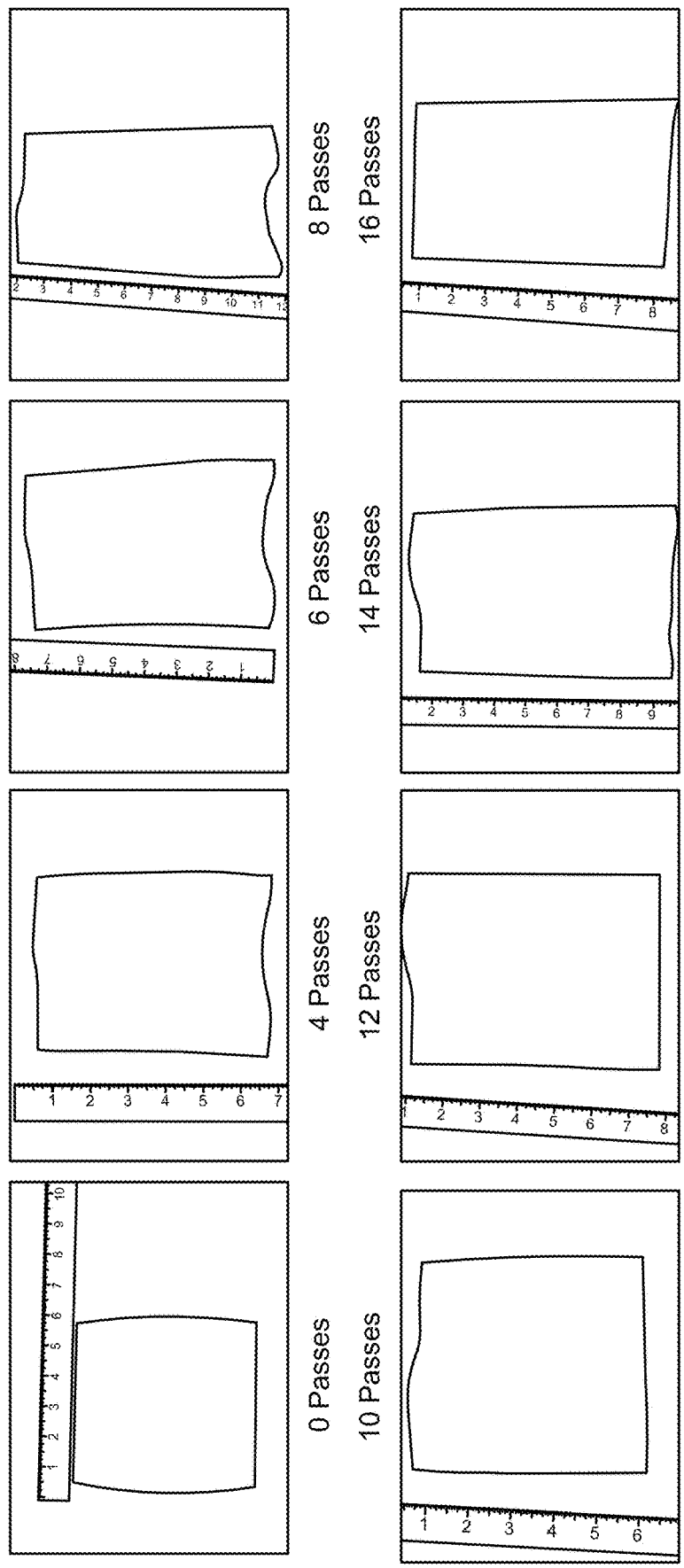

FIG. 45 demonstrates the process steps for preparing a metal sheet through to 16 passes according to an embodiment of the disclosure.

FIG. 46 demonstrates a 0.005 inch thick sheet in various configurations according to an embodiment of the disclosure.

Figure 47:
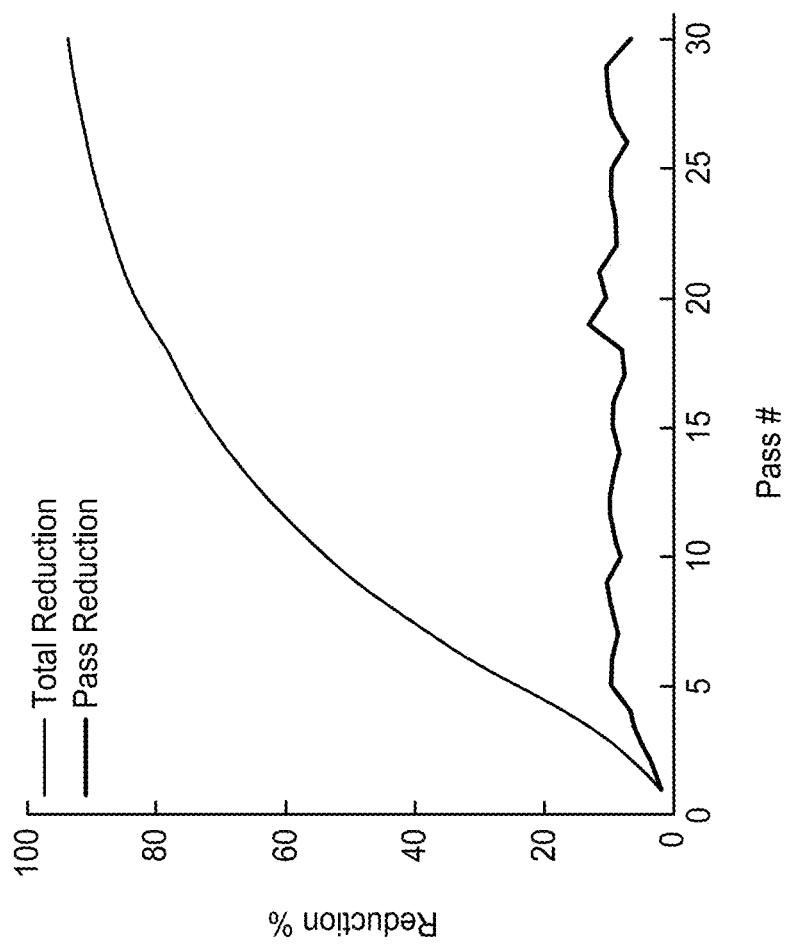

FIG. 47 shows reduction per rolling pass according to an embodiment of the disclosure.

Figure 48A:
Figure 48B:
Figure 48C:
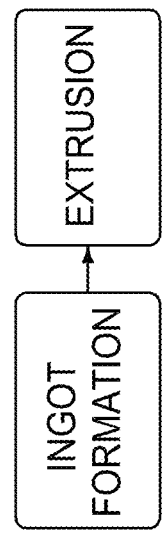

FIGS. 48A-48C demonstrate front end methods of preparing billets for extrusion. These methods are shown in FIG. 48A with ingot formation, stress relief, phase conversion, billet pre-heating, and extrusion; FIG. 48B with ingot formation, stress relief, phase conversion, homogenization, and extrusion; and FIG. 48C with ingot formation and extrusion.

Figure 49A:
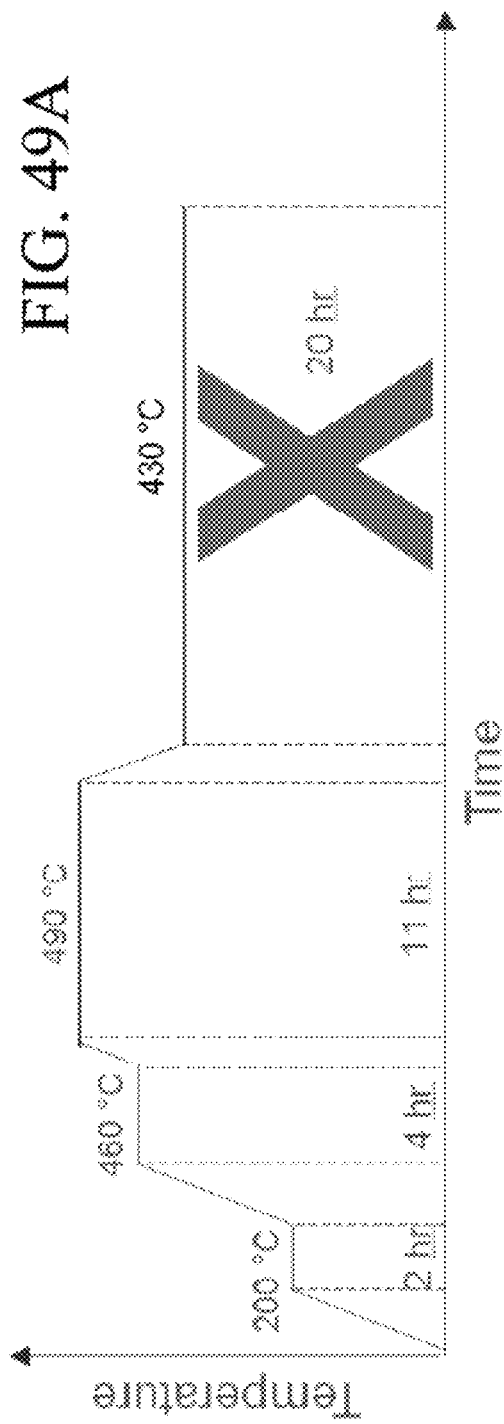
Figure 49B:
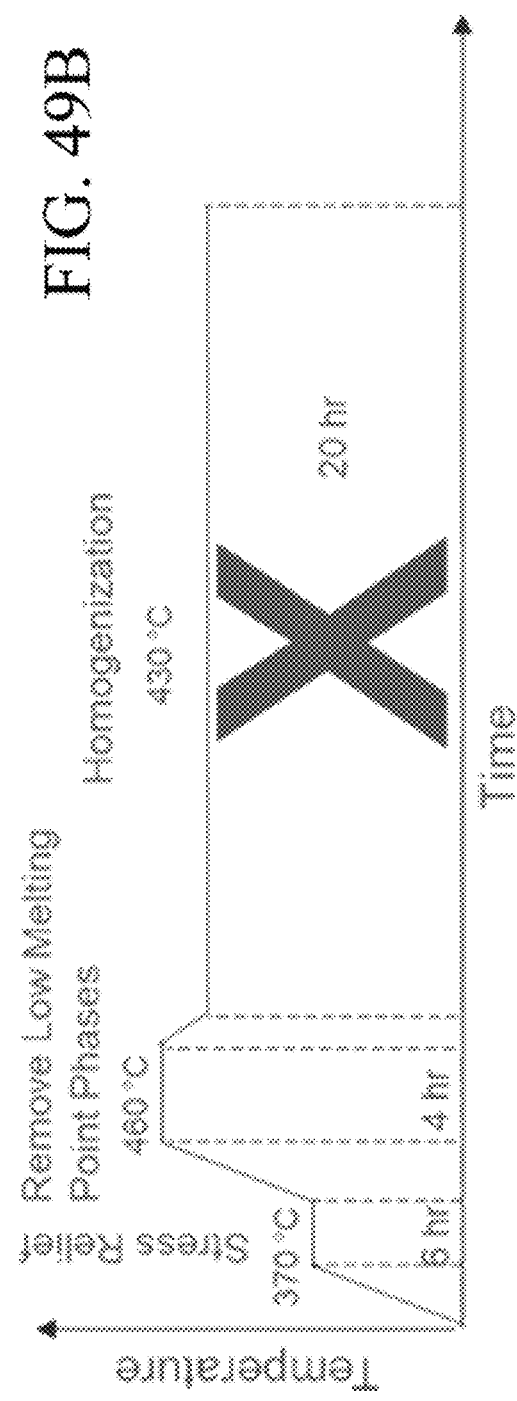

FIGS. 49A and 49B depict prior art methods of billet homogenization according to ASTM methods. As shown, a substantial amount of the time, at least 20 hours, is removed from the homogenization step.

Figure 50:
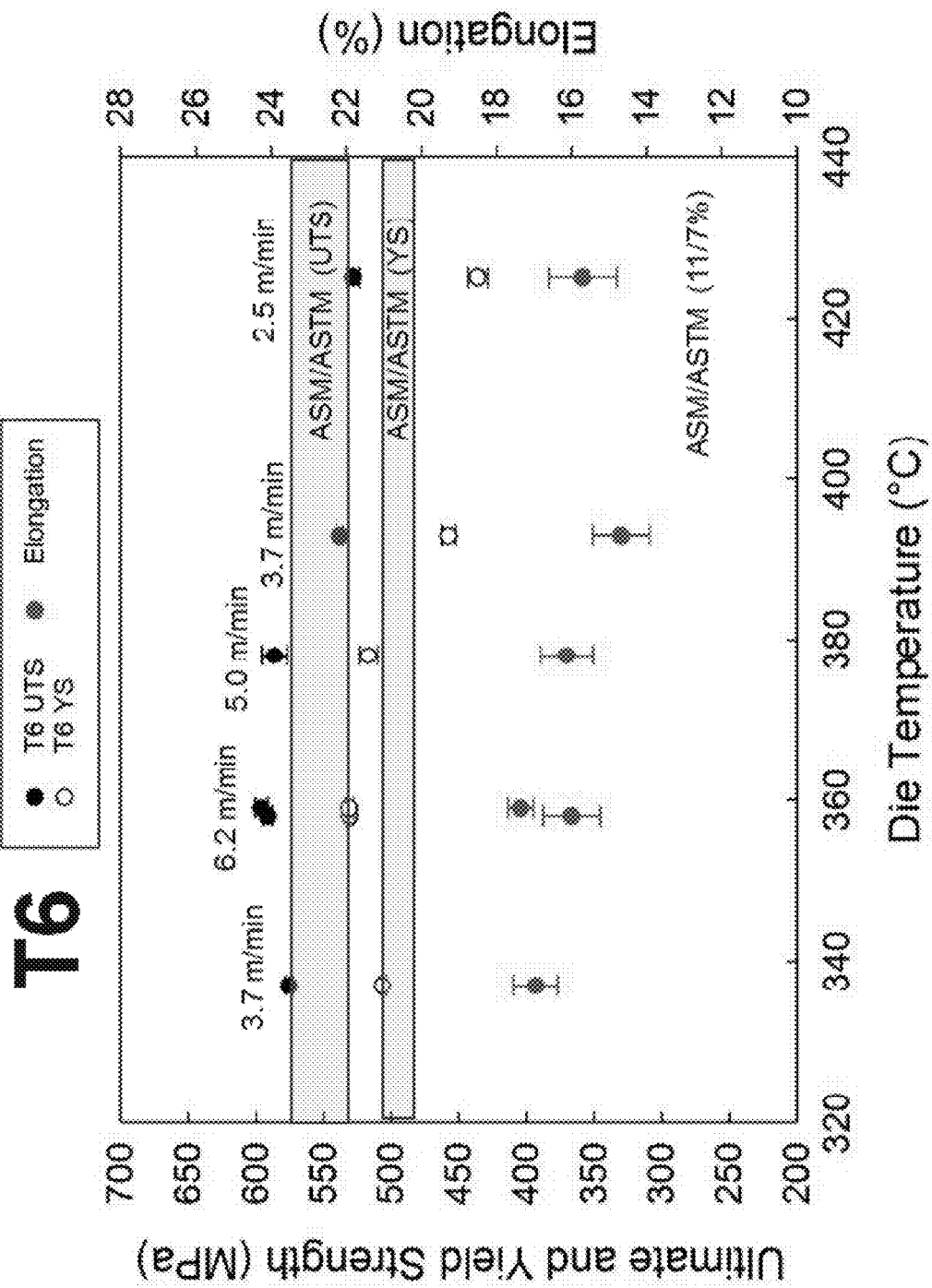

FIG. 50 is data of extruded product according to embodiments of the present disclosure.

Figure 51:
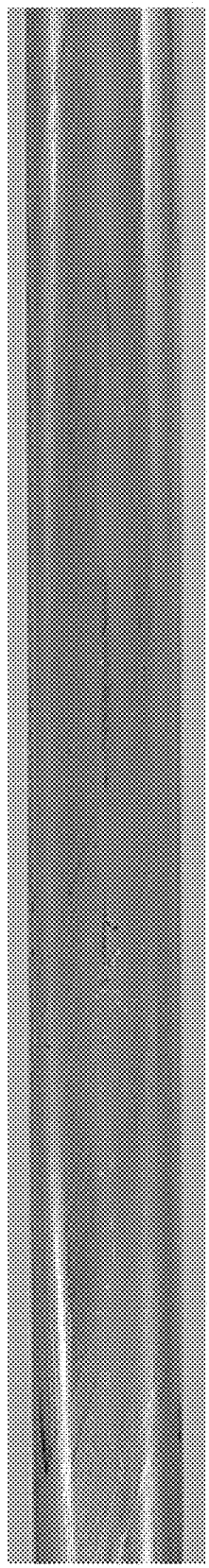

FIG. 51 is depiction of extruded product according to embodiments of the present disclosure.

Figure 52:
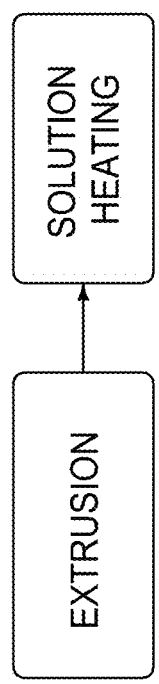

FIG. 52 is a stepwise depiction of extrusion and solution heating according to embodiments of the present disclosure.

Figure 53:
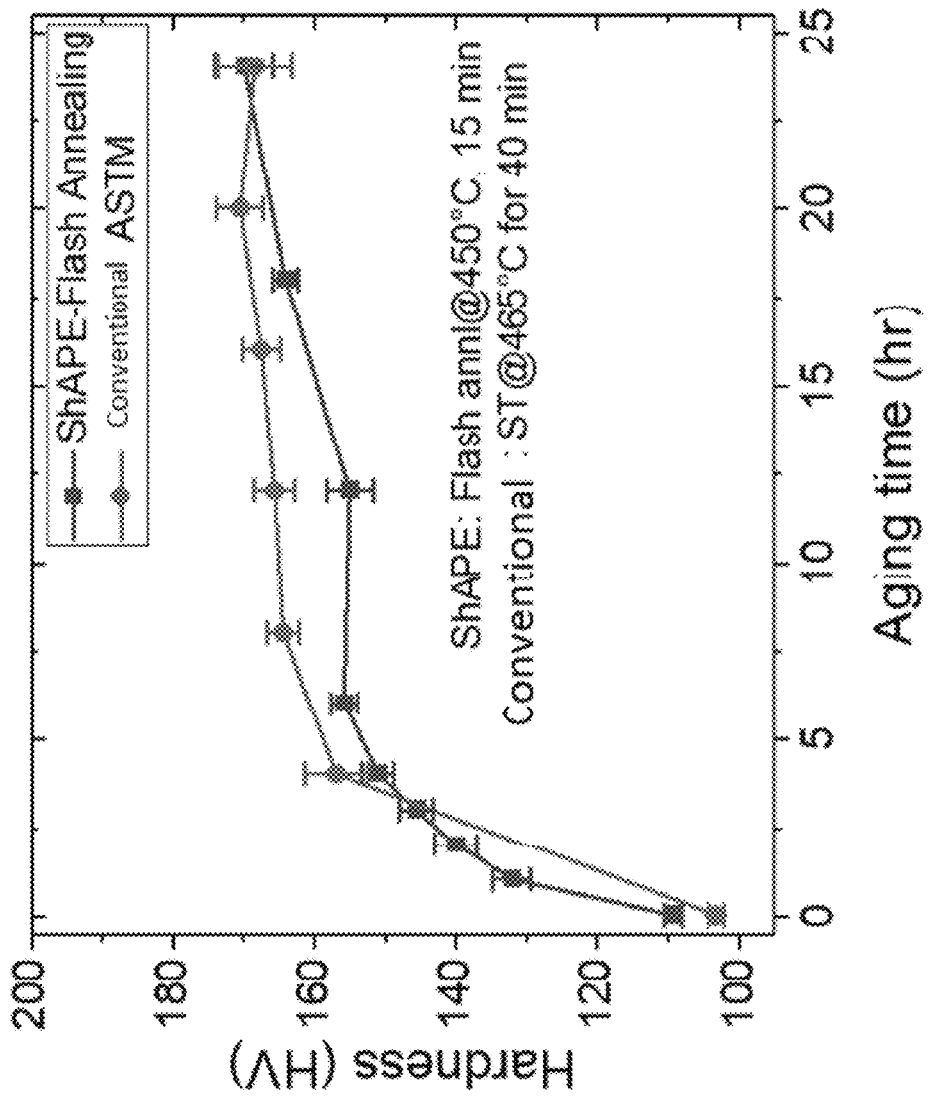

FIG. 53 is data acquired utilizing methods according to embodiments of the present disclosure.

Figure 54:
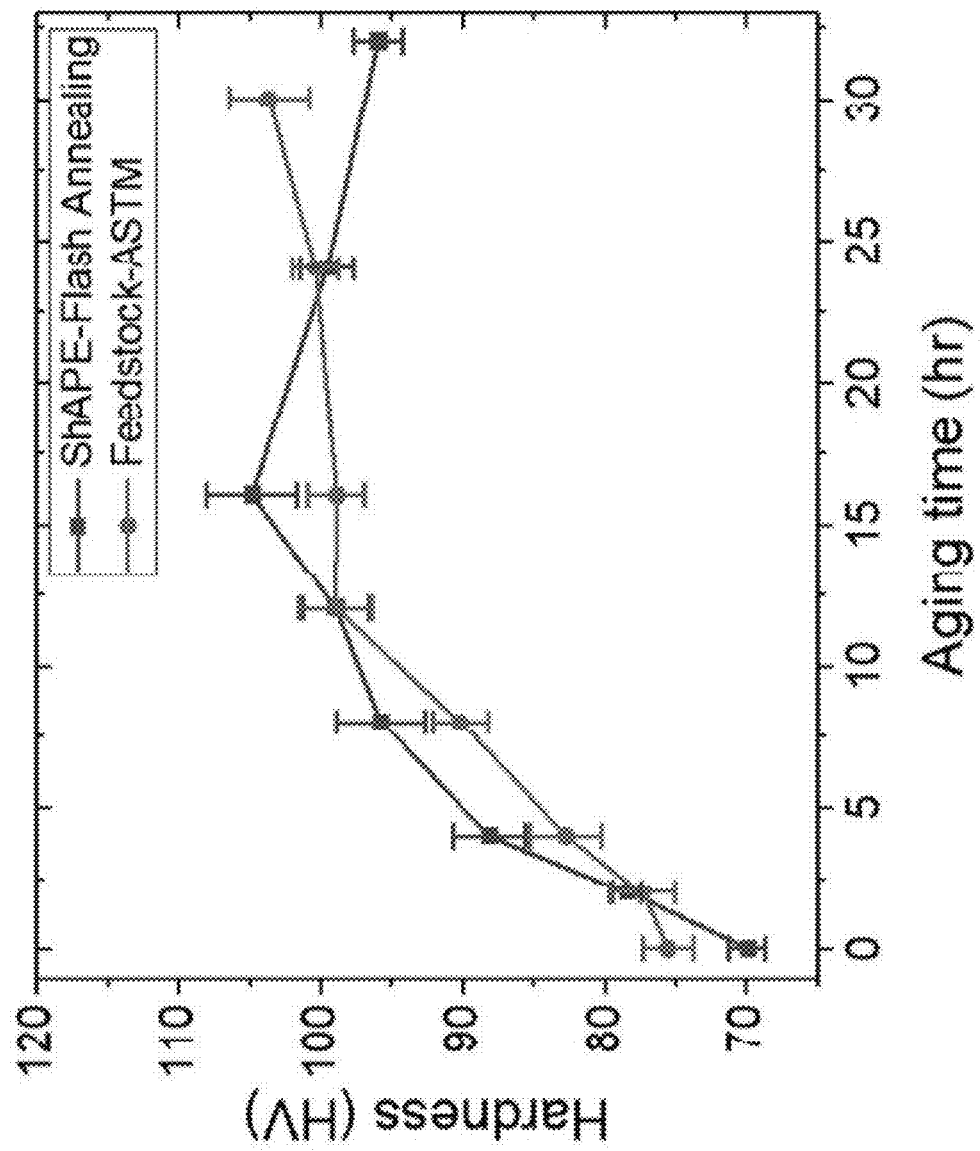

FIG. 54 is data acquired utilizing methods according to embodiments of the present disclosure.

Figure 55:
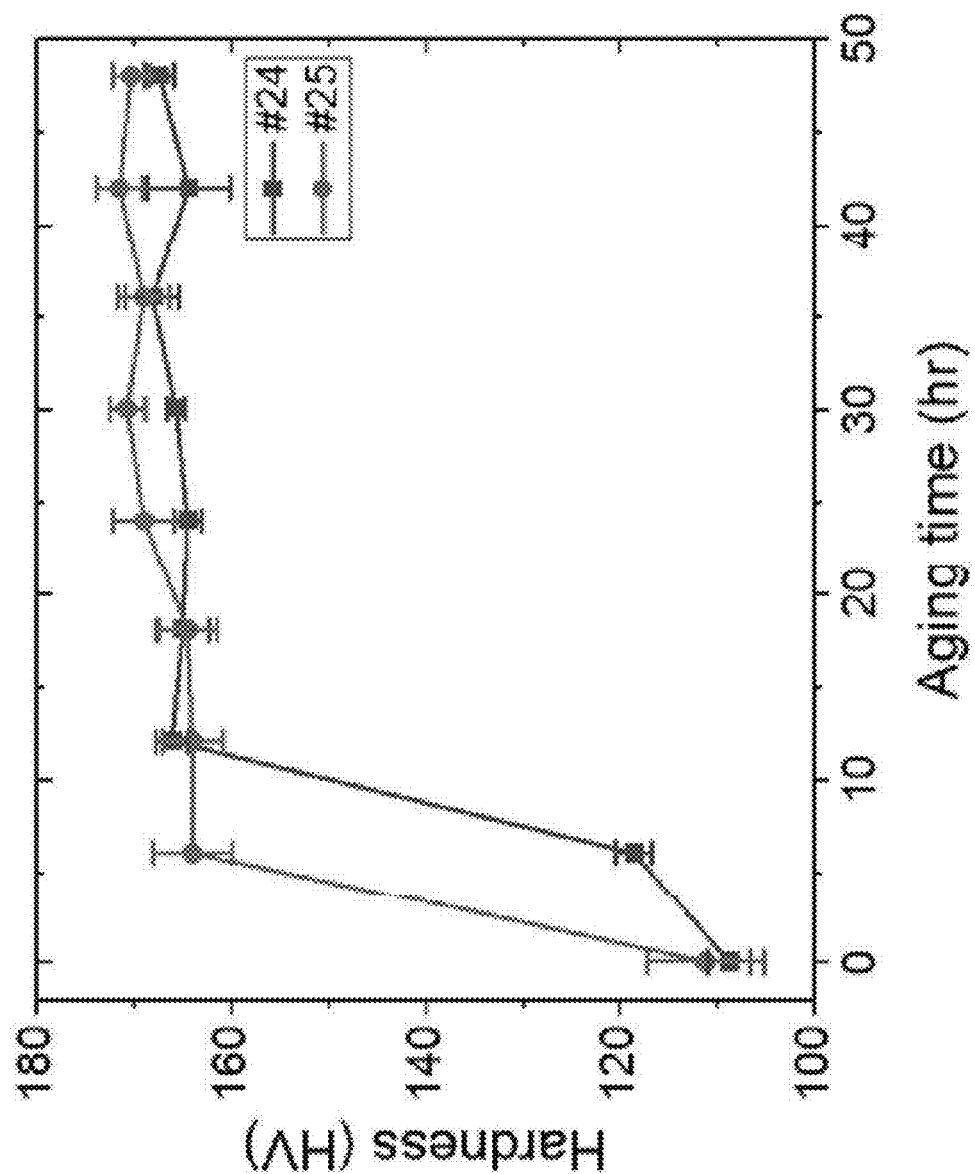

FIG. 55 is data acquired utilizing methods according to embodiments of the present disclosure.

Figure 56A:
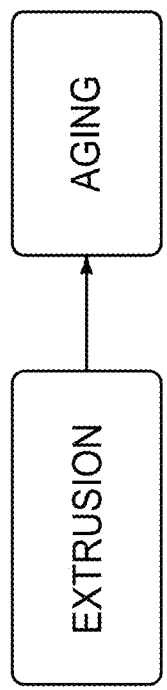
Figure 56B:

FIGS. 56A-56B depict extrusion to aging techniques and extrusion solution heating and aging techniques according to embodiments of the present disclosure.

Figure 57:
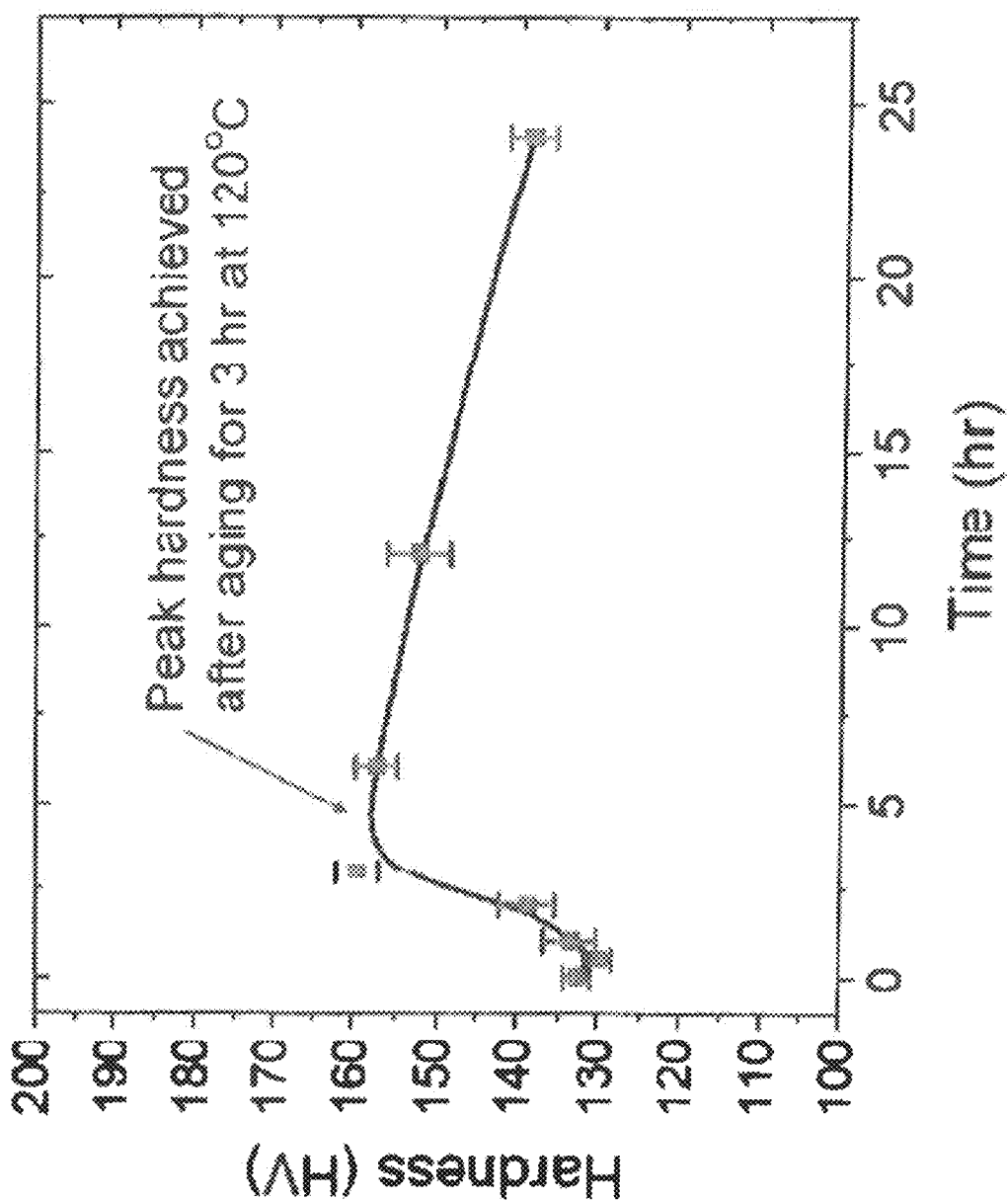

FIG. 57 depicts data acquired utilizing methods according to embodiments of the present disclosure.

Figure 58:
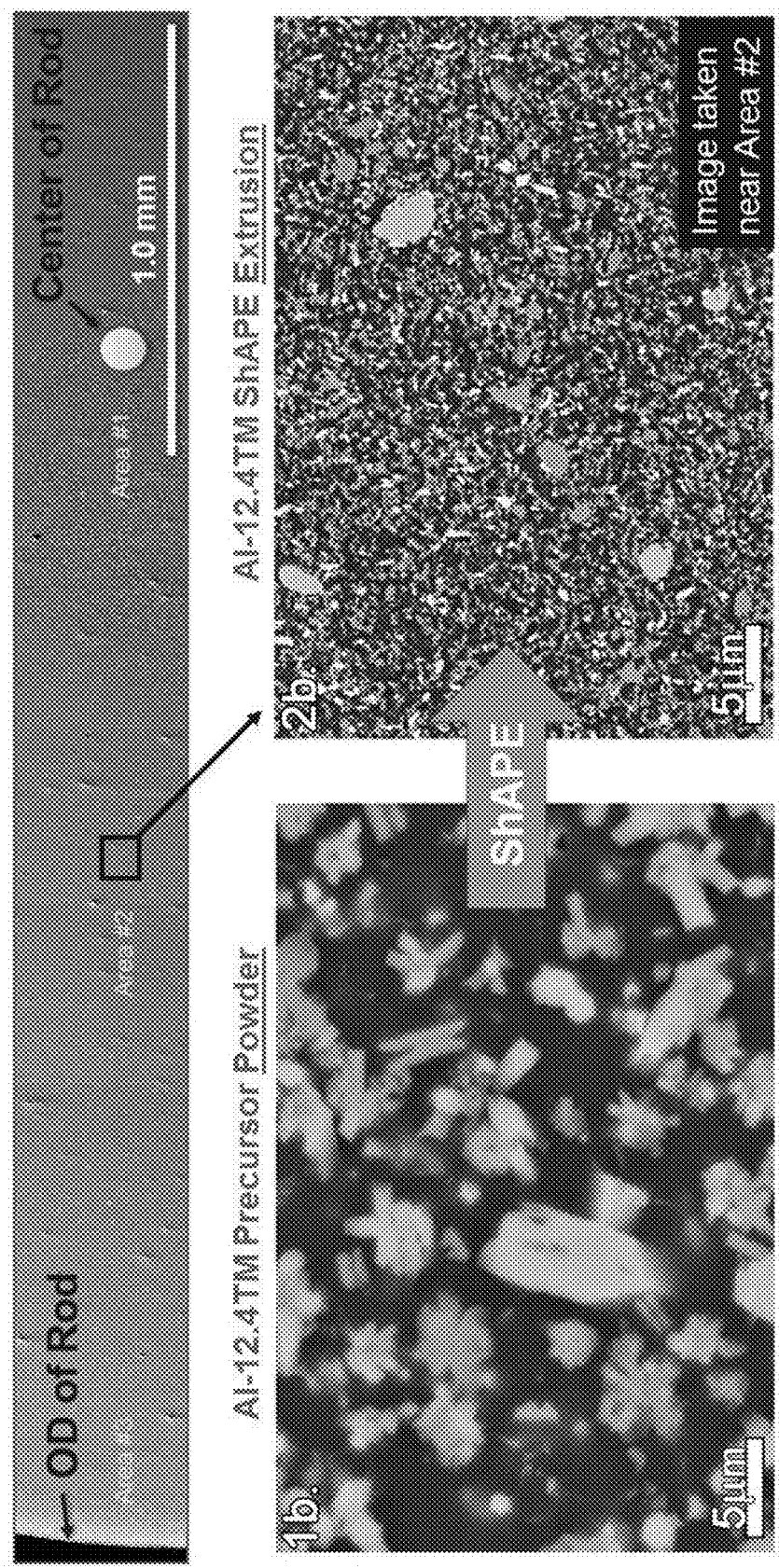

FIG. 58 depicts material change upon application of ShAPE to powder Al according to an embodiment of the disclosure.

Figure 59:
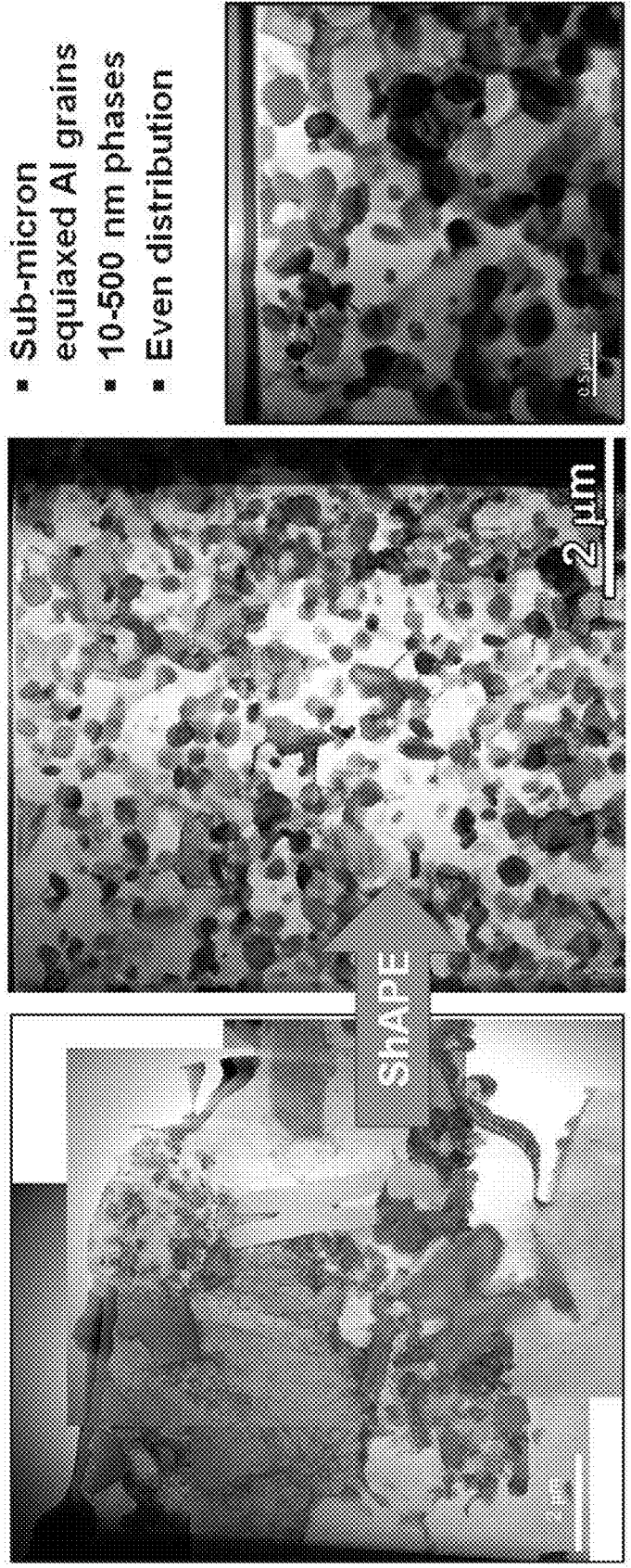

FIG. 59 depicts another view of material change upon application of ShAPE to powder Al according to an embodiment of the disclosure.

Figure 60:
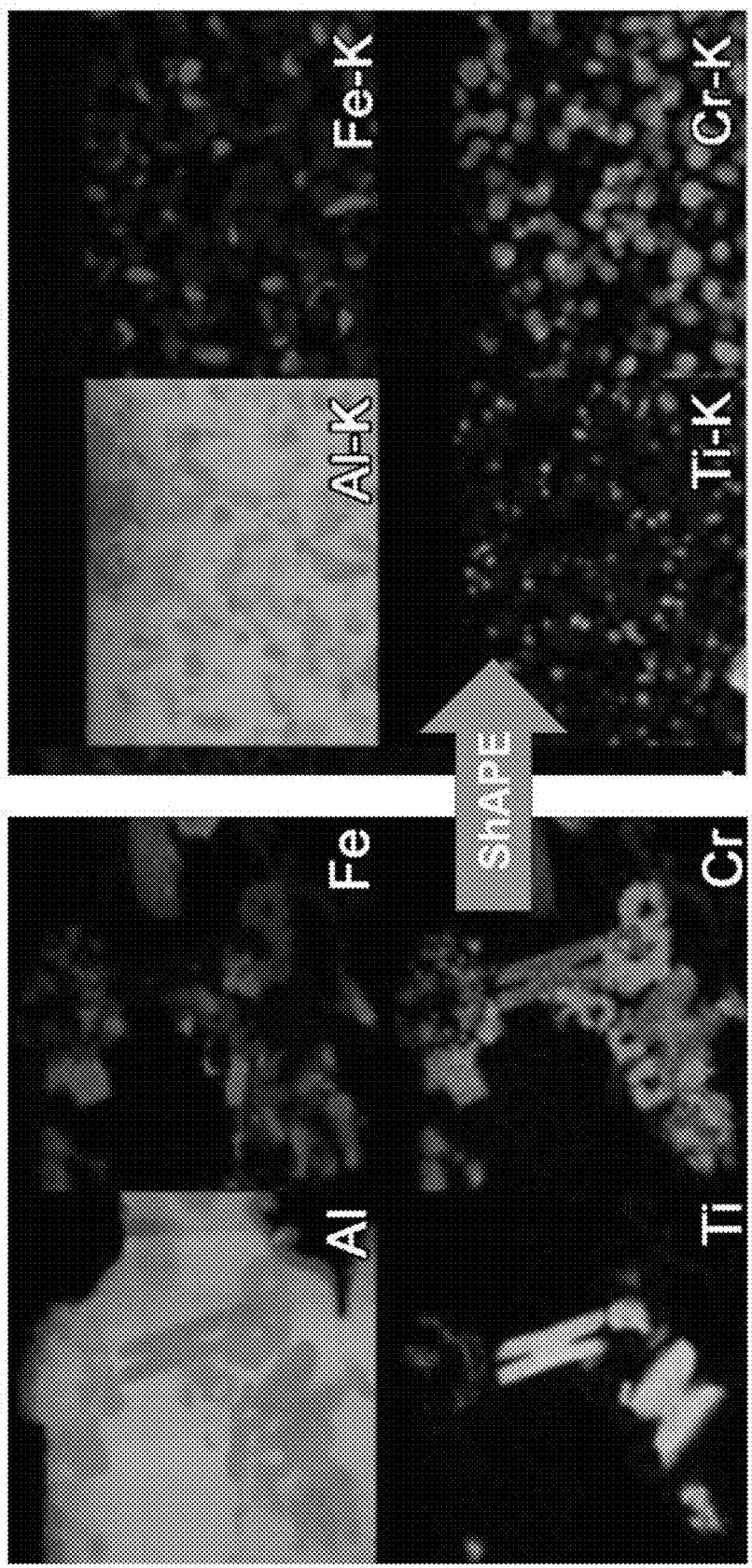

FIG. 60 depicts views of material changes upon application of ShAPE to powder Al, Fe, Ti and Cr according to an embodiment of the disclosure.

Figure 61:
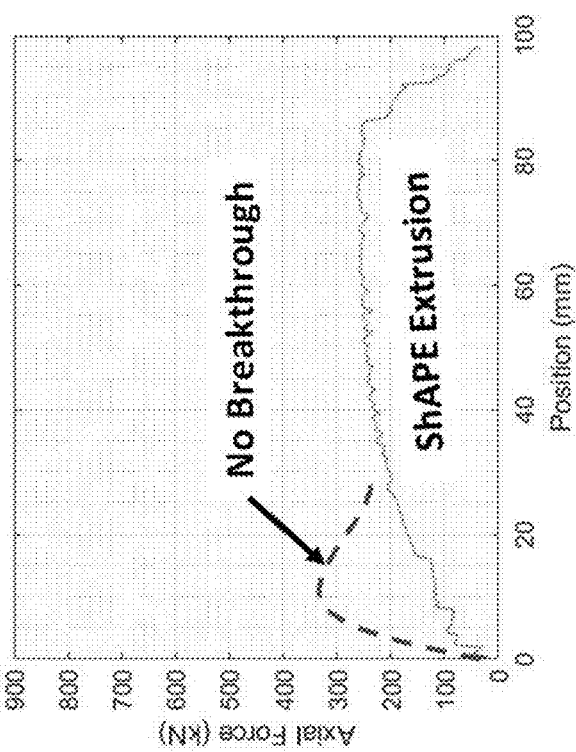

FIG. 61 depicts ShAPE axial forces in the context of traditional extrusion forces with "No Breakthrough" indicating the breakthrough force that is eliminated with ShAPE.

Figure 62:
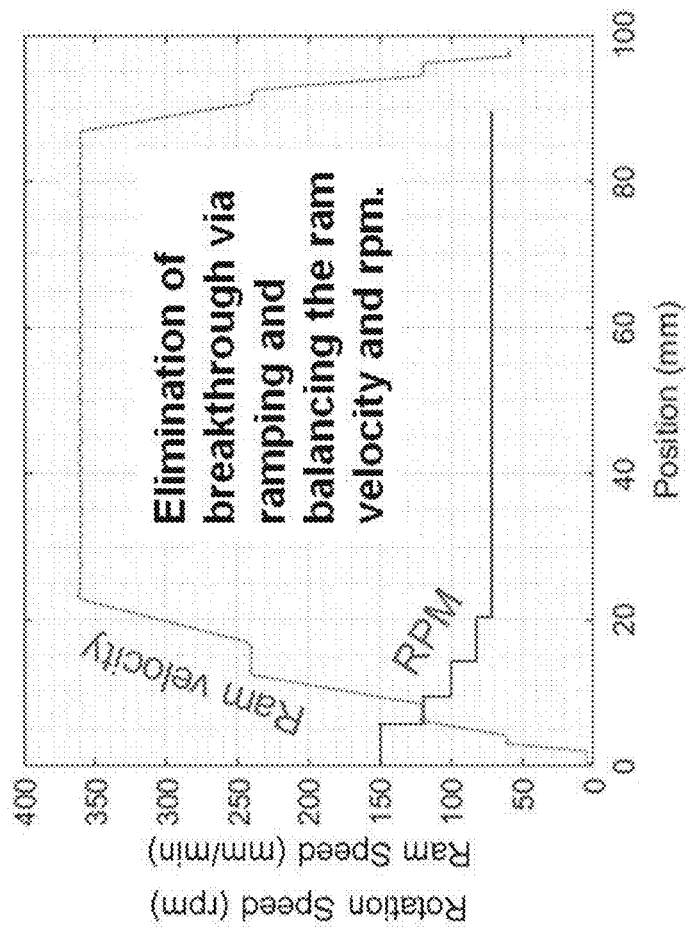

FIG. 62 depicts ShAPE rotational rpms and axial forces of ShAPE.

Figure 63:
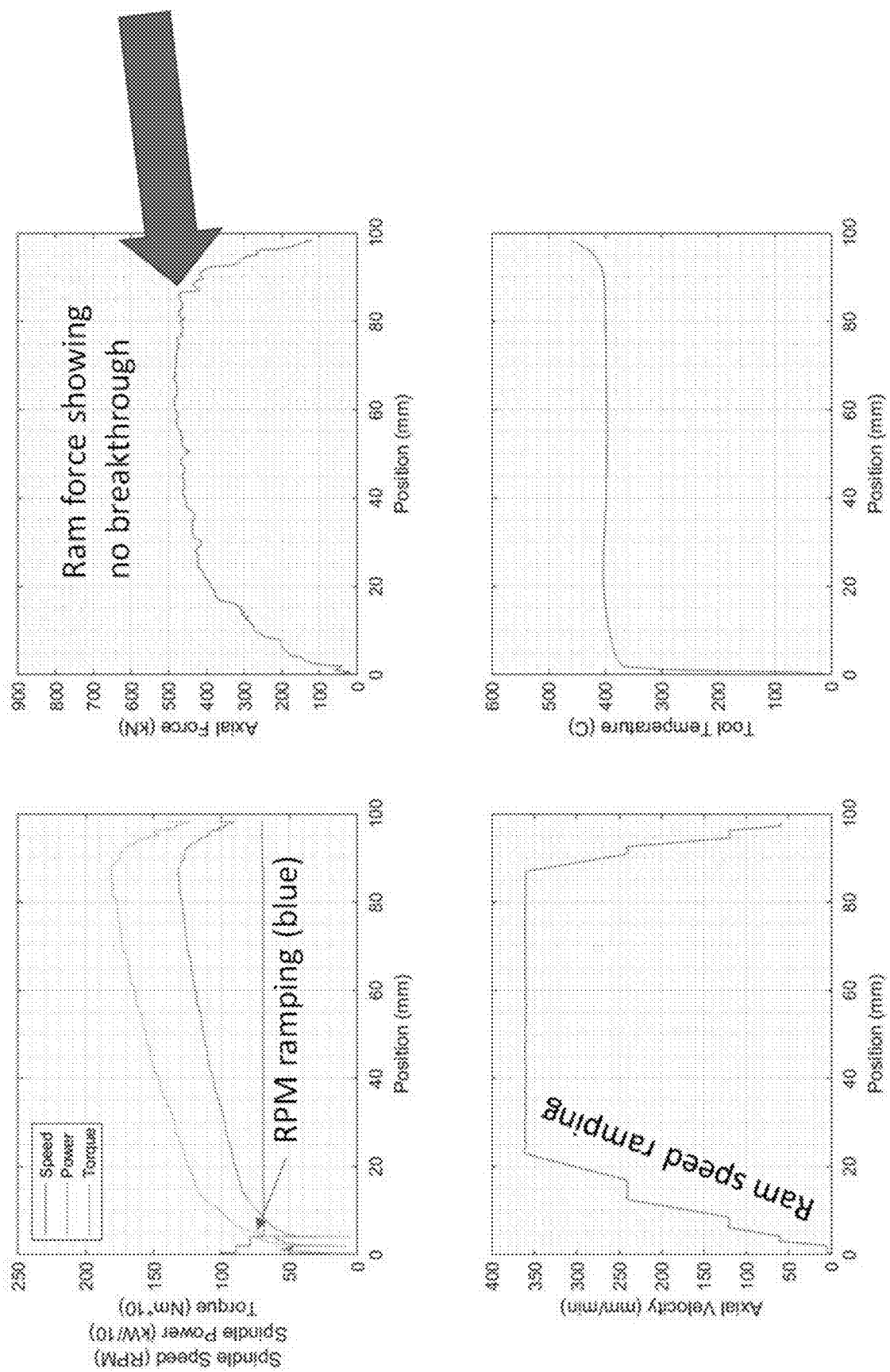

FIG. 63 depicts Aluminum (AA 6063) ShAPE processes parameters.

Figure 64:
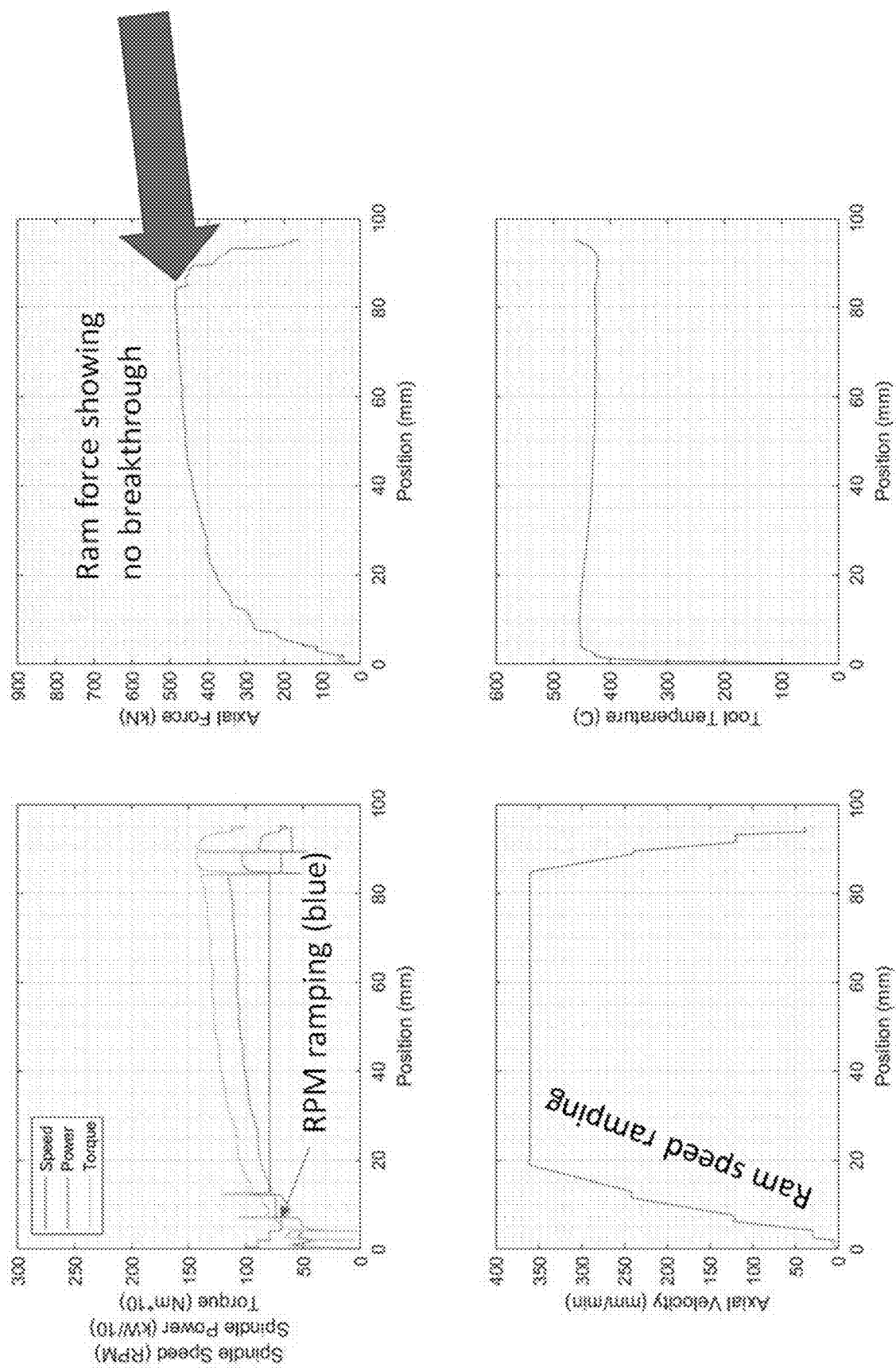

FIG. 64 depicts Aluminum (AA 7075) ShAPE processes parameters.

Figure 65:
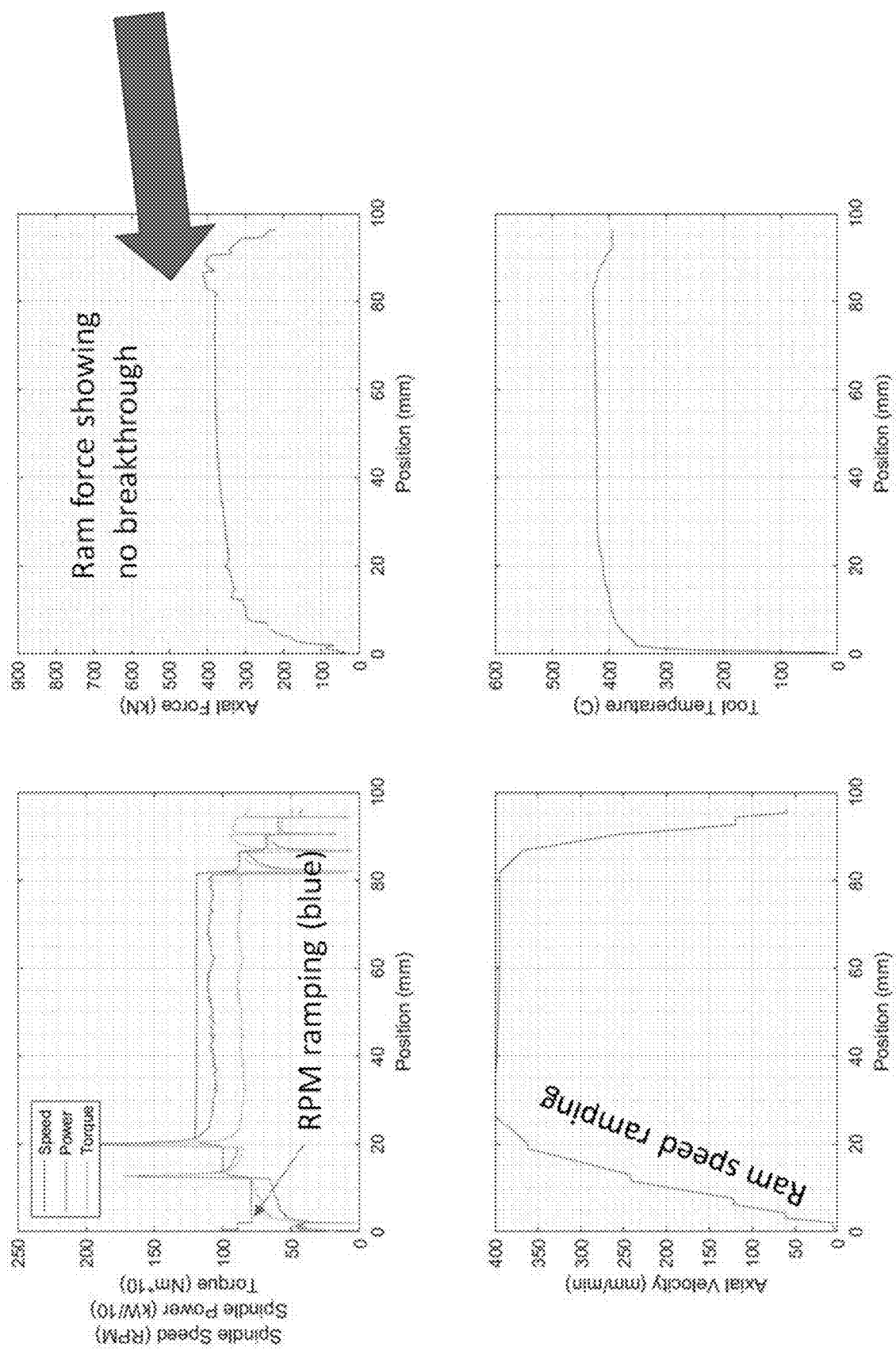

FIG. 65 depicts alloy (Mg ZK60) ShAPE processes parameters.

DESCRIPTION

This disclosure is submitted in furtherance of the constitutional purposes of the U.S. Patent Laws "to promote the progress of science and useful arts" (Article 1, Section 8).

The following description including the attached pages provide various examples of the present invention. It will be clear from this description of the invention that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In the previously described and related applications various methods and techniques are described wherein the described technique and device (referred to as ShAPE) is shown to provide a number of significant advantages including the ability to control microstructure such as crystallographic texture through the cross sectional thickness, while also providing the ability to perform various other tasks. In this description we provide information regarding the use of the ShAPE technique to form materials with non-circular hollow profiles as well as methods for creating high entropy alloys that are useful in a variety of applications such as projectiles. Exemplary applications will be discussed on more detail in the following.

Figure 1:
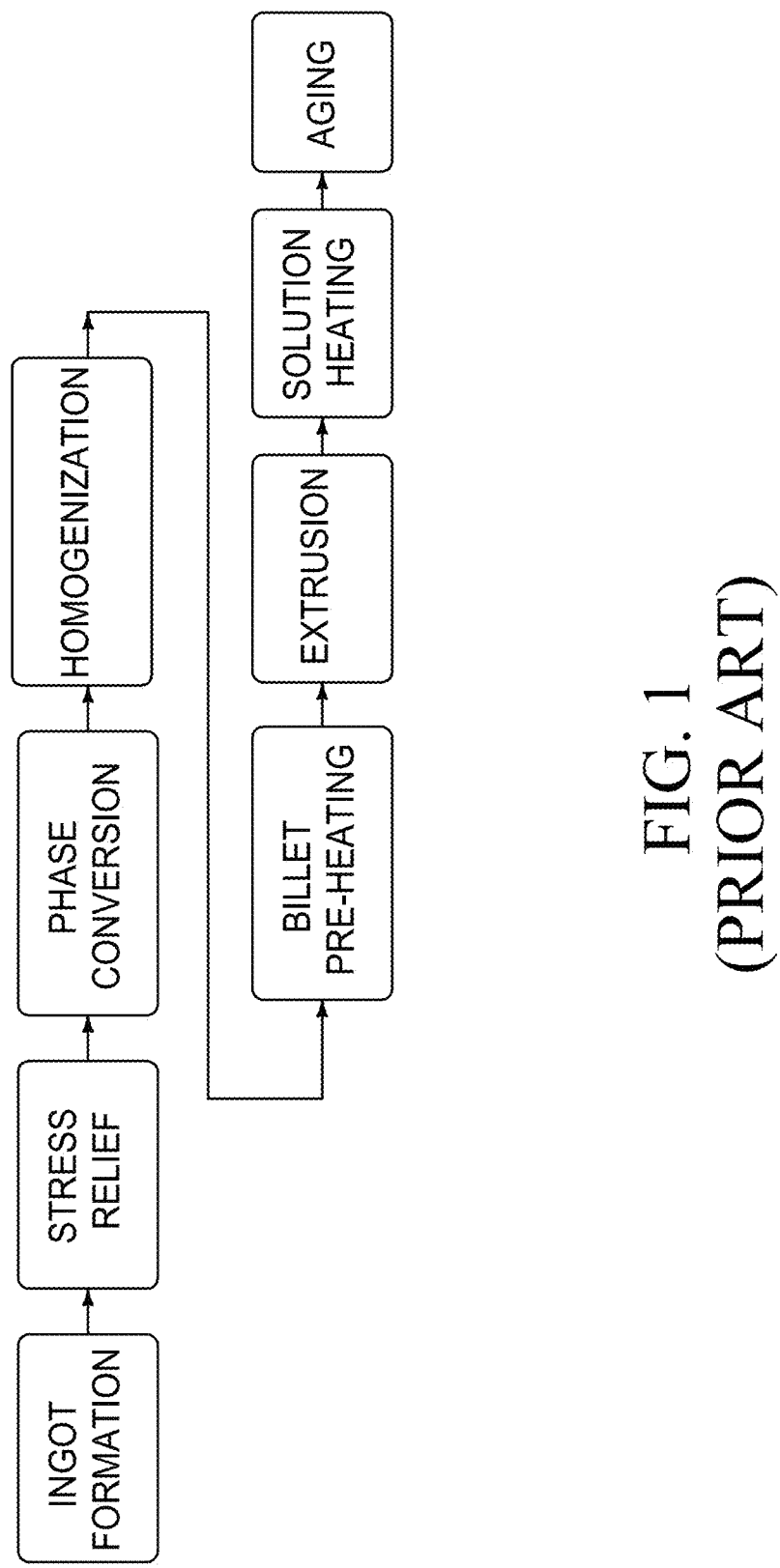
Figure 2A:
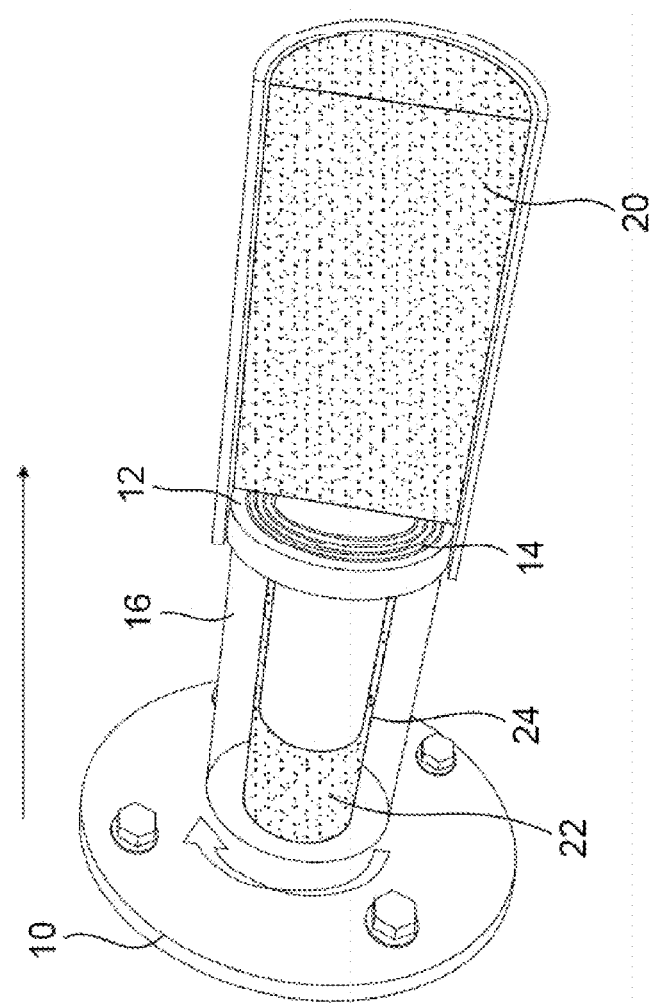
FIG. 2A shows a ShAPE setup for extruding hollow cross section pieces.
Figure 2B:
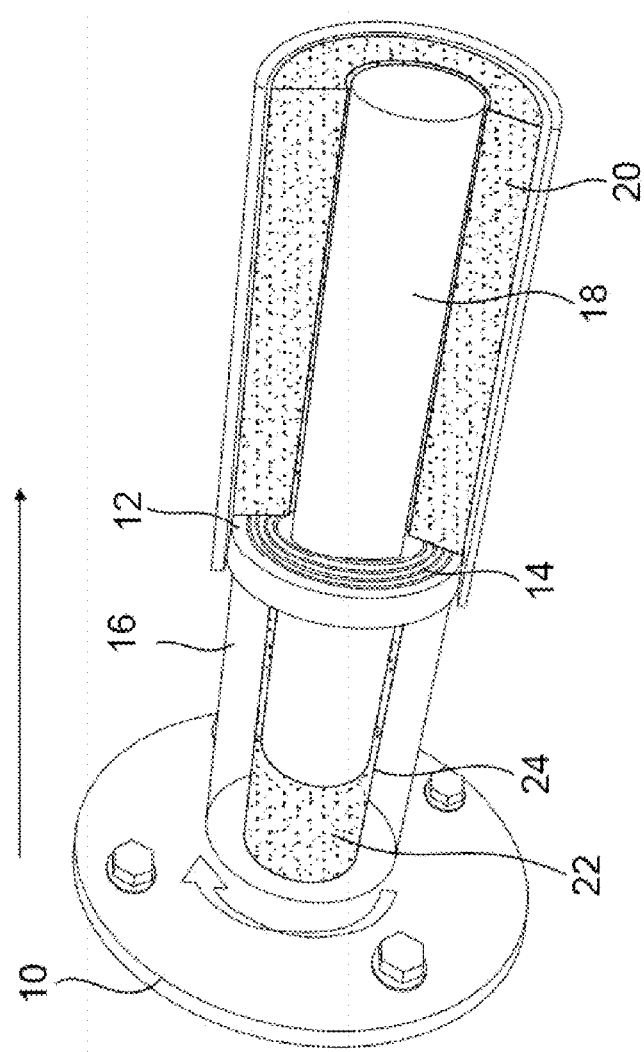
FIG. 2B shows another configuration for extruding hollow cross-sectional pieces.

Referring first now to FIGS. 2A and 2B, examples of the ShAPE device and arrangement are provided. In an arrangement such as the one shown in FIG. 2A, rotating die 10 is thrust into a material 20 under specific conditions whereby the rotating and shear forces of the die face 12 and the die plunge 16 combine to heat and/or plasticize the material 20 at the interface of the die face 12 and the material 20 and cause the plasticized material to flow in desired direction in either a direct or indirect manner. (In other embodiments the material 20 may spin and the die 10 pushed axially into the material 20 so as to provide this combination of forces at the material face.) In either instance, the combination of the axial and the rotating forces plasticize the material 20 at the interface with the die face 12. Flow of the plasticized material can then be directed to another location wherein a die bearing surface 24 of a preselected length facilitates the recombination of the plasticized material into an arrangement wherein a new and more refined grain size and texture control at the micro level can take place. This then translates to an extruded product 22 with desired characteristics. This process enables better strength, ductility, and corrosion resistance at the macro level together with increased and better performance. This process can eliminate the need for additional heating, and the process can utilize a variety of forms of material including billet, powder or flake without the need for extensive preparatory processes such as "steel canning", billet pre-heating, de-gassing, de-canning and other process steps can be utilized as well. This arrangement also provides for a methodology for performing other steps such as cladding, enhanced control for through wall thickness and other characteristics, joining of dissimilar materials and alloys, and beneficial feedstock materials for subsequent rolling operations.

This arrangement is distinct from and provides a variety of advantages over the prior art methods for extrusion. First, during the extrusion process the force rises to a peak in the beginning and then falls off once the extrusion starts. This is called breakthrough. In this ShAPE process the temperature at the point of breakthrough is very low. For example for Mg tubing, the temperature at breakthrough for the 2" OD, 75 mil wall thickness ZK60 tubes is <150 C. This lower temperature breakthrough is believed in part to account for the superior configuration and performance of the resulting extrusion products.

Another feature is the low extrusion coefficient kf which describes the resistance to extrusion (i.e. lower kf means lower extrusion force/pressure). Kf is calculated to be 2.55 MPa and 2.43 MPa for the extrusions made from ZK60-T5 bar and ZK60 cast respectively (2" OD, 75 mil wall thickness). The ram force and kf are remarkably low compared to conventionally extruded magnesium where kf ranges from 68.9-137.9 MPa. As such, the ShAPE process achieved a 20-50 times reduction in kf (as thus ram force) compared to conventional extrusion. This assists not only with regard to the performance of the resulting materials but also reduced energy consumption required for fabrication. For example, the electrical power required to extrude the ZK60-T5 bar and ZK60 cast (2" OD, 750 mil wall thickness) tubes is 11.5 kW during the process. This is much lower than a conventional approach that uses heated containers/billets. Similar reductions in kf have also been observed when extruding high performance aluminum powder directing into wire, rod, and tubing.

The ShAPE process is significantly different than Friction Stir Back Extrusion (FSBE). In FSBE, a spinning mandrel is rammed into a contained billet, much like a drilling operation. Scrolled grooves force material outward and material back extrudes around and onto the mandrel to form a tube, not having been forced through a die. As a result, only very small extrusion ratios are possible, the tube is not fully processed through the wall thickness, the extrudate is not able to push off of the mandrel, and the tube length is limited to the length of the mandrel. In contrast, ShAPE utilizes spiral grooves on a die face to feed material inward through a die and around a mandrel that is traveling in the same direction as the extrudate. As such, a much larger outer diameter and extrusion ratio are possible, the material is uniformly process through the wall thickness, the extrudate is free to push off the mandrel as in conventional extrusion, and the extrudate length is only limited only by the starting volume of the billet. ShAPE can be scalable to the manufacturing level, while the limitations of FSBE have kept the technology as a non-scalable academic interest since FBSE was first reported.

An example of an arrangement using a ShAPE device and a mandrel 18 is shown in FIG. 2B. This device and associated processes have the potential to be a low-cost, manufacturing technique to fabricate variety of materials. As will be described below in more detail, in addition to modifying various parameters such as feed rate, heat, pressure and spin rates of the process, various mechanical elements of the tool assist to achieve various desired results. For example, varying scroll patterns 14 on the face of extrusion dies 12 can be used to affect/control a variety of features of the resulting materials. This can include control of grain size and crystallographic texture along the length of the extrusion and through-wall thickness of extruded tubing and other features. Alteration of parameters can be used to advantageously alter bulk material properties such as ductility and strength and allow tailoring for specific engineering applications including altering the resistance to crush, pressure or bending. Scrolls patterns have also been found to affect grain size and texture through the thickness of the extrusion.

The ShAPE process has been utilized to form various structures from a variety of materials including the arrangement as described in the following table.

TABLE 1

| Alloy | Material Class | Precursor Form |
|---|---|---|
| PUCKS | | |
| $Bi_2Te_3$ | Thermoelectric | Powder |
| Fe—Si | Magnet | Powder |
| $Nd_2Fe_{11}B$/Fe | Magnet | Powder |
| $Nd_2Fe_{14}B$ | Magnet | Powder |
| MA956 | ODS Steel | Powder |
| Nb 0.95 Ti 0.05 Fe 1 Sb 1 | Thermoelectric | Powder |
| Mn—Bi | Magnet | Powder |
| Al—Si | Model Binary Alloy | Powder |
| Cu—Ni | Model Binary Alloy | Powder |
| Cu—Nb | Model Binary Alloy | Powder |
| PM 2000 | ODS Steel | Powder |
| Eurofer 97 | ODS Steel | Powder |
| 14YWT | ODS Steel | Powder |
| TUBES | | |
| ZK60 | Magnesium Alloy | Barstock, Casting |
| AZ31 | Magnesium Alloy | Barstock |
| AZ91 | Magnesium Alloy | Flake, Casting |
| AZS312 | Magnesium Alloy | Casting |
| Mg-7 wt % Si | Magnesium Alloy | Casting |
| AZ91- 1, 5 and 10 wt. % $Al_2O_3$ | Mg MMC | Mechanically Alloyed Flake |
| AZ91- 1, 5 and 10 wt. % $Y_2O_3$ | Mg MMC | Mechanically Alloyed Flake |
| AZ91- 1, 5 and 10 and 5 wt. % SiC | Mg MMC | Mechanically Alloyed Flake |
| AA2024 | Structural Aluminum | Cast, Barstock |
| AA6061 | Structural Aluminum | Cast, Barstock |
| AA6063 | Structural Aluminum | Casting, Barstock and Chip |
| AA7075 | High Strength Aluminum | Casting, barstock |
| Al-12.4TM | High Strength Aluminum | Powder |
| A356 | Structural Aluminum | Chip |
| AA2024/1100 | Aluminum Cladding | Casting, barstock |
| AA7075/AA6061 | Aluminum Cladding | Casting, barstock |
| 1100/7075/1100 | Aluminum Cladding | Casting, barstock |

TABLE 1-continued

| Alloy | Material Class | Precursor Form |
|---|---|---|
| RODS | | |
| Al—Mn wt. 15% | Aluminum Manganese Alloy | Casting |
| Al—Mg | Mg Al Coextrusion | Barstock |
| Mg—Dy—Nd—Zn—Zr | Magnesium Rare Earth | Barstock |
| Cu | Pure Copper | Barstock |
| ODS-Cu | Oxide Dispersion Strengthened Cu | Powder |
| Cu-Graphite | Conductive Copper | Powder |
| Cu-Graphene | Conductive Copper | Powder + Film |
| Cu-Graphene | Conductive Copper | Barstock + Film |
| Cu-Graphene | Conductive Copper | Foil + Film |
| Al-Graphene | Conductive Aluminum | Powder + Film |
| Al-Reduced Graphene | Conductive Aluminum | Barstock + Flake |
| Al-Graphite | Conductive Aluminum | Barstock + Powder |
| CP-Mg | Pure Magnesium | Barstock, casting |
| AA6061 | Aluminum | Casting, barstock |
| AA7075 | Aluminum | Casting, barstock |
| Al—Ti—Mg—Cu—Fe | High Entropy Alloy | Casting |
| Al- 1, 5, 10 at. % Mg | Magnesium Alloy | Casting |
| Al-12.4TM | High Temperature/Strength Aluminum | Powder |
| Rhodium | Pure Rhodium | Barstock |
| Al—Ce | High Temperature/Strength Aluminum | Casting |
| AA1100 | Aluminum Alloy | Barstock |
| AA7XXX | High Strength Aluminum | Proprietary Powder |
| 14YWT | ODS Steel | Powder |
| MA956 | ODS Steel | Powder |
| $Bi_2Te_3$ | Thermoelectric | Casting and Sintered Powder |
| Mixed Plastic | Plastic | Scrap and Pellets |

In addition, to the pucks, rods and tubes described above, the present disclosure also provides a description of the use of a specially configured scroll component referred by the inventors as a portal bridge die head which allows for the fabrication of ShAPE extrusions with non-circular hollow profiles. This configuration allows for making extrusion with non-circular, and multi-zoned, hollow profiles using a specially formed portal bridge die and related tooling.

Figure 3A:
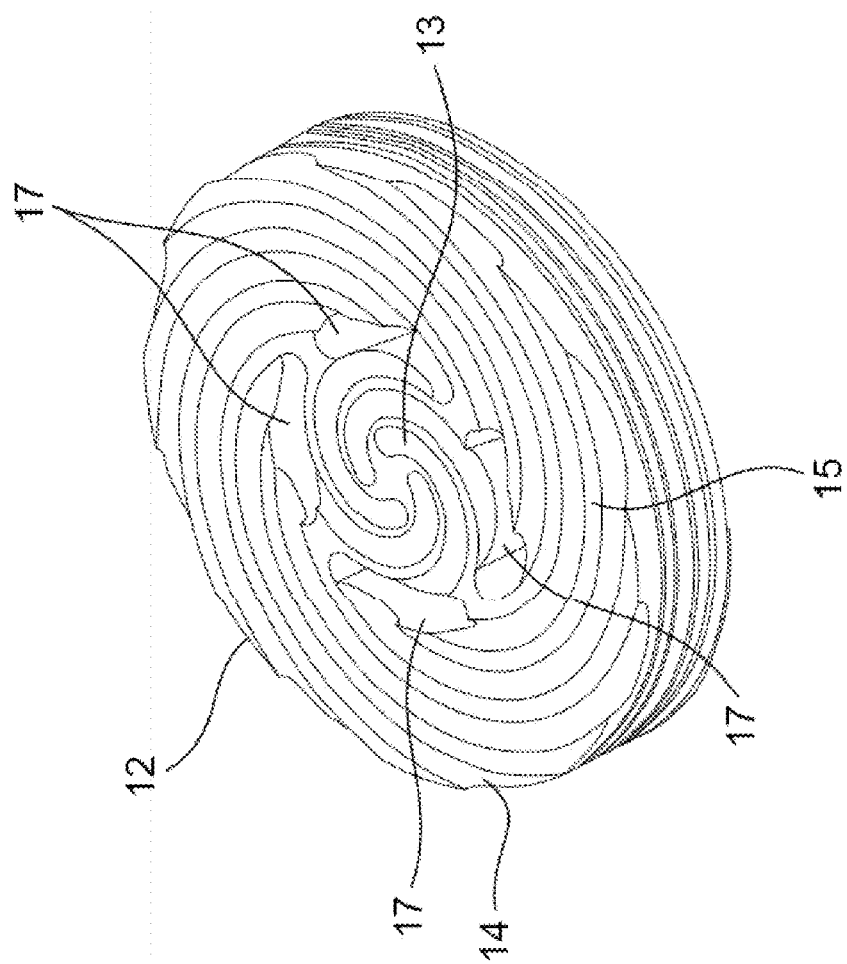
FIG. 3A shows a top perspective view of a modified scroll face tool for a portal bridge die.
Figure 3B:
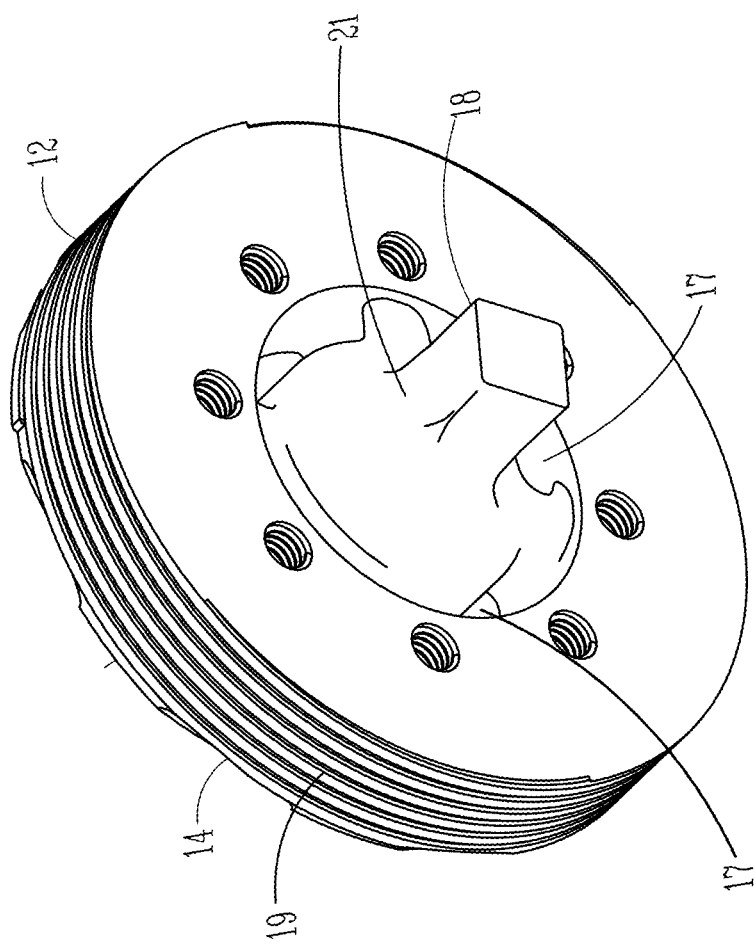
FIG. 3B shows a bottom perspective view of a modified scroll face that operates like a portal bridge die.
Figure 3C:
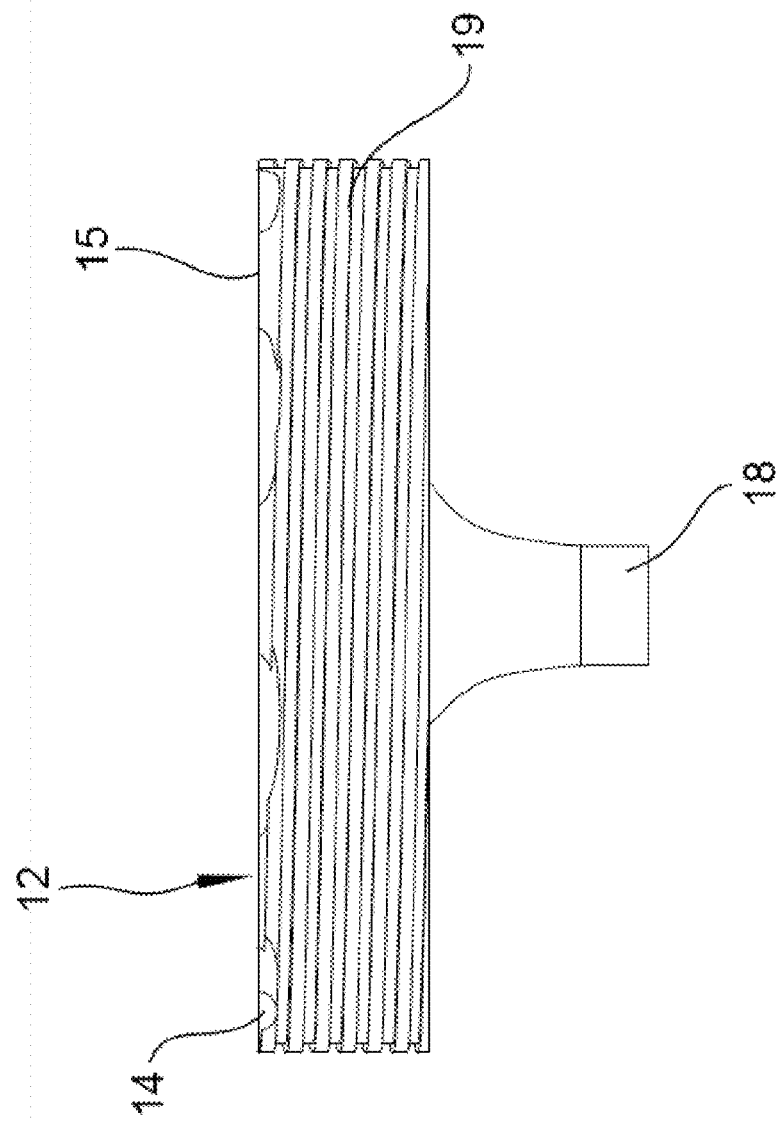
FIG. 3C shows a side view of the modified portal bridge die.

FIGS. 3A-3C show various views of a portal bridge die design with a modified scroll face that unique to operation in the ShAPE process. FIG. 3A shows an isometric view of the scroll face on top of the portal bridge die and FIG. 3B shows an isometric view of the bottom of the portal bridge die with the mandrel visible.

In the present embodiment grooves 13, 15 on the face 12 of the die 10 direct plasticized material toward the aperture ports 17. Plasticized material then passes through the aperture ports 17 wherein it is directed to a die bearing surface 24 within a weld chamber similar to conventional portal bridge die extrusion. In this illustrative example, material flow is separated into four distinct streams using four ports 17 as the billet and the die are forced against one another while rotating.

While the outer grooves 15 on the die face feed material inward toward the ports 17, inner grooves 13 on the die face feed material radially outward toward the ports 17. In this illustrative example, one groove 13 is feeding material radially outward toward each port 17 for a total of four outward flowing grooves. The outer grooves 15 on the die surface 12 feed material radially inward toward the port 17. In this illustrative example, two sets of grooves are feeding material radially inward toward each port 17 for a total of eight inward feeding grooves 15. In addition to these two sets of grooves, a perimeter groove 19 on the outer perimeter of the die, shown in FIG. 2C, is oriented counter to the die rotation so as to provide back pressure thereby minimizing material flash between the container and die during extrusion.

FIG. 3B shows a bottom perspective view of the portal bridge die 12. In this view, the die shows a series of full penetration of ports 17. In use, streams of plasticized material tunneled by the inward 15 and outward 13 directed grooves described above pass through these ports 17 and then are recombined in a weld chamber 21 and then flow around a mandrel 18 to create a desired cross section. The use of scrolled grooves 13, 15, 19 to feed the ports 17 during rotation—as a means to separate material flow of the feedstock (e.g. powder, flake, billet, etc.) into distinct flow streams has never been done to our knowledge. This arrangement enables the formation of items with noncircular hollow cross sections.

Figure 4:
FIG. 4 shows an illustrative view of material separated using at least some of the devices shown in FIGS. 2A-3C.

FIG. 4 shows a separation of magnesium alloy ZK60 into multiple streams using the portal bridge die approach during ShAPE processing. (In this case the material was allowed to separate for effect and illustration of the separation features and not passed over a die bearing surface for combination). Conventional extrusion does not rotate and the addition of grooves would greatly impede material flow. But when rotation is present, such as in ShAPE or friction extrusion, the scrolls not only assist flow, but significantly assist the functioning of a portal bridge die extrusion and the subsequent formation of non-circular hollow profile extrusions. Without scrolled grooves feeding the portals, extrusion via the portal bridge die approach using a process where rotation is involved, such as ShAPE, would be ineffective for making items with such a configuration. The prior art conventional linear extrusion process teach away from the use of surface features to guide material into the portals 17 during extrusion.

In the previously described and related applications various methods and techniques are described wherein the ShAPE technique and device is shown to provide a number of significant advantages including the ability to control microstructure such as crystallographic texture through the cross sectional thickness, while also providing the ability to perform various other tasks. In this description we provide information regarding the use of the ShAPE technique to form materials with non-circular hollow profiles as well as methods for creating high entropy alloys that are useful in a variety of applications. These two exemplary applications will be discussed on more detail in the following.

Figure 5A:
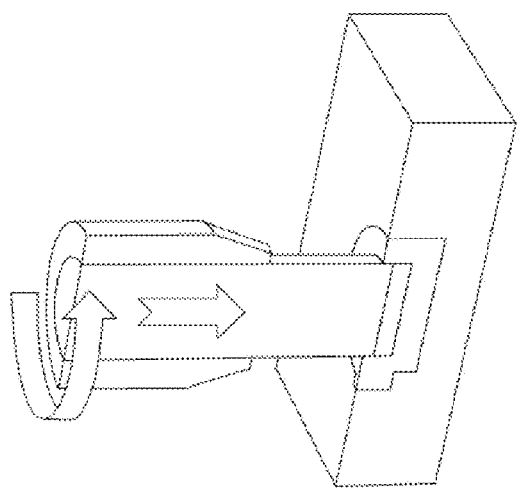
FIG. 5A shows a ShAPE set up for consolidating high entropy alloys (HEAs) from arc melted pucks into densified pucks.
Figure 5C:
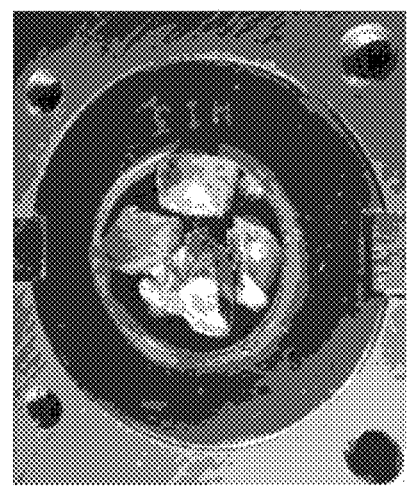
FIG. 5C shows an example of HEA arc melted samples crushed and placed inside the chamber of the ShAPE device prior to processing.
Figure 5B:
FIG. 5B shows an example of the scrolled face of the rotating tool in FIG. 5A.

FIG. 5A shows a schematic of the ShAPE process which utilizes a rotating tool to apply load/pressure and at the same time the rotation helps in applying torsional/shear forces, to generate heat at the interface between the tool and the feedstock and within the material, thus helping to consolidate the material. In this particular embodiment the arrangement of the ShAPE setup is configured so as to consolidate high entropy alloy (HEA) arc-melted buttons into densified pucks. In this arrangement the rotating ram tool is made from an Inconel alloy and has an outer diameter (OD) of 25.4 mm, and the scrolls on the ram face were 0.5 mm in depth and had a pitch of 4 mm with a total of 2.25 turns. In this instance the ram surface incorporated a thermocouple to record the temperature at the interface during processing. (see FIG. 5B) The setup enables the ram to spin at speeds from 25 to 1500 RPM.

In use, both an axial force and a rotational force are applied to a material of interest causing the material to plasticize. In extrusion applications, the plasticized material then flows over a die bearing surface dimensioned so as to allow recombination of the plasticized materials in an arrangement with superior grain size distribution and alignment than what is possible in traditional extrusion processing. As described in the prior related applications this process provides a number of advantages and features that conventional prior art extrusion processing is simply unable to achieve.

High entropy alloys are generally solid-solution alloys made of five or more principal elements in equal or near equal molar (or atomic) ratios. While this arrangement can provide various advantages, it also provides various challenges particularly in forming. While conventional alloys can comprise one principal element that largely governs the basic metallurgy of that alloy system (e.g. nickel-base alloys, titanium-base alloys, aluminum-base alloys, etc.) in an HEA each of the five (or more) constituents of HEAs can be considered as the principal element. Advances in production of such materials may open the doors to their eventual deployment in various applications. However, standard forming processes have demonstrated significant limitations in this regard. Utilization of the ShAPE type of process demonstrates promise in obtaining such a result.

In one example a "low-density" AlCuFe(Mg)Ti HEA was formed. Beginning with arc-melted alloy buttons as a precursor, the ShAPE process was used to simultaneously heat, homogenize, and consolidate the HEA resulting in a material that overcame a variety of problems associated with prior art applications and provided a variety of advantages. In this specific example, HEA buttons were arc-melted in a furnace under $10^{-6}$ Torr vacuum using commercially pure aluminum, magnesium, titanium, copper and iron. Owing to the high vapor pressure of magnesium, a majority of magnesium vaporized and formed Al1Mg0.1Cu2.5Fe1Ti1.5 instead of the intended Al1Mg1Cu1Fe1Ti1 alloy. The arc melted buttons described in the paragraph above were easily crushed with a hammer and used to fill the die cavity/powder chamber (FIG. 5C), and the shear-assisted extrusion process initiated. The volume fraction of the material filled was less than 75%, but was consolidated when the tool was rotated at 500 RPM under load control with a maximum pressure set at 85 MPa and at 175 MPa.

Figure 6:
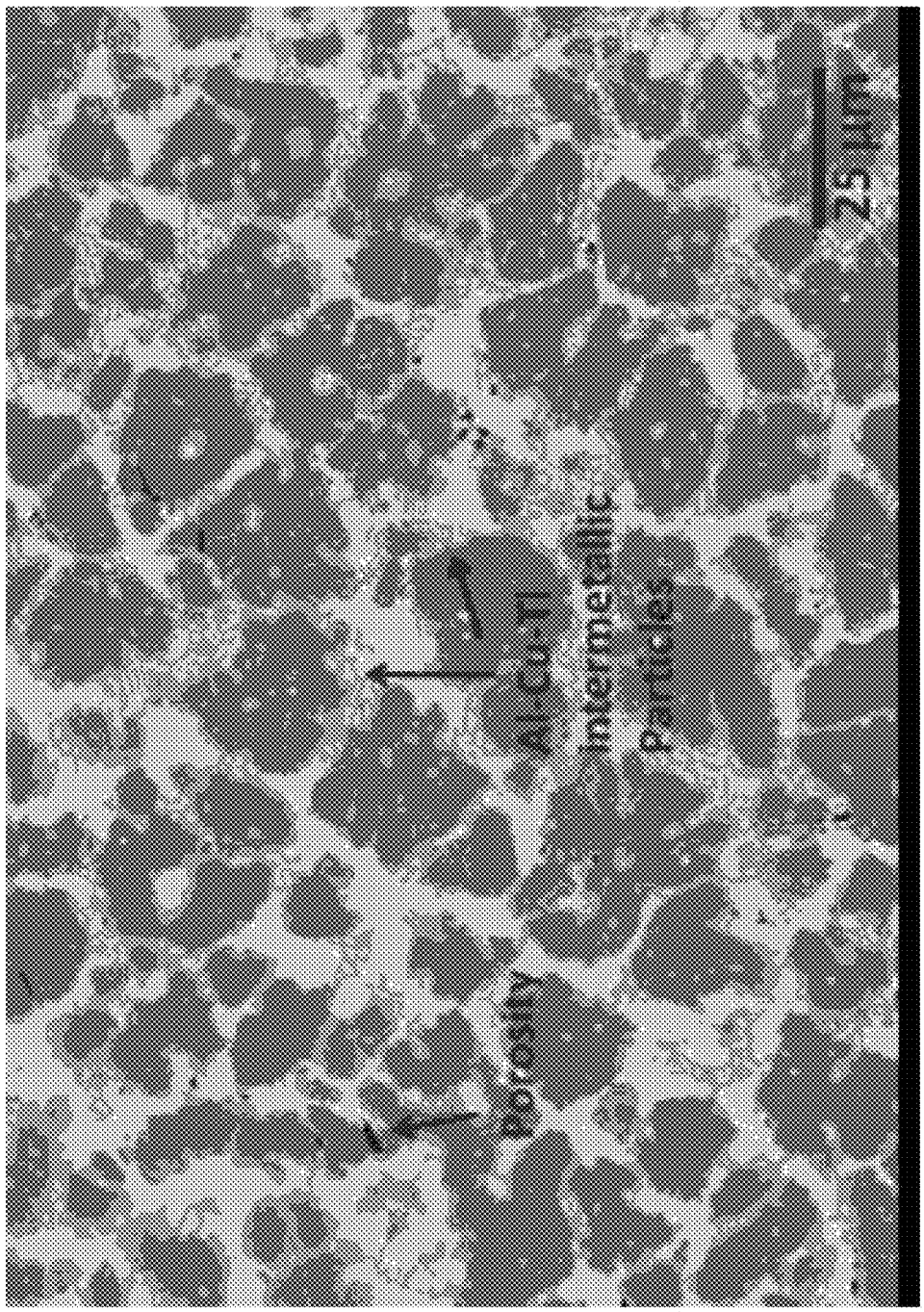
FIG. 6 shows back scatter electron—scanning electron microscope (BSE-SEM) image of cross section of the HEA arc melted samples before ShAPE processing, showing porosity, intermetallic phases and cored, dendritic microstructure.

Comparison of the arc-fused material and the materials developed under the ShAPE process demonstrated various distinctions. The arc melted buttons of the LWHEA exhibited a cored dendritic microstructure along with regions containing intermetallic particles and porosity. Using the ShAPE process these microstructural defects were eliminated to form a single phase, refined grain and no porosity LWHEA sample FIG. 6 shows the backscattered SEM (BSE-SEM) image of the as-cast/arc-melted sample. The arc melted samples had a cored dendritic microstructure with the dendrites rich in iron, aluminum and titanium and were 15-30 μm in diameter, whereas the inter-dendritic regions were rich in copper, aluminum and magnesium. Aluminum was uniformly distributed throughout the entire microstructure. Such microstructures are typical of HEA alloys. The inter-dendritic regions appeared to be rich in Al—Cu—Ti intermetallic and was verified by XRD as $AlCu_2Ti$. XRD also confirmed a $Cu_2Mg$ phase which was not determined by the EDS analysis and the overall matrix was BCC phase. The intermetallics formed a eutectic structure in the inter-dendritic regions and were approximately 5-10 μm in length and width. The inter-dendritic regions also had roughly 1-2 vol % porosity between them and hence was difficult to measure the density of the same.

Typically such microstructures are homogenized by sustained heating for several hours to maintain a temperature near the melting point of the alloy. In the absence of thermodynamic data and diffusion kinetics for such new alloy systems the exact points of various phase formations or precipitation is difficult to predict particularly as related to various temperatures and cooling rates. Furthermore, unpredictability with regard to the persistence of intermetallic phases even after the heat treatment and the retention of their morphology causes further complications. A typical lamellar and long intermetallic phase is troublesome to deal with in conventional processing such as extrusion and rolling and is also detrimental to the mechanical properties (elongation).

The use of the ShAPE process enabled refinement of the microstructure without performing homogenization heat treatment and provides solutions to the aforementioned complications. The arc melted buttons, because of the presence of their respective porosity and the intermetallic phases, were easily fractured into small pieces to fill in the die cavity of the ShAPE apparatus. Two separate runs were performed as described in Table 1 with both the processes' yielding a puck with diameter of 25.4 mm and approximately 6 mm in height. The pucks were later sectioned at the center to evaluate the microstructure development as a function of its depth. Typically in the ShAPE consolidation process; the shearing action is responsible for deforming the structure at interface and increasing the interface temperature; which is proportional to the rpm and the torque; while at the same time the linear motion and the heat generated by the shearing causes consolidation. Depending on the time of operation and force applied near through thickness consolidation can also be attained.

TABLE 2

Consolidation processing conditions utilized for LWHEA

| Run # | Pressure (MPa) | Tool RPM | Process Temperature | Dwell Time |
|---|---|---|---|---|
| 1 | 175 | 500 | | 180 s |
| 2 | 85 | 500 | 600° C. | 180 s |

Figure 7B:
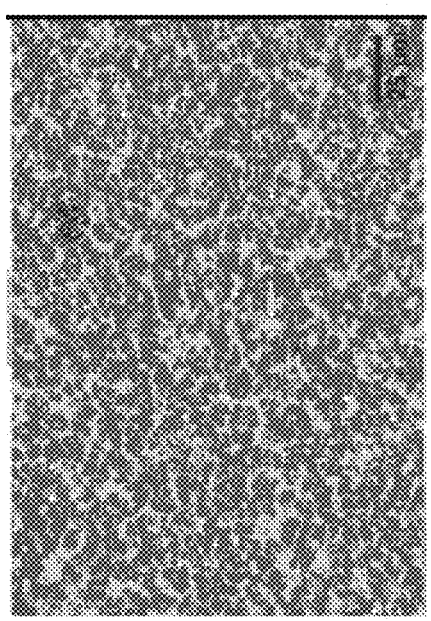
FIG. 7B shows BSE-SEM images halfway through the puck
Figure 7D:
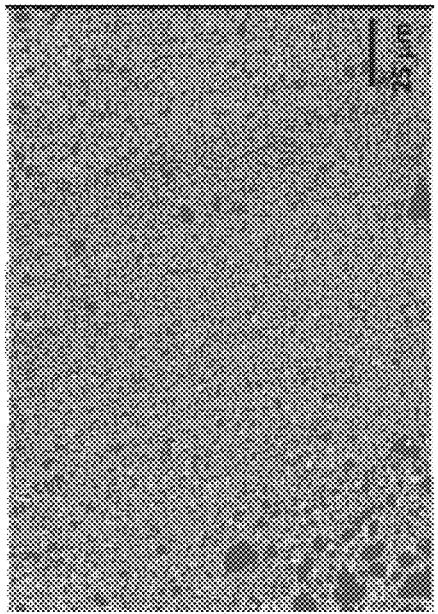
FIG. 7D shows BSE-SEM images of a high shear region
Figure 7A:
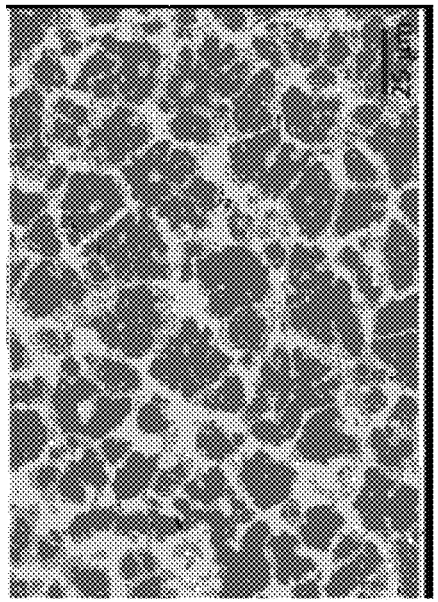
FIG. 7A shows BSE-SEM images at the bottom of the puck resulting from the processing of the material in FIG. 5C.
Figure 7C:
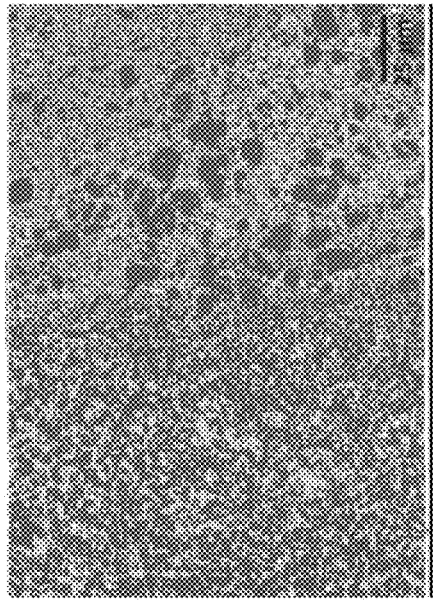
FIG. 7C shows BSE-SEM images of the interface between high shear region un-homogenized region (approximately 0.3 mm from puck surface)

FIGS. 7A-7D show a series of BSE-SEM images ranging from the essentially unprocessed bottom of the puck to the fully consolidated region at the tool billet interface. There is a gradual change in microstructure from the bottom of the puck to the interface where shear was applied. The bottom of the puck had the microstructure similar to one described in FIG. 6. But as the puck is examined moving towards the interface the size of these dendrites become closely spaced (FIG. 7B). The intermetallic phases are still present in the inter-dendritic regions but the porosity is completely eliminated. On the macro scale the puck appears more contiguous and without any porosity from the top to the bottom $\frac{3}{4}^{th}$ section. FIG. 7C shows the interface where the shearing action is more prominent. This region clearly demarcates the as-cast cast dendritic structure to the mixing and plastic deformation caused by the shearing action. A helical pattern is observed from this region to the top of the puck. This is indicative of the stirring action and due to the scroll pattern on the surface of the tool. This shearing action also resulted in the comminution of the intermetallic particles and also assisted in the homogenizing the material as shown in FIGS. 7C and 7D. It should be noted that this entire process lasted only 180 seconds to homogenize and uniformly disperse and comminute the intermetallic particles. The probability that some of these intermetallic particles were re-dissolved into the matrix is very high. The homogenized region was nearly 0.3 mm from the surface of the puck.

The use of the ShAPE device and technique demonstrated a novel single step method to process without preheating of the billets. The time required to homogenize the material was significantly reduced using this novel process. Based on the earlier work, the shearing action and the presence of the scrolls helped in comminution of the secondary phases and resulted in a helical pattern. All this provides significant opportunities towards cost reduction of the end product without compromising the properties and at the same time tailoring the microstructure to the desired properties. Similar accelerated homogenization has also been observed in magnesium and aluminum alloys during ShAPE of as-cast materials.

In as much as types of alloys exhibit high strength at room temperature and at elevated temperature, good machinability, high wear and corrosion resistance, such materials could be seen as a replacement in a variety of applications. A refractory HE-alloy could replace expensive super-alloys used in applications such as gas turbines and the expensive Inconel alloys used in coal gasification heat exchanger. A light-weight HE-alloy could replace aluminum and magnesium alloys for vehicles and airplanes. Use of the ShAPE process to perform extrusions would enable these types of deployments.

Figure 8:
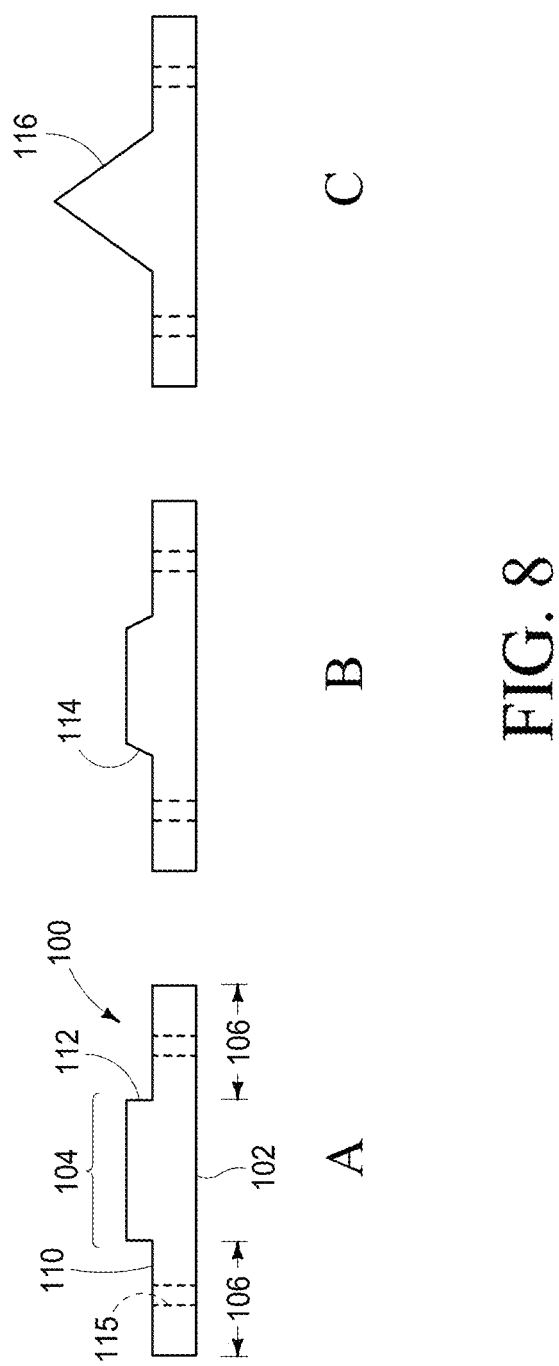
FIG. 8 is a depiction of a series of different die face configurations according to embodiments of the disclosure.

Referring next to FIG. 8, a device for performing shear-assisted extrusion is disclosed with reference to different implementations A, B, and C. In accordance with example implementations, device 100 can be a scroll having a scroll face 110 that includes an inner diameter portion 104 as well as outer diameter portions 106. Accordingly, these 3 scroll faces are shown in accordance with one cross section. As shown and depicted herein, viewed from the face they would have a circular formation. Accordingly, inner diameter portion 104 can extend beyond a surface 110 of outer diameter portion 106. Devices 100 can include apertures 115 arranged within the outer diameter portion and extending through the device toward a side 102 opposite the scroll face 110. As shown and depicted, inner portion 104 can be defined by the member 112 extending from surface 110. In accordance with alternative implementations, this member 112, as well as member 114 in implementation B and 116 in implementation C, may not occupy all of inner portion 104, but only a portion. In accordance with example implementations, portion 104 can be rectangular in one cross section, and with reference to implementation B, member 114 can be trapezoidal in one cross section, and with reference to implementation C, member 116 can be conical in one implementation. In each of these implementations, the member 112, 114, 116 can have sidewalls, and these sidewalls can define structures thereon, for example, these structures can be groves and/or extensions that provide for the transition of material away or towards the perimeter of the scroll face, which then would direct the material being processed through apertures 115.

Figure 9:
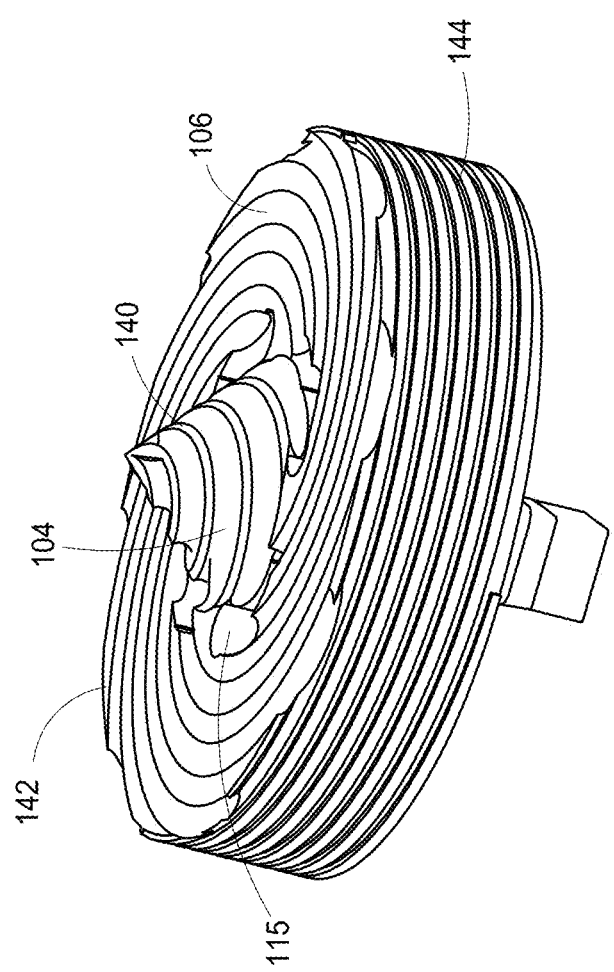
FIG. 9 is an isometric view of a die face tool according to an embodiment of the disclosure.

Referring next to FIG. 9, an example scroll face device is depicted in isometric view having inner portion 104 and outer portion 106. Accordingly, the device can include raised portions 140, 142, and/or 144. These portions can provide for a flow of material in predetermined direction. For example, portions 140 can be configured to provide material to within apertures 115, while portions 142 can be configured to provided material to within the same apertures 115, thereby providing for flow of materials toward one another. Portions 144 can be provided for mechanicals needs as the device is utilized.

In accordance with example implementations, Shear assisted processing and extrusion (ShAPE™) can be used to join magnesium and aluminum alloys in a butt joint configuration. Joining can occur in the solid-phase and in the presence of shear, brittle $Mg_{17}Al_{12}$ intermetallic layers can be eliminated from the Mg—Al interface. The joint composition can transition gradually from Mg to Al, absent of $Mg_{17}Al_{12}$, which can improve mechanical properties compared to joints where $Mg_{17}Al_{12}$ interfacial layers are present.

As alluded to joining Mg—Al is difficult to perform without forming a brittle $Mg_{17}Al_{12}$ interfacial layer at the dissimilar interface. Example applications for material having been joined using the processes of the present disclosure include, but are not limited to:

- Lightweight of rivets and bolts (i.e. Al shank with Mg head or vice versa)
- Multi-material extrusion for structural members (tailor welded extrusions)
- Mg—Al tailor welded blanks formed by slitting and rolling thin-walled tubes
- Corrosion resistant joints due to galvanically graded Mg—Al interface
- Dissimilar Mg alloy or Al alloy joint pairs (i.e. AA6061 to AA7075) Referring to FIGS. 10A-10C, different views of a scroll face or die face of an extrusion die tool are shown including cross sectional views. In accordance with example implementations, the die tool can also be configured with or without scrolls in the die face. For example, when processing high temperature materials like steels, Tungsten Rhenium can be used as the die tool material. This material can engage the feedstock material to the extent that friction or shear is provided thereby producing sufficient deformational heating.

Die tool 200 can include tool sidewalls 202 as well as die face rim 204. In FIG. 10B, die face 208 can have an opening 206 configured to receive and extrude feedstock material mixed and provided during the process. Referring next to FIG. 10C, from opening 206 can extend die face 208. As shown, die face 208 can be extended at an angle in relation to rim 204 or sidewall 202. This angle can be greater than zero degrees as shown in table 3; as an example for tubes fabricated with 12 mm outer diameter and 1 mm and 2 mm wall thickness. In accordance with example implementations this angle can form a portion of the die face, a substantial portion of the die face (for example extending greater than 50% of the radius of the die face), and/or an entirety of the die face from rim 204 to opening 206.

TABLE 3

Extrusions fabricated with differing degrees of angled scroll faces.

|  | Wall Thickness |
| --- | --- |
| 6 Scroll | 1 and 2 mm |
| 4 Scroll, 0 deg | 1 and 2 mm |
| 4 Scroll, 14 deg | 1 and 2 mm |
| 4 Scroll, 26 deg | 1 and 2 mm |
| 4 Scroll, 45 deg | 1 and 2 mm |

Referring next to FIG. 11A, in accordance with another example implementation, die 200 can have an outer rim 204 can have a portion that is substantially planar in relation to face 208 thereby providing a substantially normal relationship between face 204 and sidewall 202. As can be seen with respect to FIG. 11C, face 208 can extend at an angle from this rim to opening 206, and this angle can be measured to an imaginary extension 212 as angle 210.

Referring next to FIG. 12 A, a die 200 is shown with sidewalls 202 and rim 204. Referring to FIG. 12 B, die 200 can have a recess 214 therein about opening 206. Recess or bore 214 can be contiguous with opening 206. In accordance with example implementations and with reference to FIG. 11 C, recess 214 can extend from the face 208 into the die along member or face 216 to a ledge 218, and then to opening 206. Opening 206 has been described in relation to a single extrusion; however, opening 206 can also be a larger opening that can be used in conjunction with a mandrel to provide tubed material as extrusion products, for example.

In accordance with example implementations and with reference to FIGS. 13A-13C, die face 200 can include sidewall 202 and rim 204. As can be seen in FIG. 13B, recess 214 can be defined within die 200, and as shown in FIG. 13C, face 208 can be angled in relation to sidewall 202 and also include recess 214 having side face 216 extending to ledge 218.

Referring next to FIG. 14A, die face 200 can include sidewall 202 and rim 204. As can be seen, rim 204 can be substantially planar as shown in FIGS. 14B and 14C.

Referring next to FIGS. 15A-15B, in accordance with example implementations, die 200 can be used to process feedstock material 220. Material 220 can be a single material or a mix of material as shown with # *, and as the ShAPE process proceeds, the material is sheared and/or plasticized to continue to form extrusion product 222. As can be seen, within recess 214 the material can mix. This mixing can provide for a more homogeneous or stable extrusion product 222.

Referring next to FIG. 16, in accordance with another example implementation, a die 200 is shown processing feedstock material 220. This die can have an angled face as well as shorter extensions extending to a mandrel configuration, wherein mandrel 224 extends between extensions 226. This mandrel configuration with the shorter extensions can provide for a more stable extrusion product 222 in the form of a tube, for example. These extensions can be considered a bearing surface.

Figure 17:
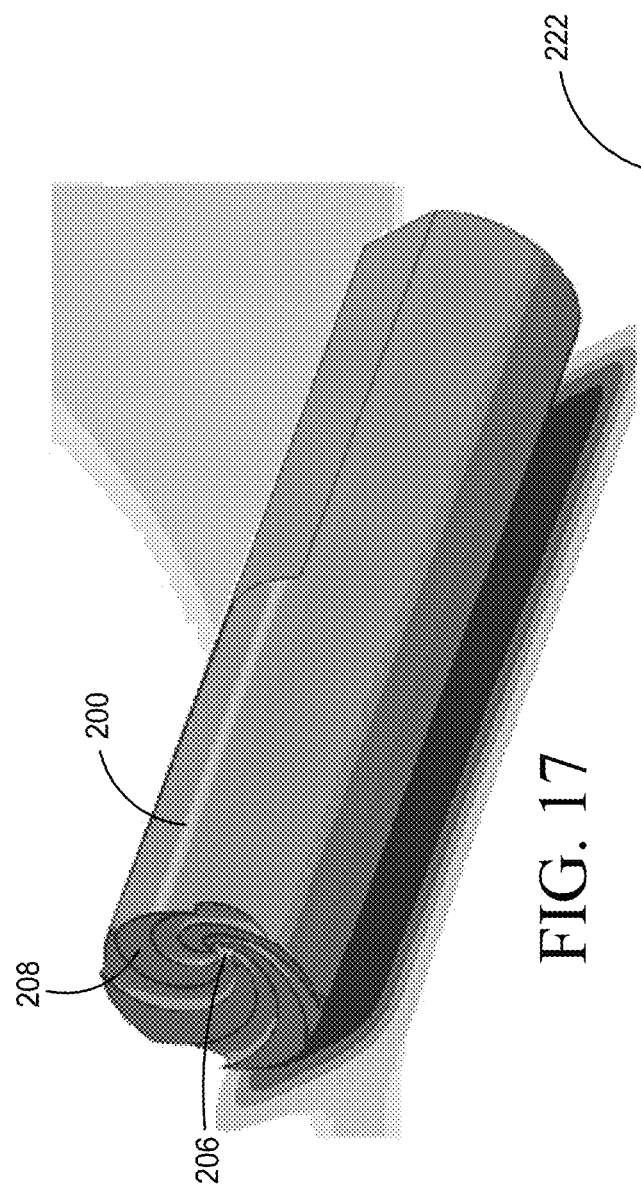
FIG. 17 is a depiction of a die according to an embodiment of the disclosure.
Figure 18:
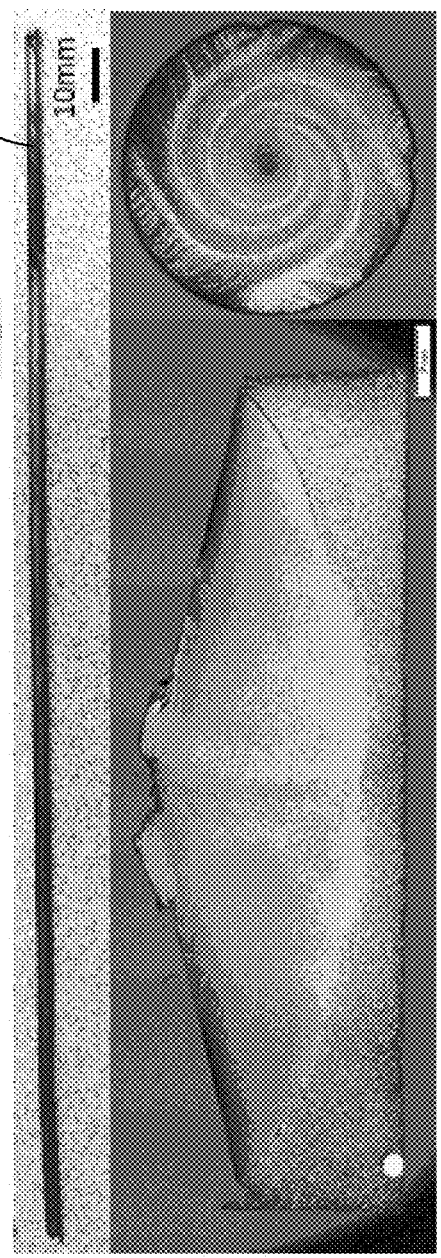
FIG. 18 is a depiction of extruded material as well as a remnant of the starting material according to an embodiment of the disclosure.

Referring next to FIGS. 17 and 18, an example die 200 is shown having face 208 as well as opening 206. In accordance with example implementations, an extrusion product 222 is shown that can be provided utilizing this die 200. Additionally, the feedstock material can be seen, and the extrudate can be seen in accordance with FIG. 18.

Figure 20:
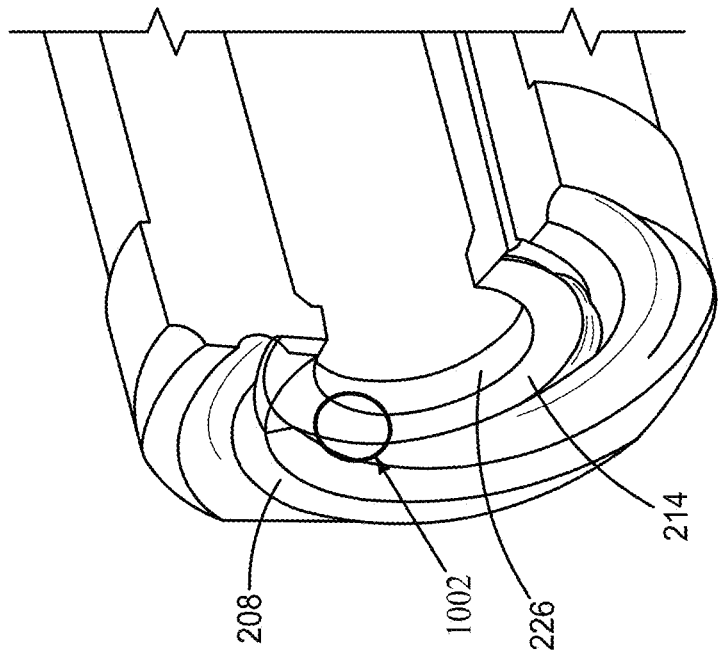
FIG. 20 is a depiction of a die according to an embodiment of the disclosure. Die for purposes of this disclosure refers to scroll face or incorporated die, for example.
Figure 19:
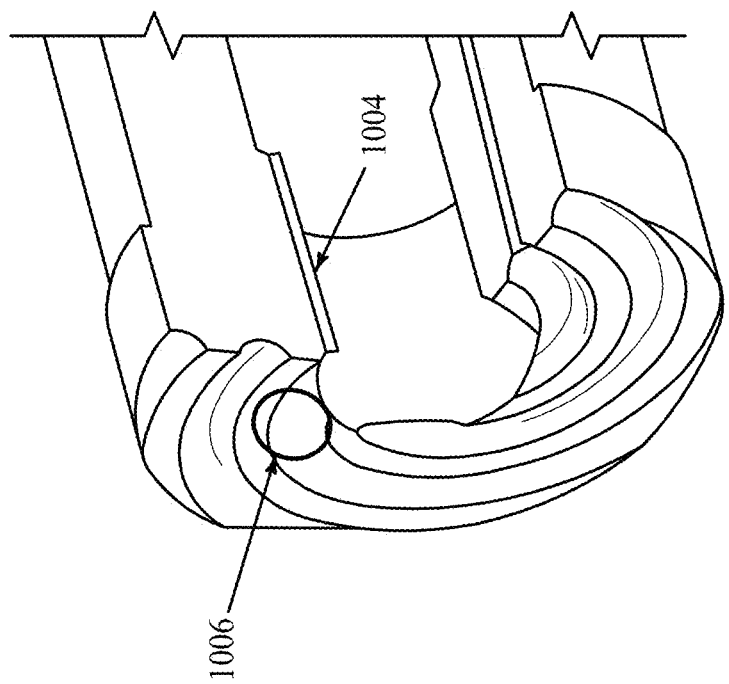
FIG. 19 is a depiction of a die according to an embodiment of the disclosure.
Figure 21:
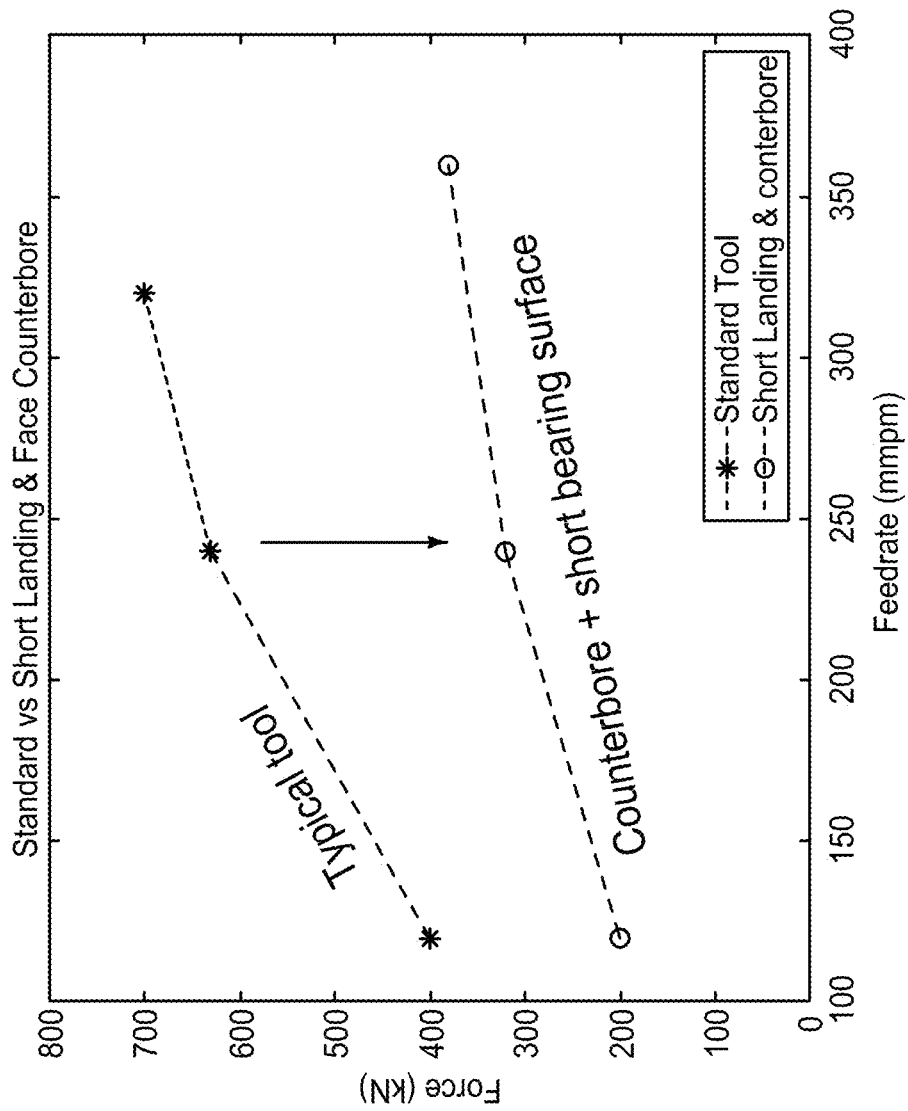
FIG. 21 is data demonstrating reduced extrusion force utilizing die configurations of the present disclosure.
Figure 22:
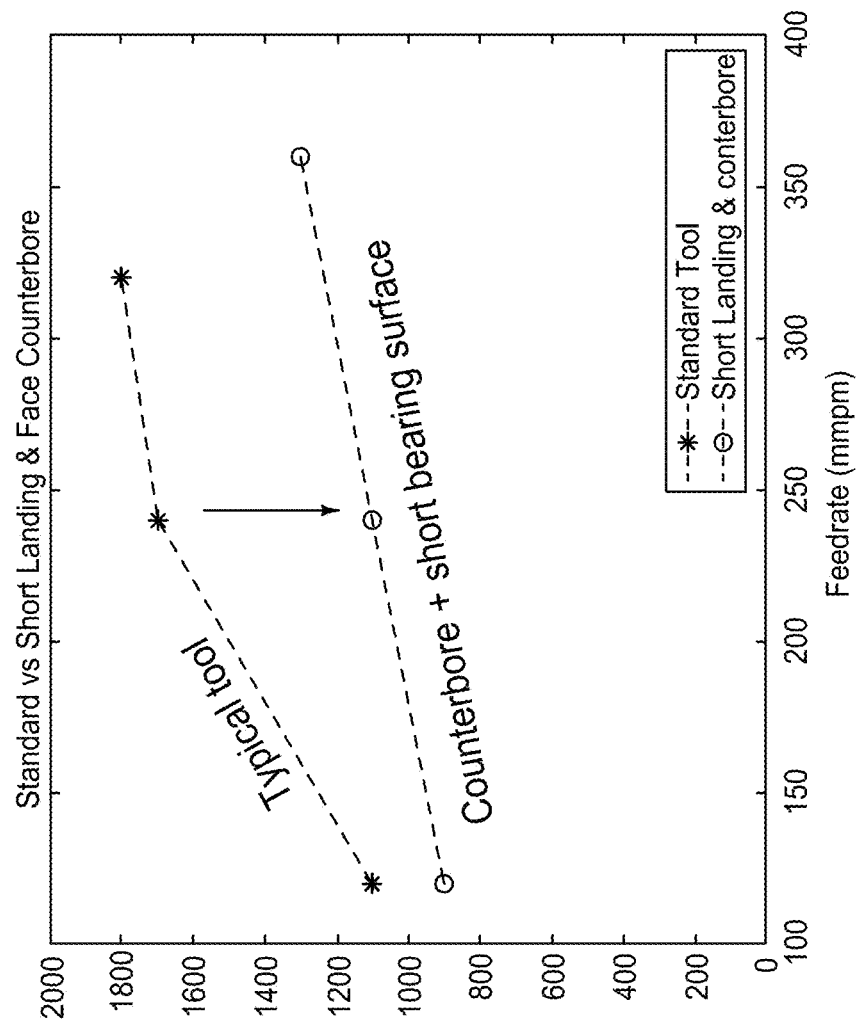
FIG. 22 is a depiction of data depicting reduced motor torque utilizing dies of the present disclosure.

Referring next to FIG. 19, an example die face is shown having a long bearing surface and without a counterbore or recess 214. As depicted FIGS. 19 and 20 represent two different scroll die configurations. FIG. 19 depicts a die tool having a long bearing surface 1004 and no counterbore 1006, while FIG. 20 depicts a die tool with a counterbore 1002 and short bearing surface 226. As shown in FIG. 20, the die face has a short bearing surface 226 as well as a recess 214 within face 208. In accordance with example implementations and with reference to FIG. 21, utilizing these die faces with the angles and counterbores can provide for reduced extrusion force. As shown in FIG. 22, these die faces can provide reduced motor torque.

Figure 23:
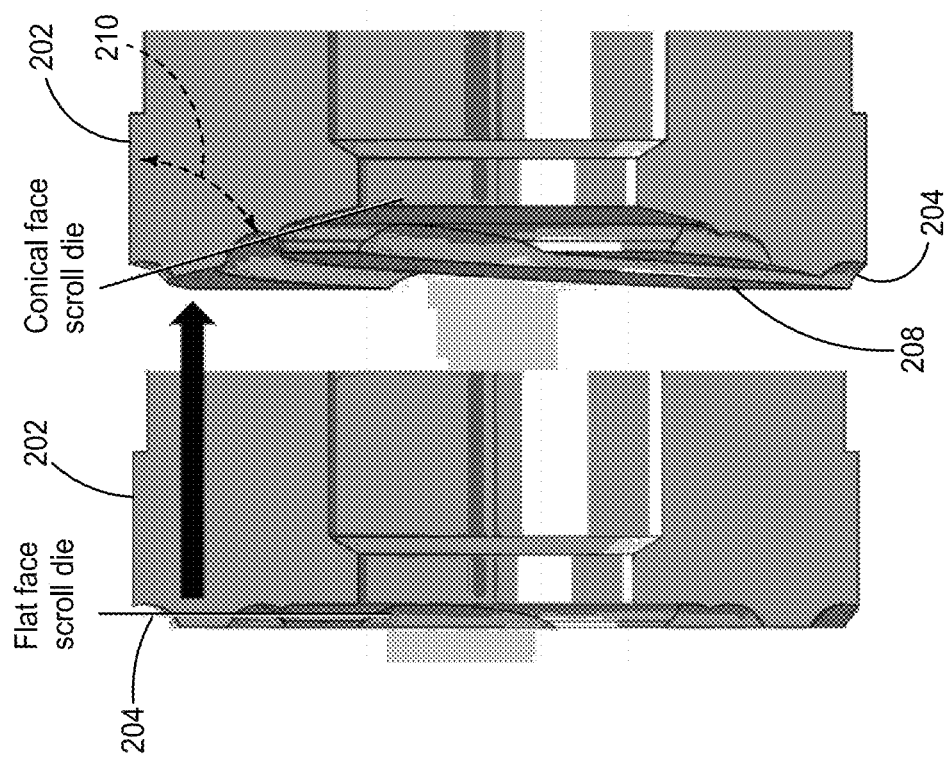
FIG. 23 is a depiction of two dies, one having a flat face and one having a conical face according to an embodiment of the disclosure.
Figure 24:
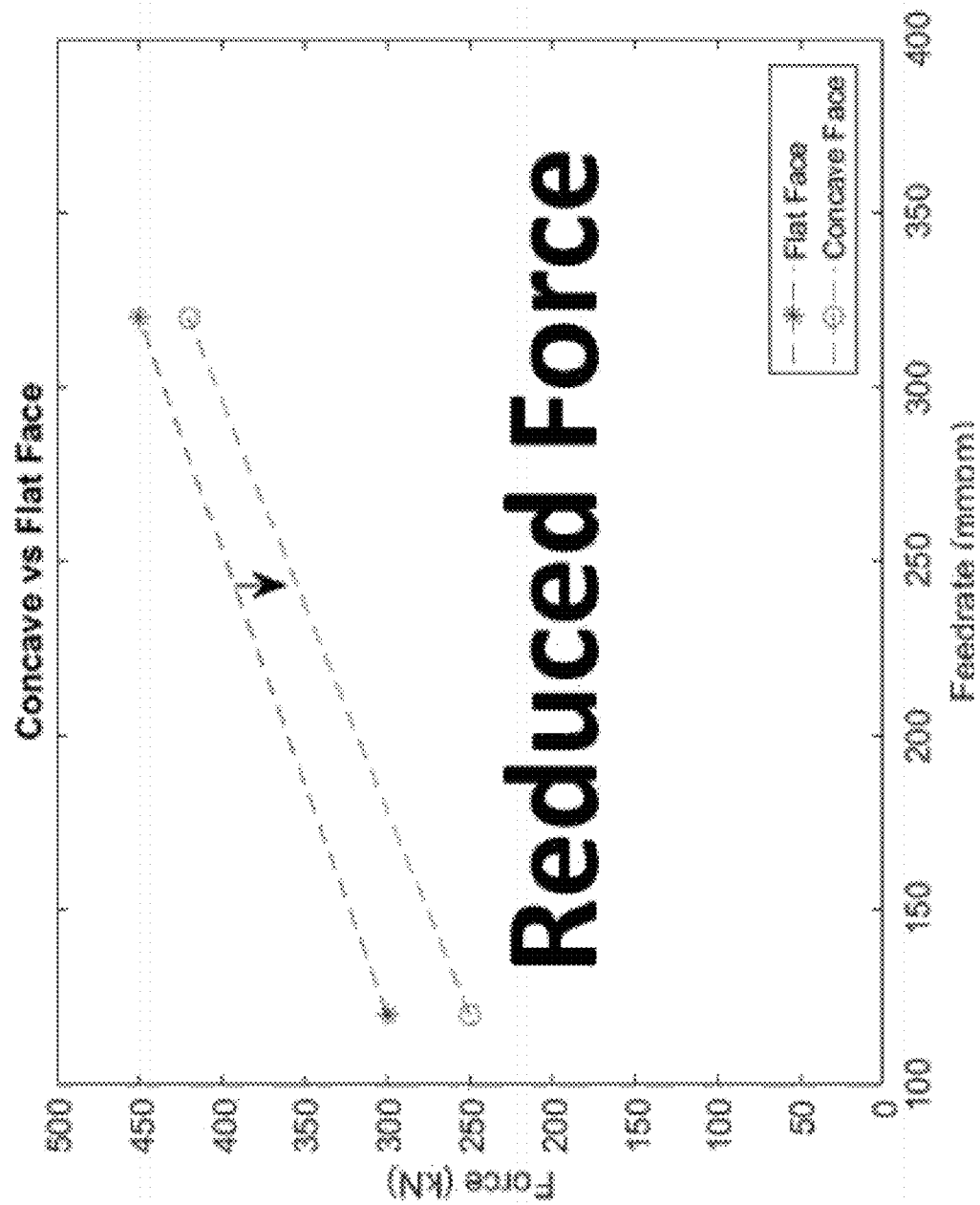
FIG. 24 is a depiction of data demonstrating reduced force utilizing dies according to an embodiment of the disclosure.
Figure 25:
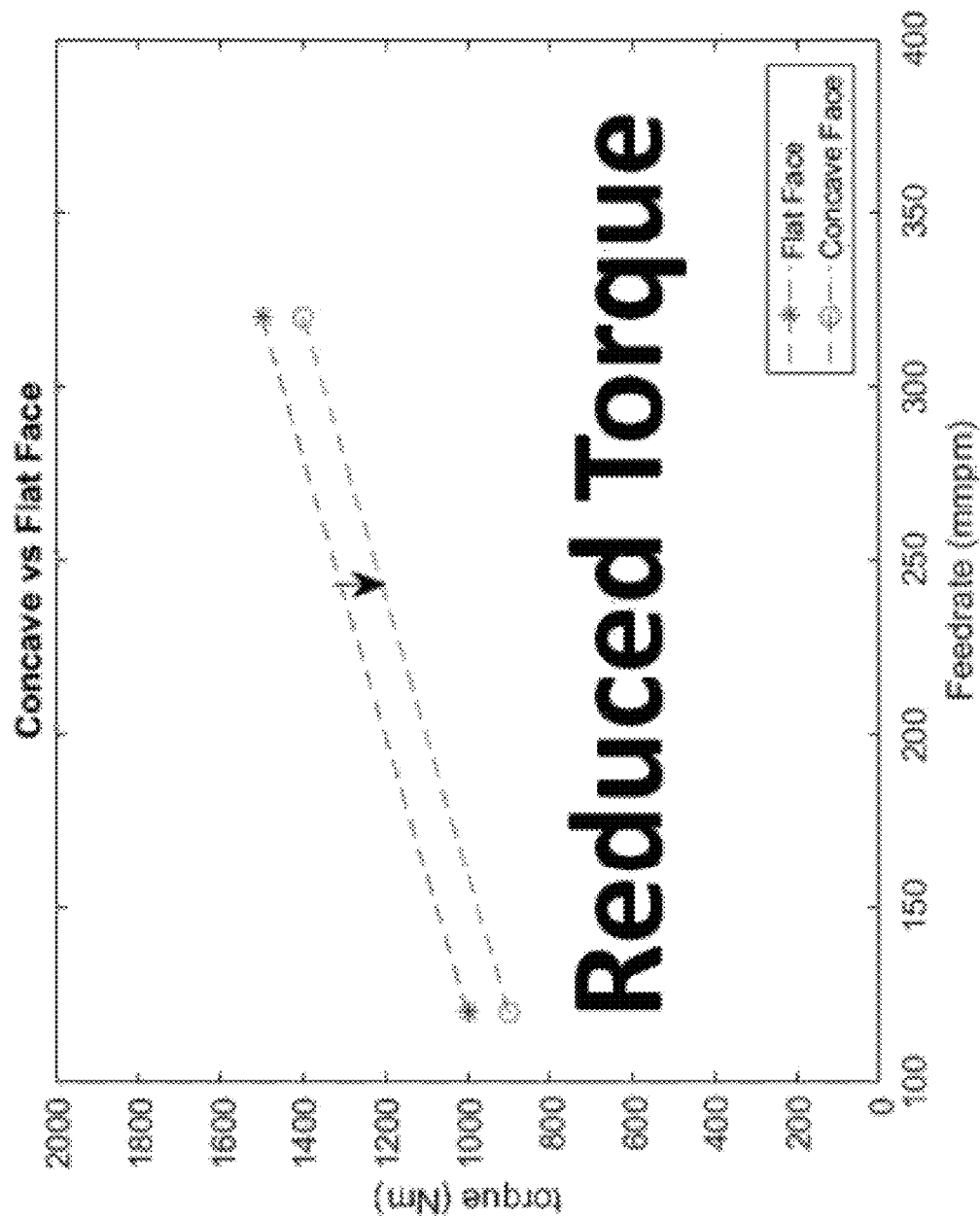

Referring next to FIG. 23, a pair of die faces are compared, one having a flat scrolled die face with a counterbore, and one including a conical die face or angled die face having angle 210 with a counterbore. Utilizing these die faces, reduced force is provided as shown in FIG. 24; reduced torque is provided as shown in FIG. 25; and reduced temperature is provided as shown in FIG. 26.

Referring next to FIG. 27, utilizing the counterbore 214 and a short bearing surface, a tubular extrusion product having a straight nice finish can be provided as compared to a die face having a longer bearing surface shown above.

Referring next to FIGS. 28-29, again with a long bearing surface as shown in FIG. 28, the extrusion product is fragile and twisted with a rough surface, whereas the extrusion product prepared using a short bearing surface and a recess is considered fully consolidated and a straight surface.

Referring next to FIGS. 30-31, a comparison of extrusion products having different millimeters and different degrees is shown ranging from greater than 0 degrees to at least 45 degrees. Referring next to FIGS. 32-34, an example die face is shown in FIG. 32, and an improved die face is shown in FIG. 33 having a flat or planar rim 204 resulting in an improved product as shown in FIG. 34. Referring next to FIGS. 35 and 36, data utilizing the scrolls of the present invention is disclosed.

In accordance with example implementations, materials can be engaged using the ShAPE technology of the present disclosure. For example, Mg alloy ZK60 can be joined to Al alloy 6061, without forming an $Mg_{17}Al_{12}$ interfacial layer. To accomplish this, the ShAPE™ process can be modified to mix ZK60 and AA6061 into a fully consolidated rod having an Al rich coating as a corrosion barrier. Referring next to FIG. 37, a 5 mm diameter rod extruded from distinct Mg and Al pucks is shown in FIG. 37 (A) with full consolidation shown in FIG. 37 (B), and FIG. 37 (C) shows a gradient in the composition (magenta Al map) between the Al rich surface and rod interior. Analysis showed the critical result that the $Mg_{17}Al_{12}$ β-phase did not exist as an interfacial layer, rather the IMC was highly refined and dispersed throughout the extrusion.

Referring to FIG. 38, an example solid-phase method for joining Mg to Al extrusions in a butt configuration is shown. In accordance with example implementations, separate Mg and Al billets can be interlocked to form a single billet that will be extruded using the ShAPE process for example. As the die rotates and plunges to the right, an Mg alloy extrusion forms as the material is consumed. The rotating die then penetrates into the interlocking region of the two feedstock materials where Mg and Al are mixed and extruded simultaneously to form the dissimilar joint. Once the die penetrates past the interlocking region of the two feedstock materials, an Al alloy extrusion forms as material continues to be consumed. As shown in FIG. 39, a multi-material rod or hollow-section extrusion can be fabricated absent of a brittle $Mg_{17}Al_{12}$ interfacial layer is shown. The method can be used for rods and/or tubes of varying diameters.

The geometry of the interlocking region can be tailored to control the composition and transition length of the Mg—Al joint region. The geometric possibilities are many but two examples are shown in window 160 in FIG. 38; one abrupt (flat pie shaped interface having complimentary portions 162a and 162b that interlock to form interlocking region 163), and one gradual (triangular spokes interface having complimentary portions 164a and 164b that interlock to form interlocking region 165). The most abrupt interface can be achieved with a flat interface between the Mg and Al billets.

In accordance with at least one implementation, with triangular spoked interlocks 165, the composition of Mg in Al goes from 0% to 100% at a rate depending on the number of spokes and angle of the triangle's vertex. This method has been used to demonstrate a transition length of 37 mm to illustrate the concept. Because the joint is formed by mixing in the solid phase, an $Mg_{17}Al_{12}$ interfacial layer will not form. Rather, a gradient in chemical composition and also possibly grain size will form across the dissimilar interface with the intense shear refining and dispersing any $Mg_{17}Al_{12}$ second phase formations. The composition gradient at the Mg—Al interface has a secondary benefit of also being a galvanically graded interface which can improve corrosion resistance. Referring to FIG. 40 Mg—Al tailor welded blanks are shown, with a galvanically graded interface, made by slitting and rolling tubes. In accordance with example implementations, rolling of 75 mil thick ZK60 tubes down to 3 mil foils can be achieved using these tailor welded blanks. Referring to FIG. 41, using interlocked feed material of AA7075 and AA6061, using the methods of the present disclosure, AA7075 can be butt jointed with AA6061 as shown with an abrupt (pictured) or extended transition length.

Accordingly, an extrusion process for forming extrusion of a desired composition from a feedstock is provided. The process can include providing feedstock for extrusion, and the feedstock comprising at least two different materials. The process can further include engaging the materials with one another within a feedstock container, with the engaging defining an interface between the two different materials as described herein. The process can include extruding the feedstock to form an extruded product. This extruded product can include a first portion that includes one of the two materials bound to a second portion that can include one of the other two materials.

Accordingly, the interface between the two materials can interlock the one material with the other material and the geometry of the interlock can define a ratio of the two materials where they are bound. This ratio can be manipulated through manipulating the geometry of the engagement. For example, there could be a small amount of one of the materials entering into a perimeter defined by the other of the two materials, and vice versa. In accordance with example implementations and specific examples, one of the materials can be Mg and the other can be Al. The process can also include where the one material is Mg ZK60 and the other material is Al 6061. Accordingly, there could be one material that has one grade and another that has another grade. For example, the material can be AA7075 and the other material can be AA6061. In accordance with example implementations, these billets can be part of the feedstock and the billets can be interlocked.

The extrusion feedstock materials may have a geometry that defines a ratio of the two materials when they are extruded as bound extrusions. The feedstock materials can be aligned along a longitudinal axis, and according to example implementations this can be the extrusion axis. The interlock of the billets can reside along a plane extending normally from the axis, and accordingly, the plane can intersect with both materials.

In order to improve the formability of magnesium sheet materials, the inventors believe that the grain sizes should be less than 5 microns and/or a weakened texture is desirable. It has been demonstrated that the novel Shear Assisted Processing and Extrusion (ShAPE) technology can not only attain the aforementioned microstructure but also help with the alignment of the basal planes (i.e. texture). This technology can also reduce the size and uniformly distribute the second phase particles, which are believed to impede the formability of sheets. In accordance with example implementations, extruded tubes of Mg can be slit open and rolled into the sheet. Extruded tubes of magnesium (ZK60 alloy) using the ShAPE process can be provided which can be 50 mm in diameter and 2 mm in wall thickness, or another diameter and wall thickness. These tubes can be slit open in a press and then rolled parallel to the extrusion axis, for example.

Referring next to FIG. 42, in particular embodiments, Mg sheets can be provided that are not common in mass produced vehicles, for example. The production of these sheets can include the use of rolling of ShAPE produced and open extruded tubes. In accordance with example implementations, and with reference to FIG. 42, an example rolling mill 130 is shown. In accordance with example implementations, rolling mill 130 can have conveyer 132 but have a sheet 134 of a first thickness and after passing through mill 130, the sheet 134 can be a sheet 136 of a second thickness. In accordance with example implementations, this rolling can be cold rolling, hot rolling, or twin rolling. ShAPE extrusions such as ShAPE tubing can provide a feedstock for subsequent rolling that can provide differentiated and/or advantageous grain size, second phase size and distribution, and/or crystallographic texture when compared to conventional feedstocks for rolling.

Referring next to FIG. 43, a series of depictions are shown demonstrating a ShAPE fabricated Mg ZK60 tube and the open tube thickness as well as the rolled tube rolled hot to a desired thickness. In accordance with example implementations, the rolled tube can be annealed between passes at between 420° C. and 450° C. for 5 minutes, and can be performed without a twin roll casting if desirable.

Referring next to FIGS. 44A and 44B, in accordance with example implementations and as described herein, these Mg billets such as the ZK60 billet can be produced about a chilled mandrel as disclosed herein, with frictional heat to produce a tube having an extrusion direction and basal planes about that extrusion direction. In accordance with example implementations, these materials can be anisotropic which can make them quite robust.

Referring next to FIG. 45, a series of passes are shown from zero passes all the way to 16 passes of a Mg sheet. In FIG. 46 a 0.005 inch thickness sheet is shown and demonstrated the flexibility and robustness in the accompanying two figures. In accordance with example implementations and with reference to FIG. 47, reduction per rolling pass has been plotted, and as can be seen, after about 5 rolling passes, the thickness remains uniform, but after 10 rolling passes, there can be a reduction in thickness of up to 60%. Such large reductions per pass are difficult to impossible to achieve with hot rolling of conventional Mg feedstocks intended for subsequent rolling operations.

Referring next to FIG. 48A, according to an example implementation of the present disclosure, upon ingot formation of an as-cast billet, for example, the as-cast billet can be heated prior to extrusion, or not heated prior to extrusion. As FIG. 48A shows, this series of steps does not include a homogenization step. To the extent it may include homogenization as detailed with reference to FIG. 48B, that homogenization will not be performed to the length and extent that the prior art methods dictate and billet pre-heating in a furnace may be eliminated and accomplished entirely by the ShAPE process.

Accordingly, the methods of the present disclosure for preparing an extruded product from a solid billet can include providing an as-cast billet for extrusion. These as-cast billets are billets that have not been prepared to remove microfissures, convert phases, homogenize the billet to have a more uniform consistency throughout prior to extrusion. Billets with some amount of stress relief and phase conversion may also be used. To have a uniform consistency, convert phases, and removal of microfissures, the present disclosure provides applying a simultaneous rotational shear and axial extrusion force to the as-cast billet to plasticize the as-cast billet. During this performance of the method, the materials themselves are homogenized and/or plasticized, and the method can include extruding the plasticized as-cast billet with an extrusion die to form an extruded product. As such the metallurgical functions of stress relief, phase conversion, and homogenization may in part, or entirely, be accomplished by the ShAPE process.

As detailed herein, this can include the ShAPE technology described above. In accordance with an example implementation, the as-cast billet can be heated for approximately 17 hours between about 200° C. and 490° C. without a subsequent homogenization step prior to applying the simultaneous rotational shear and axial force. Additionally, where heat is applied, it can be applied in steps at predefined temperatures for predefined durations of time. For example, the temperature change between two of the steps can be about 260° C., or between two of the steps can be about 30° C. in temperature change, or other temperature differences combinations. Even when applying this heat for this time, the as-cast billet may not be homogenized prior to applying the simultaneous rotational shear and axial extrusion force to the as-cast billet. Accordingly, the as-cast billet can include intermetallic and/or distinct microstructures prior to the application of the rotational shear and axial extrusion force.

Referring to FIG. 48B, ingot formation can be performed, and then the as-cast billet can be homogenized prior to extrusion with or without pre-heating. For example, the billet can be provided for extrusion, but while maintaining a majority of the billet below 100° C. prior to extrusion, a simultaneous rotational shear and axial extrusion force can be applied to one end of the billet to plasticize the one end of the billet. The plasticized one end of the billet can form an extruded product using the die. The billet itself may be as-cast or it may be homogenized in accordance with prior art techniques. However, the billet itself will not be heated to greater than 100° C. before being extruded. In accordance with example implementations, the billet can be maintained at about ambient temperature prior to starting the extrusion process.

With regard to FIG. 48C, the ingots can be formed and then extrusion can take place. Accordingly, as shown, ingot formation can provide an as-cast billet complete with microstructures and portions that are non-homogenous, and then provided directly for extrusion utilizing the methods of the present disclosure without stress relief, phase conversion or pre-heating the as-cast billet to a temperature great than 100° C. prior to starting the extrusion process.

Referring next to FIG. 49A, as is shown, in at least one example implementation a portion of homogenization can be performed but a significant amount of time can be removed. As can be seen, at least 20 hours is removed. FIG. 49B shows an additional thermal treatment sequence where homogenization is also eliminated and only stress relief and phase conversion are needed.

Referring next to FIG. 50, data of material prepared from AA7075 as-cast billets is provided with ultimate yield and strength, and elongation percentage, and a die temperature as shown when heat treated to the T6 condition after extrusion. As is shown, the die temperature can be as low as approximately 340° C. but can be as high as 480° C. Extrusion below 340° C. is also possible. However, this temperature range does not apply to the entirety of the billet; it only applies to the very end of the billet as it is being extruded and plasticized. Additionally, these methods can be performed on any number of materials, but these example specific materials are AA7075 materials where ASTM and ASM standard values are exceeded for T6 properties. As detailed in this specification, a range of materials can be utilized for these processes and include magnesium, aluminum, and all others listed herein.

As described above, in a conventional linear force extrusion process, the billet itself is pre-heated in a furnace such as a jet billet log furnace to soften the billet to assist with the plasticization of the billet during extrusion. The present disclosure does not require such billet pre-heating in a furnace, and the only heating taking place occurs at one end of the billet as a result of the heat generated by the extrusion process, while a portion of the remainder of the billet remains at a lower temperature than the die/billet interface, for example.

Referring next to FIG. 51, an example extruded product is shown which demonstrates the uniformity and surface finish of the product in the as-extruded condition having been extruded from as-cast billets that did not undergo homogenization or billet pre-heating.

Referring next to FIG. 52, an example extrusion process includes extrusion and solution heating. However, this solution heating is substantially different than the solution heating of the prior art. As can be seen in FIG. 53, the solution heating with aluminum alloy 6063 with T6 heat treatment can include solution heat treating for 1 hour at 530° C. quenching, and then artificially aging at 177° C. for 8 hours. With T5 heat treatment, there is no solution heat treating, and there is no quench, and the artificial aging can take place at 177° C. for less than 8 hours.

Now it must be noted that typically in the prior art, a requirement of substantially more time is required for the artificial aging. In accordance with example implementations of the present disclosure, peak hardness can be obtained after artificially aging the extruded product for less than 10 hours and in general lower time than is standard and solution heat treat times and temperature below that specified in ASTM standards.

In effect, the ShAPE process is able to manufacture AA6063 in the T5 condition that has strength properties well above the ASTM and ASM standards for AA6063 in the T5 condition. Strength properties of AA6063 made by ShAPE in the T5 condition exceed the ASTM strength values for AA6063 in the T6 condition and approach the ASM strength properties of AA6063 in the T6 condition. Accordingly, excellent properties are obtained without the need for solution heat treating and quenching when extruding with ShAPE.

Additionally, these methods can be performed on any number of materials, but these example specific materials are AA6063 materials and near T6 properties can be achieved using the T5 conditions. As indicated in this specification, a range of materials can be utilized for these processes and include magnesium, aluminum, and all others listed herein.

Referring next to FIG. 53, data is shown that demonstrates the reduction in solution heat treating time and temperature when solution heat treating is performed at 450° C. for 15 minutes by flash annealing, while the conventional ASTM standard is heat treating at 465° C. for 40 minutes. Flash annealing is performed on the extruded product under UV radiation from lamps such as high energy lamps.

As shown, the ShAPE extruded product can perform as well with lower temperature and time. As shown in FIG. 53, AA7075 Rod extrusion is provided, demonstrating like preparation without the additional time and at a lower temperature.

Referring to FIG. 54, Rod extrusion for AA6061 is shown that demonstrates a much shorter solution heat treatment time, 530° C. for 15 minutes rather than the ASTM standard of 530° C. for 120 minutes is possible with flash annealing of ShAPE extrusions. As can be seen, that when the solution heat-treatment time has been reduced from 2 hours to 15 minutes at 530° C. by flash annealing that like material hardness is achieved after the same artificial aging time at 530° C. for longer times.

Referring next to FIG. 55, data for two different extrusion trials is shown that demonstrates the decreasing of artificial aging time using the ShAPE process from 24 hours to 5-10 hours for AA7075 after a typical solution heat treatment of 480° C. for 24 hours for both of the extrusion trials shown. Accordingly, the present disclosure provides for aging the extruded product for approximately 3-10 hours or as contemplated.

Referring next to FIGS. 56A and 56B, the extrusion is shown in FIG. 56A to go right to aging, and then also in FIG. 56B, solution heat treating and aging can be used as well.

Referring next to FIG. 57, data is presented that demonstrates the peak hardness of the material can be achieved after 3 hours of aging at 120° C. It must be noted that the ASTM handbook specifies a minimum of 22 hours at 120° C. for peak artificial aging of AA7075. Accordingly, the present disclosure provides methods that can be used to significantly reduce aging. In accordance with example implementations, the present disclosure provides methods that significantly reduce the temperature and energy required and time necessary to prepare satisfactory extrusion products.

While the largest applications of aluminum alloys is as cast or wrought articles, the powder metallurgy (PM) route has recently been utilized to produce net- or near-net-shape parts. This route is economically competitive for relatively small parts which would otherwise require extensive machining if fabricated from a bulk alloy. Additionally, aluminum PM benefits from more homogenous microstructures than wrought articles, and unique chemistries realized by rapid solidification or mechanical alloying. However, the conventional press-and-sinter approach presents great difficulty for aluminum alloys due to a tenacious oxide layer preventing full powder bonding, resulting in comparatively low strength and ductility. Other more complicated powder densification processes, which typically require multiple steps (canning, degassing, compaction, and extrusion or forging), break the powder oxide layers by severe deformation, thus resulting in near-theoretical density and good mechanical properties.

Referring next to FIGS. 56A-57, extruded material using the apparatus and/or methods described herein can be utilized without additional costly post extrusion treatment processes, although typical quenching can be employed during the extrusion process. As is shown in FIGS. 56A and 56B, extruded material can be treated with aging and/or solution heating and then aging. The aging process for each of these methods takes a substantial amount of time. As shown in FIG. 57, peak hardness of material extruded using ShAPE can be achieved after 3 hours at 120° C.

The stock material extruded using ShAPE can include powder material, casting material, and/or flake, powder, or scrap material. The material can be a solid billet or mixture of solid billets. The solid material can include one or more of the materials listed herein.

The extruded material can have a hardness of at least 155 HV after 3 hours of aging. Additionally, the extruded material may be solution heated and then aged. However, the aging of the extruded material after solution heating is performed for less than 3 hrs.

Powder metallurgy (PM) of high strength aluminum (Al) alloys typically requires multiple process steps prior to extrusion. In general, compacting powder into a densified billet or canning powder in a sealed container are the primary methods used to ready material for PM extrusion and have endured as the most widely utilized approaches for high strength Al alloys. For powder canning, typical steps include loading powder into a can, degassing, sealing the can, and heating. For powder compaction, typical steps include degassing, hot or cold isostatic pressing, and heating the densified billet. Eliminating any of these steps could make PM more cost effective. The compaction and canning processes have been researched extensively for high strength PM Al alloys.

Utilizing the apparatus and/or methods of the present disclosure, frictional heating of billet material in substantially powder form (most, if not all of the billet material is in powder form) can be localized to the die face, and spiral grooves, or a flat face without grooves, draw billet material towards the hollow center of the die utilizing (ShAPE). As the powdered billet is consolidated by compressive and shear forces within the deforming material (plasticizing) and frictional heating at the die face and within the deforming material, solid material is extruded. In accordance with at least some embodiments of the disclosure, low extrusion forces are required compared to conventional extrusion. Additionally, by directly creating solid extrudate from loose powder, many of the complicated processing steps necessary for the other methods are eliminated, presenting a scalable method to produce high strength aluminum alloys. These methods can be utilized successfully to extrude magnesium flakes and/or a gas-atomized aluminum alloy powder containing 12.4 wt. % transition metal. The ShAPE process can extrude hollow tubular profiles directly from powder which is not readily possible with conventional powder metallurgy extrusion.

TABLE 4

Mechanical properties of extruded powder materials (ShAPE and non-ShAPE)

| Method | Temperature (° C.) | Yield Strength (MPa) | Elongation (%) |
|---|---|---|---|
| PM Extrusion | Ambient | 375-405 | 4.5-9.0 |
| ShAPE Extrusion | Ambient | 380 ± 13 | 15.74 ± 2.5 |
| ShAPE Extrusion | 200/300 | 314/238 | 9.5/9.4 |

Testing performed per ASTM B557

As shown above in Table 4, the ShAPE materials demonstrated superior mechanical properties when compared to non-ShAPE extruded materials. In accordance with example implementations and with reference to FIGS. 58-60, the ShAPE materials improved the mechanical properties of the powdered materials they were manufactured from. For example, all materials were refined with ShAPE to allow for more mechanically strong realignment of elements. This alignment of elements provides superior strengthened matrices as shown.

Accordingly, methods for preparing an extruded material by shear assisted processing and extrusion from a powder billet are provided. The method can include providing a billet of material in substantially powder form. This powder can be considered a loose powder (unpacked, or noncompacted). The powder can include one or more of Al, Mg, Fe, Si, and/or Zr. The billet material can have a maximum particle size of 100 um, but particle sizes greater than 100 um can be utilized as well. The powder can include an oxide or powder component The method can include applying both axial and rotational pressure to the material to deform at least some of the material, and extruding the material to form an extruded material as described herein. Particularly, an extrusion die defining spiral grooves can be used.

The extruded material include an alloy and/or can have a tensile strength from about 220 MPa to about 360 MPa. Additionally, the extruded material can have a hollow profiles (i.e. hollow tubes that are circular, non-circular, or even have multiple hollow zones), as shown and described herein.

The ShAPE process can be used to prepare product materials from Al—Mg—Zr powder. The application of ShAPE to high performance aluminum powders can eliminate process steps used during PM extrusion. Specifically, canning, degassing, sealing, charge pre-heating, cold/hot isostatic pressing, extrusion, and decanning used in PM extrusion can be eliminated and replaced by container filling, compaction, and subsequent ShAPE processing. Process parameters (rpm, feed rate, forge force and temperature) can provide for the extrusion of fully consolidated extrudates (extruded material).

High performance bulk material from aluminum powders that include alloys can be fabricated. By combining the versatility of the ShAPE process and the far-from-equilibrium microstructures of the gas-atomized Al—Mg—Zr Add-alloy powders, PM parts can be designed and developed for mass applications from precipitation-strengthened aluminum alloys with outstanding coarsening resistance that have high thermal stability.

ShAPE can increase extrusion speeds, for example in the preparation of aluminum alloys. The ShAPE process parameters and tooling enable fast extrusion speed for aluminum alloys, which traditionally have been difficult to extrude. Conventional extrusion speed(s) for aluminum alloys in series 2XXX and 7XXX are generally 1-2 meters/minute. The ShAPE processes and methods described herein increase extrusion speed(s), which can, in some examples, reduce the cost of 7XXX (7 series), 2XXX (2 series), and other alloy extrusions, aluminum and non-aluminum. The ShAPE process has been advanced for fabrication of AA7075 extrusions at extremely high speed(s) compared to conventional extrusion. For example, a speed of 7.4 meters/minute has been achieved with mechanical properties equal to, or in excess of, properties achieved from slow speed conventional extrusion (i.e., the ASTM B241 standard and/or consistent with the typical values in the ASM handbook).

Accordingly, methods for preparing extruded material by shear assisted processing and extrusion are provided that can include applying both axial and rotational pressure to stock material to form an extruded material at a rate between 2 and 13 m/min in some implementations, 3 and 13 m/min in others, and 7 and 13 m/min in still others. As described herein, the stock material or billet material can be defined by castings, or chunks of material randomly aligned. This material can be sourced as recycled material and can include Al and/or any of the materials listed herein.

The methods can include maintaining a temperature of the die face below 420° C.

The extruded material has a tensile strength between 500 and 580 MPa, a yield strength between 420 and 500 MPa, and/or an elongation % between 12 and 18.

Homogenized AA 7075 castings were machined into billets having an inner diameter (ID) of 10.1 mm, outer diameter (OD) of 31.8 mm, a length of 100 mm. Extrusions were fabricated using a ShAPE machine manufactured by BOND Technologies capable of 900 kN axial force and torque of 3000 Nm at 500 rpm. The linear speed of tailstock is 0.36 meters/min which gives an extrusion speed of 7.4 meters/min for the extrusion ratio of 20.6, for example. Speeds up to 12.2 meters per minute and beyond have been achieved for 7XXX and 2XXX. In conventional extrusion, a high peak force is required at the beginning of direct and indirect extrusion processes, which is known as the breakthrough force. This is because a given pressure is required to start deforming the material, which drops to a lower pressure once the material starts flowing. This is not desirable because the peak breakthrough force dictates the required capacity of the extrusion press. Lower force means a smaller extrusion press and lower operating cost. The origin of the work is that the research team was trying to keep the force as low as possible to get the highest speed extrusion possible out of the research scale ShAPE machine which is limited to 900 kN.

Breakthrough force was eliminated by ramping ram speed (generally ramping up) and rotational speed of the die (generally ramping down). In doing so, these parameters are balanced to generate heat sufficient to locally soften the billet material ahead of the die. Because the material that the die encounters is always soft from the very beginning of the stroke, the force gently rises to steady state for shear extrusion. This is in contrast to conventional extrusion where force rises quickly to a peak force as the die encounters cooler material and then reduces to lower the steady state value.

As can be seen in FIGS. 61 and 62, the initial axial force can be ramped to a steady state axial force, and/or the rotational rpms can be decreased during the ramping. This data is shown with speed, power, and torque data in FIGS. 62-65. Particularly, in these FIGS., as the axial force is decreased, the tool temperature increases.

Table 5 below provides a list of example alloys and a rating of extrusion difficulty.

TABLE 5

| Alloy | Difficulty |
|---|---|
| 1000 | 77 |
| 1100 | 86 |
| 6063 | 100 |
| 3005 | 106 |
| 3003 | 112 |
| 6105 | 134 |
| 4047 | 128 |
| 3105 | 126 |
| 6061 | 151 |
| 5005 | 154 |
| 7004 | 157 |
| 2011 | 171 |
| 3004 | 180 |
| 6082 | 197 |
| 2014 | 202 |
| 5052 | 229 |
| 5056 | 232 |
| 2024 | 247 |
| 5054 | 265 |
| 7150 | 269 |
| 7050 | 280 |
| 5083 | 281 |
| 5182 | 293 |
| 5456 | 300 |
| 7075 | 316 |

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A method for preparing an extruded material by shear assisted processing and extrusion from a stock material, the method comprising:
   providing the stock material in a container for shear-assisted extrusion; and
   establishing both axial and rotational force at an interface between a face of a die tool and the stock material to deform at least some of the stock material and to extrude the deformed stock material through the face of the die tool to provide an extruded material, wherein the face of the die tool is generally perpendicular to the axial force and comprises at least one spiral groove; wherein:
   the axial force does not decrease during the extrusion; and
   a rotational speed associated with the rotational force is decreased during a ramp-up of the axial force.

2. The method of claim 1 wherein the stock material is loose powder.

3. The method of claim 2 wherein the loose powder of the stock material has a maximum particle size of 100 μm.

4. The method of claim 2 wherein the loose powder of the stock material has a particle size greater than 100 μm.

5. The method of claim 2 wherein individual particles of the powder include an oxide component.

6. The method of claim 1 wherein the stock material comprises Al.

7. The method of claim 1 wherein the stock material comprises one or more of Al, Mg, Fe, Si, and/or Zr.

8. The method of claim 7 wherein the extruded material comprises an alloy.

9. The method of claim 1 wherein the die face defines spiral grooves.

10. The method of claim 1 wherein the extruded material has a tensile strength from 220 MPa to 360 MPa.

11. The method of claim 1 wherein the stock material is defined by castings.

12. The method of claim 1 wherein the stock material comprises powder, flake, chip, or scrap.

13. A method for preparing extruded material by shear assisted processing and extrusion, the method comprising:
   providing a stock material in a container for shear-assisted extrusion; and
   establishing both axial and rotational force at an interface between a face of a die tool and the stock material to form an extruded material by plasticizing the stock material and flowing the plasticized stock material through the face of the die tool, wherein the face of the die tool is generally perpendicular to the axial force and comprises at least one spiral groove;
   wherein the establishing the axial force comprises:
   initiating an initial axial force between the stock material and the face; and
   maintaining a steady state axial force that does not decrease until completion of the extrusion or until stock material depletion, including:
   maintaining the steady state axial force between the stock material and the face for a first period of time; and decreasing a rotational speed associated with the rotational force while increasing a ram speed associated with the axial force during a second period of time.

14. The method of claim 13 wherein the steady state axial force is greater than the initial axial force.

15. The method of claim 13 further comprising ramping the initial axial force to the steady state axial force.

16. The method of claim 13 further comprising maintaining a die face temperature at a specified temperature during maintaining the steady state axial force.

17. The method of claim 16 wherein the specified temperature is within a range of 340° C. to 480° C.

18. A method for shear-assisted extrusion, the method comprising:
  initiating an initial axial force and a rotational force at an interface of a face of a die tool and a face of a stock material, the stock material located in a container for shear-assisted extrusion, wherein the face of the die tool is generally perpendicular to the axial force and comprises at least one spiral groove; and
  wherein the method comprises:
  ramping the initial axial force to a steady state axial force while decreasing a rotational speed associated with the rotational force; and
  extruding an extruded material from the stock material, wherein the axial force at the interface does not decrease during steady-state extrusion.

19. The method of claim 18, further comprising reducing the steady state axial force upon completion of forming the extruded material from the stock material or upon depletion of the stock material.

* * * * *